US012483907B2

(12) United States Patent
Sakamoto et al.

(10) Patent No.: US 12,483,907 B2
(45) Date of Patent: Nov. 25, 2025

(54) PREDICTING THE LIKELIHOOD OF SUBSCRIBER CHURN

(71) Applicant: Plume Design, Inc., Palo Alto, CA (US)

(72) Inventors: Yusuke Sakamoto, San Jose, CA (US); Muhammad Ali Valliani, Houston, TX (US); Nipun Agarwal, Fremont, CA (US); Sachin Vasudeva, Fremont, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 60 days.

(21) Appl. No.: 17/878,956

(22) Filed: Aug. 2, 2022

(65) Prior Publication Data
US 2022/0377582 A1 Nov. 24, 2022

Related U.S. Application Data

(63) Continuation-in-part of application No. 17/700,782, filed on Mar. 22, 2022, now Pat. No. 11,930,380,
(Continued)

(51) Int. Cl.
H04W 24/02 (2009.01)
H04L 41/0253 (2022.01)
(Continued)

(52) U.S. Cl.
CPC ......... H04W 24/02 (2013.01); H04L 41/0253 (2013.01); H04L 41/12 (2013.01);
(Continued)

(58) Field of Classification Search
CPC ..... H04W 24/02; H04W 16/18; H04W 16/00; H04W 36/0083; H04W 88/18;
(Continued)

(56) References Cited

U.S. PATENT DOCUMENTS 10,051,494 B2  8/2018 Rengarajan et al.
10,341,193 B2  7/2019 Rengarajan et al.
(Continued)

OTHER PUBLICATIONS

Feb. 14, 2019, International Search Report for International Application No. PCT/US2018/055263.
(Continued)

Primary Examiner — Brian T Le
(74) Attorney, Agent, or Firm — Nicholas Martin; Greenberg Traurig, LLP

(57) ABSTRACT

Systems, methods, and non-transitory computer-readable storage media are provided for predicting the likelihood or probability of a subscriber of a service to cancel or not renew a subscription. A method, according to one implementation, includes a step of receiving data pertaining to aspects of a service that is provided by a service provider to a subscriber in accordance with a subscription. The data may include one or more impact factors each having a positive, neutral, or negative influence on the likelihood of subscriber churn. The method also includes a step of using the one or more impact factors to predict the likelihood that the subscriber will cancel the subscription.

26 Claims, 27 Drawing Sheets

Related U.S. Application Data which is a continuation-in-part of application No. 17/071,015, filed on Oct. 15, 2020, now Pat. No. 11,871,249, which is a continuation-in-part of application No. 16/897,371, filed on Jun. 10, 2020, now Pat. No. 11,937,101, which is a continuation of application No. 15/782,912, filed on Oct. 13, 2017, now Pat. No. 10,687,227.

(51) Int. Cl.

| | | |
|---|---|---|
| *H04L 41/12* | (2022.01) | |
| *H04L 41/14* | (2022.01) | |
| *H04L 41/147* | (2022.01) | |
| *H04L 41/22* | (2022.01) | |
| *H04L 43/045* | (2022.01) | |
| *H04L 43/0876* | (2022.01) | |
| *H04L 43/0882* | (2022.01) | |
| *H04L 43/0888* | (2022.01) | |
| *H04L 43/0894* | (2022.01) | |
| *H04W 84/12* | (2009.01) | |

(52) U.S. Cl.
CPC .............. *H04L 41/14* (2013.01); *H04L 41/22* (2013.01); *H04L 43/045* (2013.01); *H04L 43/0876* (2013.01); *H04L 41/147* (2013.01); *H04L 43/0882* (2013.01); *H04L 43/0888* (2013.01); *H04L 43/0894* (2013.01); *H04W 84/12* (2013.01)

(58) Field of Classification Search
CPC .. H04W 40/24; H04W 84/12; H04L 41/0823; H04L 41/0253; H04L 41/22; H04L 41/12; H04L 41/14; H04L 41/147; H04L 41/0233; H04L 41/085; H04L 41/06; H04L 43/0811; H04L 43/00; H04L 43/045; H04L 43/0876; H04L 43/0882; H04L 43/0888; H04L 43/0894; H04L 45/02; H04L 67/75; G06F 11/1446; G06F 11/32

See application file for complete search history.

(56) References Cited

U.S. PATENT DOCUMENTS

| | | |
|---|---|---|
| 10,470,082 B2 | 11/2019 | Rengarajan et al. |
| 10,554,482 B2 | 2/2020 | Rengarajan et al. |
| 10,554,733 B2 | 2/2020 | Edara et al. |
| 10,687,227 B2 | 6/2020 | Rusackas et al. |
| 10,708,126 B2 | 7/2020 | Singla et al. |
| 2008/0151843 A1 | 6/2008 | Valmikam et al. |
| 2010/0161673 A1 | 6/2010 | Kandanala et al. |
| 2012/0157089 A1 | 6/2012 | Yang et al. |
| 2012/0259965 A1 | 10/2012 | Tsuzuki et al. |
| 2014/0328190 A1 | 11/2014 | Martin et al. |
| 2015/0327272 A1 | 11/2015 | Fink et al. |
| 2015/0341797 A1 | 11/2015 | Madan et al. |
| 2015/0382208 A1 | 12/2015 | Elliott et al. |
| 2016/0043962 A1 | 2/2016 | Kim et al. |
| 2016/0254968 A1 | 9/2016 | Ebtekar et al. |
| 2017/0061344 A1* | 3/2017 | Han .................. G06Q 10/0635 |
| 2017/0272965 A1 | 9/2017 | Kumar et al. |
| 2018/0324607 A1 | 11/2018 | Rengarajan et al. |
| 2019/0265971 A1* | 8/2019 | Behzadi ................. H04L 67/61 |
| 2019/0342795 A1 | 11/2019 | McFarland et al. |
| 2020/0160176 A1 | 5/2020 | Mehrasa et al. |
| 2020/0273050 A1* | 8/2020 | Doherty .................. G06Q 30/02 |
| 2020/0322662 A1* | 10/2020 | Korte ....................... G06N 5/01 |

OTHER PUBLICATIONS

Feb. 23, 2022, European Search Report for European Application No. EP 21 20 2948.

* cited by examiner

ISP Outage Alert

Hi John

We wanted to let you know that at 5:45 EST on Monday, February 3rd, we have detected a likely Armstrong regional outage, affecting Zoom service for 30 customers, in Atlanta GA in zip codes 31456 and 31458. Attached is the list of customers whom we've contacted about this issue.

Plume Support

PREDICTING THE LIKELIHOOD OF SUBSCRIBER CHURN

CROSS-REFERENCE TO RELATED APPLICATIONS

The present disclosure is a continuation-in-part of U.S. patent application Ser. No. 17/700,782, filed Mar. 22, 2022, and entitled "Intelligent monitoring systems and methods for Wi-Fi Metric-Based ISP Outage Detection for Cloud-Based Wi-Fi Networks," which is a continuation-in-part of U.S. patent application Ser. No. 17/071,015, filed Oct. 15, 2020, and entitled "Intelligent monitoring systems and methods for cloud-based Wi-Fi," which is a continuation-in-part U.S. patent application Ser. No. 16/897,371, filed Jun. 10, 2020, and entitled "Network operation center dashboard for cloud-based Wi-Fi systems," which is a continuation of U.S. patent application Ser. No. 15/782,912, filed Oct. 13, 2017 (now U.S. Pat. No. 10,687,227 which issued on Jun. 16, 2020), and entitled "Network operation center dashboard for cloud-based Wi-Fi systems," the contents of which are incorporated herein by reference.

FIELD OF THE DISCLOSURE

The present disclosure generally relates to networking systems and methods. More particularly, the present disclosure relates to intelligent monitoring systems and methods for cloud-based Wi-Fi, such as to predict the likelihood of subscriber churn.

BACKGROUND OF THE DISCLOSURE

Conventional Wi-Fi networks are deployed by users in their residences to provide network connectivity to various devices (e.g., mobile devices, tablets, televisions, Internet of Things (IoT) devices, laptops, media players, and the like). The users obtain network connectivity from their service provider, e.g., Multiple Systems Operators (MSOs), wireless providers, telecom providers, etc. From the service provider perspective, the network connectivity is conventionally seen to the gateway, i.e., cable modem, Digital Subscriber Loop (DSL) modem, wireless Access Point (AP), etc. Conventional Wi-Fi networks are added by the end-user, and there is no visibility into the operation of such networks by the service provider. Service providers and their customers are no longer viewing their network connectivity as ending at the gateway, such as the deployment of service provider applications ("apps") on user devices. It is no longer acceptable for these service providers to troubleshoot network problems only to the gateway. Their customers expect a working network connection to the end-user device. Thus, there is a need to provide service providers with tools and techniques to view, monitor, and troubleshoot Wi-Fi networks.

As cloud-based Wi-Fi evolves, service providers now have visibility into the home. This visibility presents unique and competitive opportunities for service providers. Some pain points that service providers experience include knowing how to reduce time spent on issue resolution, limiting service calls and escalations, keeping end customers happy, prioritizing issue resolution, network update impact, and the like. These pain points lead to uncertainty about which customers are unhappy, at-risk, and why this lack of knowledge leads to a long and clumsy issue resolution process, leading to unaddressed or reactive support, which turns into customer churn (i.e., losing customers) and poor customer satisfaction ratings.

Furthermore, subscriber churn (i.e., a subscriber choosing to cancel or not renew a subscription) is a major problem for enterprises, such as with respect to the Internet of Things (IoT) ecosystem. Specifically, a service provider or other who are responsible for providing services (e.g., Internet Service Providers (ISPs), etc.) to residential and business subscribers. Existing solutions are reactive after a subscriber experience has already taken a hit and might simply rely on offering discounts to attempt to retain unhappy subscribers. However, this one-size-fits-all approach may not be appropriate in all situations. Therefore, there is a need in the environment of network services being offered to subscribers (customers) to better predict potential subscriber churn and leverage available combinations of information to identify which subscribers are likely to churn and what are likely the reasons that these subscribers might churn before it is too late to retain the subscribers.

BRIEF SUMMARY OF THE DISCLOSURE

The present disclosure relates to intelligent monitoring systems and methods for cloud-based Wi-Fi. The present disclosure includes cloud-based Wi-Fi monitoring to alert, predict, and solve customer issues for service providers. That is, the present disclosure includes a framework or architecture to enable service providers to improve customer experience; provide end-to-end network visibility; proactively identify network issues; determine predictions related to customer churn; autonomously assist customers affected by network issues; eliminate customer calls, truck rolls (remote visits), and customer complaints; provide upsell opportunities for additional products and services to improve customer experience; and the like. A key aspect includes the detection and notification of an ISP outage, allowing customers and ISPs to receive notification and resolution more quickly.

In various embodiments, the present disclosure includes a method of steps, an apparatus configured to implement the steps, and a non-transitory computer-readable storage medium having computer readable code stored thereon for programming a computer to perform the steps. The steps include obtaining data, over the Internet, associated with a plurality of Wi-Fi networks each Wi-Fi network having one or more access points and each Wi-Fi network being associated with a customer of one or more service providers; aggregating and filtering the data; analyzing the aggregated and filtered data for the network condition of each of the plurality of customers of one or more service providers; and determining an internet service provider (ISP) outage based on a plurality of factors.

The data can include a combination of network-related data, hardware or device data, application-related data, third-party data, customer feedback data and customer support data. The analyzing can include utilizing a machine learning model associated with a use case of the one or more use cases. The steps can further include determining location of each of the plurality of Wi-Fi networks; and grouping the plurality of Wi-Fi networks based on corresponding locations. A use case of the one or more use cases can include detection of an outage, and wherein the alert for the outage is determined and distinguished between a power outage and a network outage. A use case of the one or more use cases can include detection of a power outage by detecting that multiple internet service providers are all having outages simultaneously in the same geographic region. The location of one or more of the plurality of Wi-Fi networks can be determined through multiple approaches including any of service address correlation, Internet Protocol (IP) address lookup, and location on a mobile device that is connected.

A use case of the one or more use cases can include customer call predictions utilizing a machine learning model that predicts a likelihood a customer will call in for customer support. A use case of the one or more use cases can include customer call predictions utilizing a machine learning model that predicts a likelihood a customer will call in for customer support and the one or more actions include an automatic notification to the customer prior to the call. A use case of the one or more use cases can include customer call predictions utilizing a machine learning model that predicts a likelihood a customer will call in for customer support, in which the machine learning model includes network performance related factors and non-network performance related factors. The one or more actions can include contacting a customer via at least one of email, push notification, text message, in app notification, or alert to a support agent. A use case of the one or more use cases can include customer churn predictions utilizing a machine learning model that predicts a likelihood a customer will cancel service.

A use case of the one or more use cases can include predicting a customer will provide a poor rating on a customer satisfaction survey. A use case of the one or more use cases can include detection of network issues, and wherein the one or more actions include one or more automated workflows to resolve the network issues. A use case of the one or more use cases can include detection of alarms for any of offline Wi-Fi networks, offline nodes in the Wi-Fi networks, unstable Wi-Fi networks, congestion or interference in the Wi-Fi, poor coverage in the Wi-Fi networks, poor Quality of Experience (QoE) in the Wi-Fi network, speed problems, and device connectivity and stability problems. A use case of the one or more use cases can include detection of alarms, and the alarms are expressed with multiple levels of severity or a numeric score indicating the severity.

The steps can further include presenting one or more dashboards based on the analyzing, and the dashboards can show a group of networks organized by region in which a size of the region can be selected. The steps can further include presenting one or more dashboards based on the analyzing, the dashboards allowing the selection of which locations to observe by one or more of white or black lists of customers, thresholds, new, repeat, likely to churn, important customers, new hardware, new service added, newly upgraded, service level including network speed, number of devices, and type devices in the network. The one or more actions can include a notification to a customer indicating a recommended network change.

According to additional implementations, systems and methods may be used for predicting the likelihood that one or more subscribers, who receive network services from a service provider, may be likely to churn (i.e., cancel or not renew) a subscription. In order to help a service provider retain customers, the present disclosure further includes a process that includes a step of receiving data pertaining to aspects of a service that is provided by a service provider to a subscriber in accordance with a subscription. For example, the data may include one or more impact factors each having a positive, neutral, or negative influence on the likelihood of subscriber churn. Then, the process includes the step of using the one or more impact factors to predict the likelihood that the subscriber will cancel the subscription.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a block diagram of a mobile 300, which may be used for the user device in the distributed Wi-Fi system of FIG. 1 or the like;

DETAILED DESCRIPTION OF THE DISCLOSURE

Figure 1:
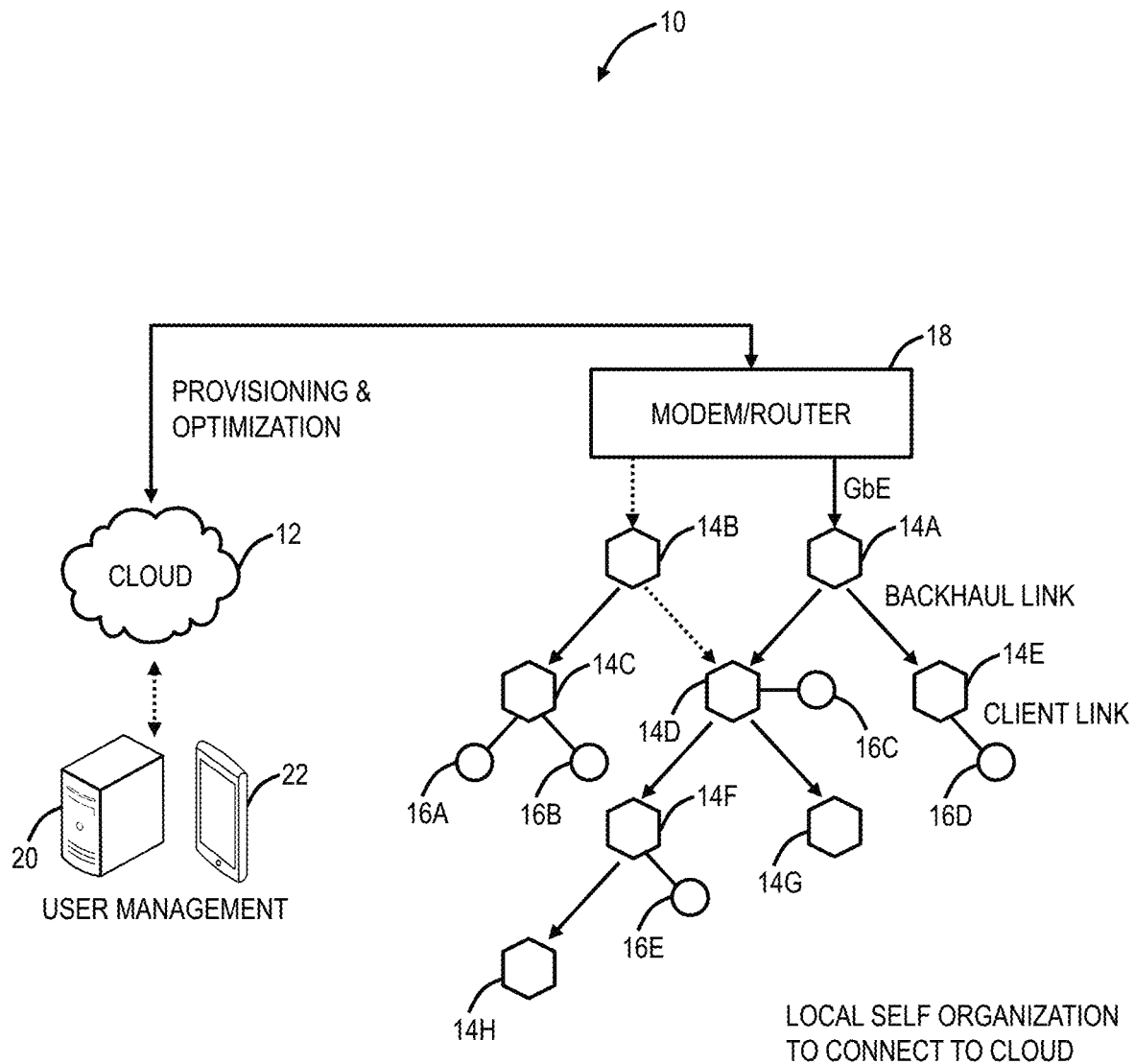
FIG. 1 is a network diagram of a distributed Wi-Fi system with cloud-based control and management.

The present disclosure relates to intelligent monitoring systems and methods for cloud-based Wi-Fi. The present disclosure includes cloud-based Wi-Fi monitoring to alert, predict, and solve customer issues for service providers. That is, the present disclosure includes a framework or architecture to enable service providers to improve customer experience; provide end-to-end network visibility; proactively identify network issues; determine predictions related to customer churn; autonomously assist customers affected by network issues; eliminate customer calls, truck rolls (remote visits), and customer complaints; provide upsell opportunities for additional products and services to improve customer experience and the like. A key aspect includes the cloud control of the Wi-Fi providing a service provider visibility to the customer's end devices.

Also, the present disclosure relates to Network Operation Center (NOC) dashboard systems and methods for cloud-based Wi-Fi systems. The systems and methods provide network visualizations in a dashboard for a service provider to view Wi-Fi networks in a plurality of locations (e.g., millions of homes). The dashboard includes various metrics and displays thereof as well as settings and controls for cloud-based Wi-Fi network control. The NOC dashboard is a user interface, e.g., web-based, application-based, etc. connected to multiple Wi-Fi networks via the cloud. The NOC dashboard can be used by network operations, technical support personnel, etc. An objective of the NOC dashboard is to provide service providers visibility from their NOC to end user's client devices. That is, make Wi-Fi visible to service providers. Thus, the NOC dashboard can monitor and manage various Wi-Fi devices (access points, mesh devices, repeaters, etc.), providing Key Performance Indicators (KPIs) and visibility to each connected device.

The systems and methods enable a service provider to view Wi-Fi networks as a whole, assessing bulk properties such as average Wi-Fi data rates, % of homes with a given Wi-Fi data rate, % of homes with coverage problems, % of homes with interference issues, etc. Accordingly, the systems and methods allow the service provider to assess how well Wi-Fi is working in their network. For example, the systems and methods can guide the service providers to determine generally whether the Wi-Fi capability is adequate or whether there is a need to invest more into Wi-Fi systems.

The systems and methods enable a service provider to create groups of Wi-Fi networks, such as customers with different types of service, customers with different or the same types of gear in their home, customers who have been in contact with customer support, etc. These groups can then be analyzed for commonalities in terms of their Wi-Fi behavior. The dashboard can be used as an "upsell" or "churn prevention" tool, identifying those customers with poor Wi-Fi experience and identifying the most likely cause or remedy for the situation. The service provider can then attempt to upsell the customer to that solution or can upgrade the solution for free in order to prevent the customer from changing (churning) to a new provider due to a poor experience.

The dashboard can be used for customer support. If a customer calls, emails, texts, etc., a service representative can call up the customer's account live or off-line to help diagnose any problem. The extensive data provided in the dashboard allows support personnel to identify fixes such as a) moving where the APs are located, b) changing networking settings such as router vs. bridge mode, c) adding additional APs to the network, d) making adjustments to the clients in the home (settings, location, etc.), e) manually adjusting frequency channels or topologies (connections between APs), f) running diagnostic speed tests, g) checking the history of speed tests, interference levels, data rates, packet errors, etc., and the like.

Distributed Wi-Fi System

FIG. 1 is a network diagram of a distributed Wi-Fi system 10 with control via a cloud 12 service. The distributed Wi-Fi system 10 can operate in accordance with the IEEE 802.11 protocols and variations thereof. The distributed Wi-Fi system 10 includes a plurality of access points 14 (labeled as access points 14A-14H), which can be distributed throughout a location, such as a residence, office, or the like. That is, the distributed Wi-Fi system 10 contemplates operation in any physical location where it is inefficient or impractical to service with a single access point, repeaters, or a mesh system. As described herein, the distributed Wi-Fi system 10 can be referred to as a network, a system, a Wi-Fi network, a Wi-Fi system, a cloud-based system, etc. The access points 14 can be referred to as nodes, access points, Wi-Fi nodes, Wi-Fi access points, etc. The objective of the access points 14 is to provide network connectivity to Wi-Fi client devices 16 (labeled as Wi-Fi client devices 16A-16E). The Wi-Fi client devices 16 can be referred to as client devices, user devices, clients, Wi-Fi clients, Wi-Fi devices, etc.

In a typical residential deployment, the distributed Wi-Fi system 10 can include between 3 to 12 access points or more in a home. A large number of access points 14 (which can also be referred to as nodes in the distributed Wi-Fi system 10) ensures that the distance between any access point 14 is always small, as is the distance to any Wi-Fi client device 16 needing Wi-Fi service. That is, an objective of the distributed Wi-Fi system 10 can be for distances between the access points 14 to be of similar size as distances between the Wi-Fi client devices 16 and the associated access point 14. Such small distances ensure that every corner of a consumer's home is well covered by Wi-Fi signals. It also ensures that any given hop in the distributed Wi-Fi system 10 is short and goes through few walls. This results in very strong signal strengths for each hop in the distributed Wi-Fi system 10, allowing the use of high data rates, and providing robust operation. Note, those skilled in the art will recognize the Wi-Fi client devices 16 can be mobile devices, tablets, computers, consumer electronics, home entertainment devices, televisions, IoT devices, or any network-enabled device. For external network connectivity, one or more of the access points 14 can be connected to a modem/router 18, which can be a cable modem, Digital Subscriber Loop (DSL) modem, or any device providing external network connectivity to the physical location associated with the distributed Wi-Fi system 10.

While providing excellent coverage, a large number of access points 14 (nodes) presents a coordination problem. Getting all the access points 14 configured correctly and communicating efficiently requires centralized control. This cloud 12 service can provide control via servers 20 that can be reached across the Internet and accessed remotely, such as through an application ("app") running on a user device 22. The running of the distributed Wi-Fi system 10, therefore, becomes what is commonly known as a "cloud service." The servers 20 are configured to receive measurement data, to analyze the measurement data, and to configure the access points 14 in the distributed Wi-Fi system 10 based thereon, through the cloud 12. The servers 20 can also be configured to determine which access point 14 each of the Wi-Fi client devices 16 connect (associate) with. That is, in an example aspect, the distributed Wi-Fi system 10 includes cloud-based control (with a cloud-based controller or cloud service in the cloud) to optimize, configure, and monitor the operation of the access points 14 and the Wi-Fi client devices 16. This cloud-based control is contrasted with a conventional operation that relies on a local configuration, such as by logging in locally to an access point. In the distributed Wi-Fi system 10, the control and optimization does not require local login to the access point 14, but rather the user device 22 (or a local Wi-Fi client device 16) communicating with the servers 20 in the cloud 12, such as via a disparate network (a different network than the distributed Wi-Fi system 10) (e.g., LTE, another Wi-Fi network, etc.).

The access points 14 can include both wireless links and wired links for connectivity. In the example of FIG. 1, the access point 14A has an example gigabit Ethernet (GbE) wired connection to the modem/router 18. Optionally, the access point 14B also has a wired connection to the modem/router 18, such as for redundancy or load balancing. Also, the access points 14A, 14B can have a wireless connection to the modem/router 18. The access points 14 can have wireless links for client connectivity (referred to as a client link) and for backhaul (referred to as a backhaul link). The distributed Wi-Fi system 10 differs from a conventional Wi-Fi mesh network in that the client links and the backhaul links do not necessarily share the same Wi-Fi channel, thereby reducing interference. That is, the access points 14 can support at least two Wi-Fi wireless channels—which can be used flexibly to serve either the client link or the backhaul link and may have at least one wired port for connectivity to the modem/router 18, or for connection to other devices. In the distributed Wi-Fi system 10, only a small subset of the access points 14 require direct connectivity to the modem/router 18 with the non-connected access points 14 communicating with the modem/router 18 through the backhaul links back to the connected access points 14.

Distributed Wi-Fi System Compared to Conventional Wi-Fi Systems

Figure 2:
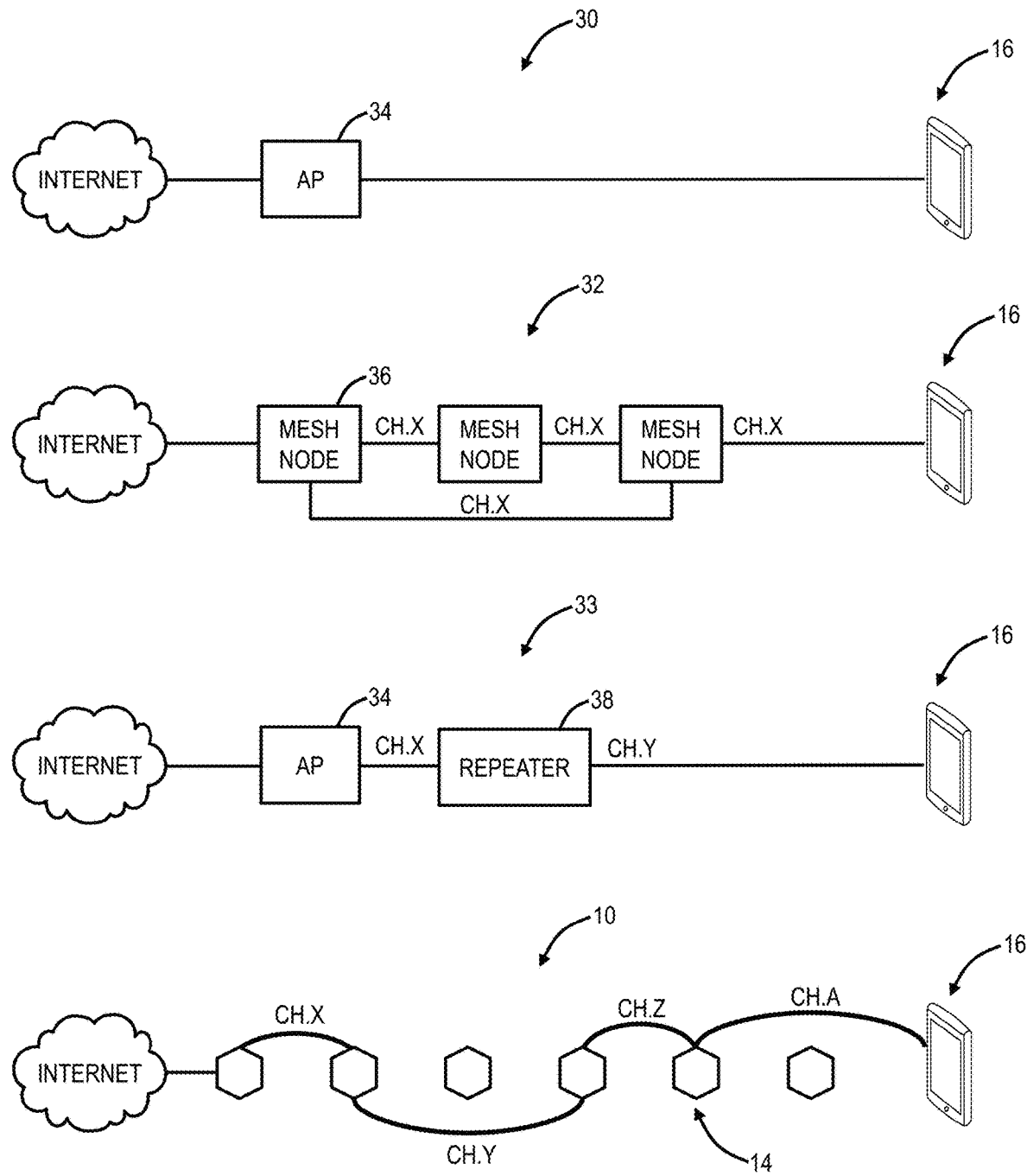
FIG. 2 is a network diagram of differences in the operation of the distributed Wi-Fi system of FIG. 1 relative to a conventional single access point system, a Wi-Fi mesh network, and a Wi-Fi repeater network.

FIG. 2 is a network diagram of differences in the operation of the distributed Wi-Fi system 10 relative to a conventional single access point system 30, a Wi-Fi mesh network 32, and a Wi-Fi repeater network 33. The single access point system 30 relies on a single, high-powered access point 34, which may be centrally located to serve all Wi-Fi client devices 16 in a location (e.g., house). Again, as described herein, in a typical residence, the single access point system 30 can have several walls, floors, etc. between the access point 34 and the Wi-Fi client devices 16. Plus, the single access point system 30 operates on a single channel, leading to potential interference from neighboring systems. The Wi-Fi mesh network 32 solves some of the issues with the single access point system 30 by having multiple mesh nodes 36, which distribute the Wi-Fi coverage. Specifically, the Wi-Fi mesh network 32 operates based on the mesh nodes 36 being fully interconnected with one another, sharing a channel such as a channel X between each of the mesh nodes 36 and the Wi-Fi client device 16. That is, the Wi-Fi mesh network 32 is a fully interconnected grid, sharing the same channel, and allowing multiple different paths between the mesh nodes 36 and the Wi-Fi client device 16. However, since the Wi-Fi mesh network 32 uses the same backhaul channel, every hop between source points divides the network capacity by the number of hops taken to deliver the data. For example, if it takes three hops to stream a video to a Wi-Fi client device 16, the Wi-Fi mesh network 32 is left with only ⅓ the capacity. The Wi-Fi repeater network 33 includes the access point 34 coupled wirelessly to a Wi-Fi repeater 38. The Wi-Fi repeater network 33 is a star topology where there is at most one Wi-Fi repeater 38 between the access point 14 and the Wi-Fi client device 16. From a channel perspective, the access point 34 can communicate to the Wi-Fi repeater 38 on a first channel, Ch. X, and the Wi-Fi repeater 38 can communicate to the Wi-Fi client device 16 on a second channel, Ch. Y.

The distributed Wi-Fi system 10 solves the problem with the Wi-Fi mesh network 32 of requiring the same channel for all connections by using a different channel or band for the various hops (note, some hops may use the same channel/band, but it is not required), to prevent slowing down the Wi-Fi speed. For example, the distributed Wi-Fi system 10 can use different channels/bands between access points 14 and between the Wi-Fi client device 16 (e.g., Chs. X, Y, Z, A), and also, the distributed Wi-Fi system 10 does not necessarily use every access point 14, based on configuration and optimization by the cloud 12. The distributed Wi-Fi system 10 solves the problems of the single access point system 30 by providing multiple access points 14. The distributed Wi-Fi system 10 is not constrained to a star topology as in the Wi-Fi repeater network 33, which at most allows two wireless hops between the Wi-Fi client device 16 and a gateway. Also, the distributed Wi-Fi system 10 forms a tree topology where there is one path between the Wi-Fi client device 16 and the gateway, but which allows for multiple wireless hops, unlike the Wi-Fi repeater network 33.

Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the distributed Wi-Fi system 10. By selecting different Wi-Fi channels between the access points 14, interference and congestion are avoided. The server 20 through the cloud 12 automatically configures the access points 14 in an optimized channel hop solution. The distributed Wi-Fi system 10 can choose routes and channels to support the ever-changing needs of consumers and their Wi-Fi client devices 16. The distributed Wi-Fi system 10 approach is to ensure Wi-Fi signals do not need to travel far—either for backhaul or client connectivity. Accordingly, the Wi-Fi signals remain strong and avoid interference by communicating on the same channel as in the Wi-Fi mesh network 32 or with Wi-Fi repeaters. In an example aspect, the servers 20 in the cloud 12 are configured to optimize channel selection for the best user experience.

Of note, the present disclosure for intelligent monitoring is not limited to the distributed Wi-Fi system 10 but contemplates any of the Wi-Fi networks 10, 30, 32, 33, with monitoring through the cloud 12. For example, different vendors can make access points 14, 34, mesh nodes 36, repeaters 38, etc. However, it is possible for unified control via the cloud using standardized techniques for communication with the cloud 12. One such example includes OpenSync, sponsored by the Applicant of the present disclosure and described at www.opensync.io/documentation. OpenSync is cloud-agnostic open-source software for the delivery, curation, and management of services for the modern home. That is, this provides standardization of the communication between devices and the cloud 12. OpenSync acts as silicon, Customer Premises Equipment (CPE), and cloud-agnostic connection between the in-home hardware devices and the cloud 12. This is used to collect measurements and statistics from the connected Wi-Fi client devices 16 and network management elements, and to enable customized connectivity services.

Cloud-Based Wi-Fi Management

Conventional Wi-Fi systems utilize local management, such as where a user on the Wi-Fi network connects to a designated address (e.g., 192.168.1.1, etc.). The distributed Wi-Fi system 10 is configured for cloud-based management via the servers 20 in the cloud 12. Also, the single access point system 30, the Wi-Fi mesh network 32, and the Wi-Fi repeater network 33 can support cloud-based management as described above. For example, the APs 34 and/or the mesh nodes 36 can be configured to communicate with the servers 20 in the cloud 12. This configuration can be through a software agent installed in each device or the like, e.g., OpenSync. As described herein, cloud-based management includes reporting of Wi-Fi related performance metrics to the cloud 12 as well as receiving Wi-Fi-related configuration parameters from the cloud 12. The systems and methods contemplate use with any Wi-Fi system (i.e., the distributed Wi-Fi system 10, the single access point system 30, the Wi-Fi mesh network 32, and the Wi-Fi repeater network 33, etc.), including systems that only support reporting of Wi-Fi related performance metrics (and not supporting cloud-based configuration).

The cloud 12 utilizes cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase SaaS is sometimes used to describe application programs offered through cloud computing. A common shorthand for a provided cloud computing service (or even an aggregation of all existing cloud services) is "the cloud."

Example Server Architecture

Figure 3:
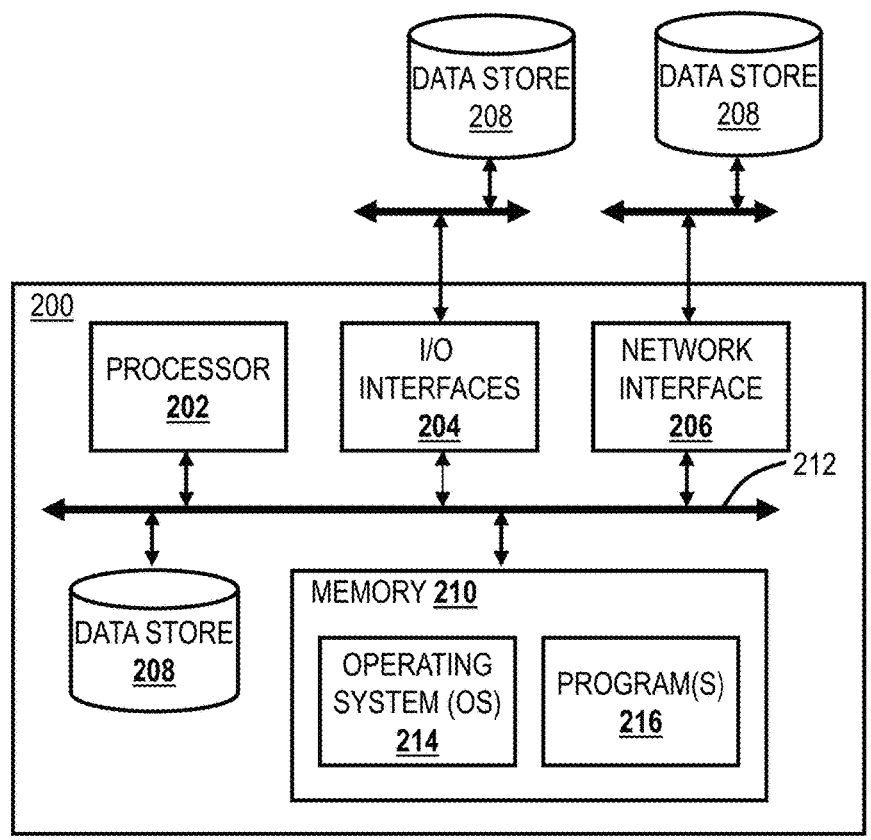
FIG. 3 is a block diagram of a server which may be used in the cloud, in other systems, or standalone.

FIG. 3 is a block diagram of a server 200 which may be used in the cloud 12, in other systems, or standalone. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. The user input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet. The network interface 206 may include, for example, an Ethernet card or adapter (e.g., 10BaseT, Fast Ethernet, Gigabit Ethernet, 10GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

Figure 4:
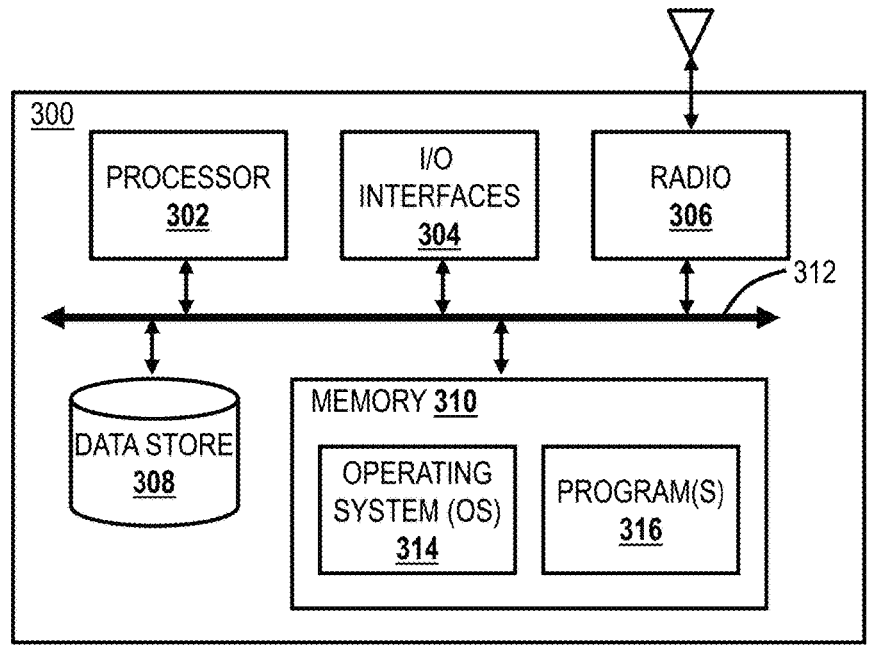

FIG. 4 is a block diagram of a user device 300, which may be used for the user device 22 or the like. The user device 300 can be a digital device that, in terms of hardware architecture, generally includes a processor 302, input/output (I/O) interfaces 304, a radio 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like. The I/O interfaces 304 can also include, for example, a serial port, a parallel port, a small computer system interface (SCSI), an infrared (IR) interface, a radio frequency (RF) interface, a universal serial bus (USB) interface, and the like. The I/O interfaces 304 can include a graphical user interface (GUI) that enables a user to interact with the user device 300. Additionally, the I/O interfaces 304 may further include an imaging device, i.e., camera, video camera, etc.

The radio 306 enables wireless communication to an external access device or network. Any number of suitable wireless data communication protocols, techniques, or methodologies can be supported by the radio 306, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g., 3G/4G/5G, etc.); wireless home network communication protocols; proprietary wireless data communication protocols such as variants of Wireless USB; and any other protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system (O/S) 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the user device 300. For example, example programs 316 may include, but not limited to, a web browser, social networking applications, streaming media applications, games, mapping and location applications, electronic mail applications, financial applications, and the like. In a typical example, the end user typically uses one or more of the programs 316 along with a network.

Cloud-Based Network Operations Center (NOC) Process

Figure 5:
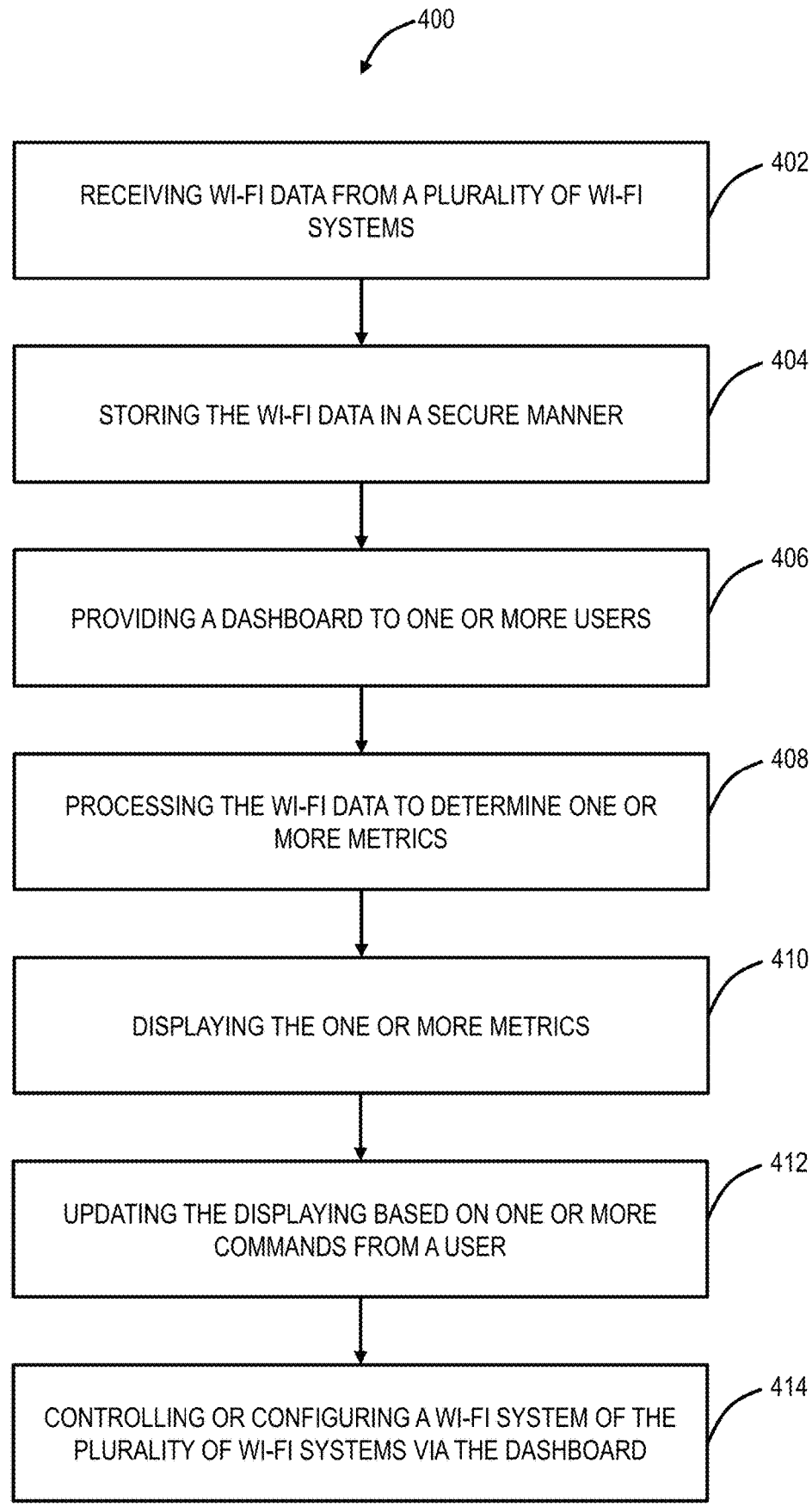
FIG. 5 is a flowchart of a cloud-based Network Operation Center (NOC) process.

FIG. 5 is a flowchart of a cloud-based NOC process 400. The cloud-based NOC process 400 is implemented in the cloud 12, such as at one of the servers 20, based on communication with a plurality of Wi-Fi systems such as the distributed Wi-Fi system 10, the single access point system 30, the Wi-Fi mesh network 32, the Wi-Fi repeater network 33, and the like. The cloud-based NOC process 400 includes receiving Wi-Fi data from a plurality of Wi-Fi systems (step 402). The Wi-Fi data can be referred to as measurement data and can include any relevant data associated with Wi-Fi operation such as Received Signal Strength Indicator (RSSI), achievable data rates, capacity, load, error rates, delays, interference, fractions of time spent transmitting and receiving, clients related information, and the like. For example, a description of data gathering in a Wi-Fi system is described in commonly assigned U.S. patent application Ser. No. 15/462,071, filed on Mar. 17, 2017, and entitled "DATA GATHERING TO ENABLE THE OPTIMIZATION OF DISTRIBUTED WI-FI NETWORKS," the contents of which is incorporated by reference.

The cloud-based NOC process 400 includes storing the Wi-Fi data in a secure manner (step 404). The Wi-Fi data can be stored in the data store 208. The secure manner includes encryption such that only the NOC can view the data. Further, the secure manner can include some or all of the Wi-Fi data being anonymized to remove user identifiable information, such as clients, etc. Further, a user in the cloud-based NOC process 400 can require authentication to be able to display metrics to ensure security.

The cloud-based NOC process 400 includes providing a dashboard to one or more users (step 408). For example, the server 20 can display the dashboard as a Graphical User Interface (GUI) to the user device 22 or the like. The dashboard can be displayed in a NOC or remotely to an authorized user. In an embodiment, the dashboard is presented as part of an application that implements the systems and methods. In another embodiment, the dashboard is presented in a browser, such as via HTTP/HTTPS.

The cloud-based NOC process 400 includes processing the Wi-Fi data to determine one or more metrics (step 408), displaying the one or more metrics in the dashboard (step 410), and updating the displaying based on one or more commands from a user (step 412). Specifically, the dashboard is interactive, allowing the user to see network-wide metrics down to individual networks or APs. Steps 408-412 include updates to the GUI based on user input and associated processing. The Wi-Fi data can include aggregated network-wide statistics used to derive network-wide metrics, and the user can drill down to groups or individual accounts.

The cloud-based NOC process 400 can be used to manage devices, networks, groups of devices, groups of networks, accounts, groups of accounts, etc. That is, the cloud-based NOC process 400 contemplates various groupings for management purposes. In practical applications, the cloud-based NOC process 400 can manage thousands to millions of devices, each in a corresponding network and associated with accounts. As described herein, a Wi-Fi network is made up of one or more devices (e.g., access points 14, 34, 36, 38). An account represents a user identification, which is the owner of a Wi-Fi network. Those skilled in the art will recognize various combinations are contemplated.

Wi-Fi Metrics in the Dashboard

FIGS. 6-12 are screenshots of various GUIs in the dashboard and in the cloud-based NOC process 400. The dashboard can include various information to display the metrics, including graphs, tables, numbers, etc. The graphs can be selected to show the 2.4 GHz and/or 5 GHz bands as well as include default and selectable timescales (e.g., one day, one week, etc.). Also, different lines on each graph can separate Transmit (Tx) versus Receive (Rx) (upload versus download) statistics.

The dashboard can be used to indicate the current state and history of the Wi-Fi network providing information such as how long each device has been connected, per node Graph, channel utilization, bandwidth usage, speed test history, alarms, channel utilization, a listing of disconnected devices, and the like.

Figure 6:
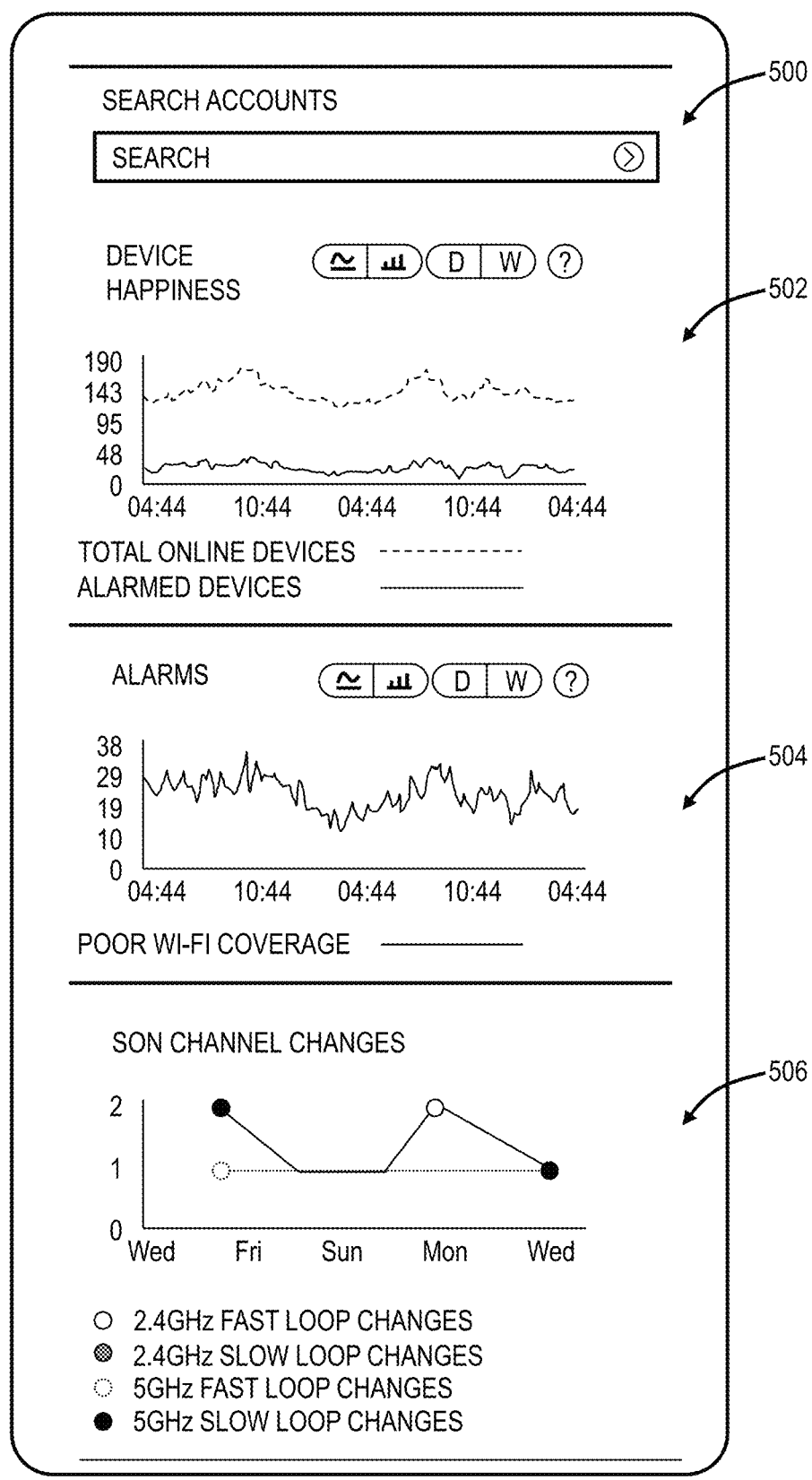
FIGS. 6 and 7 are screenshots of two portions of the dashboard illustrating network-level metrics.
Figure 7:
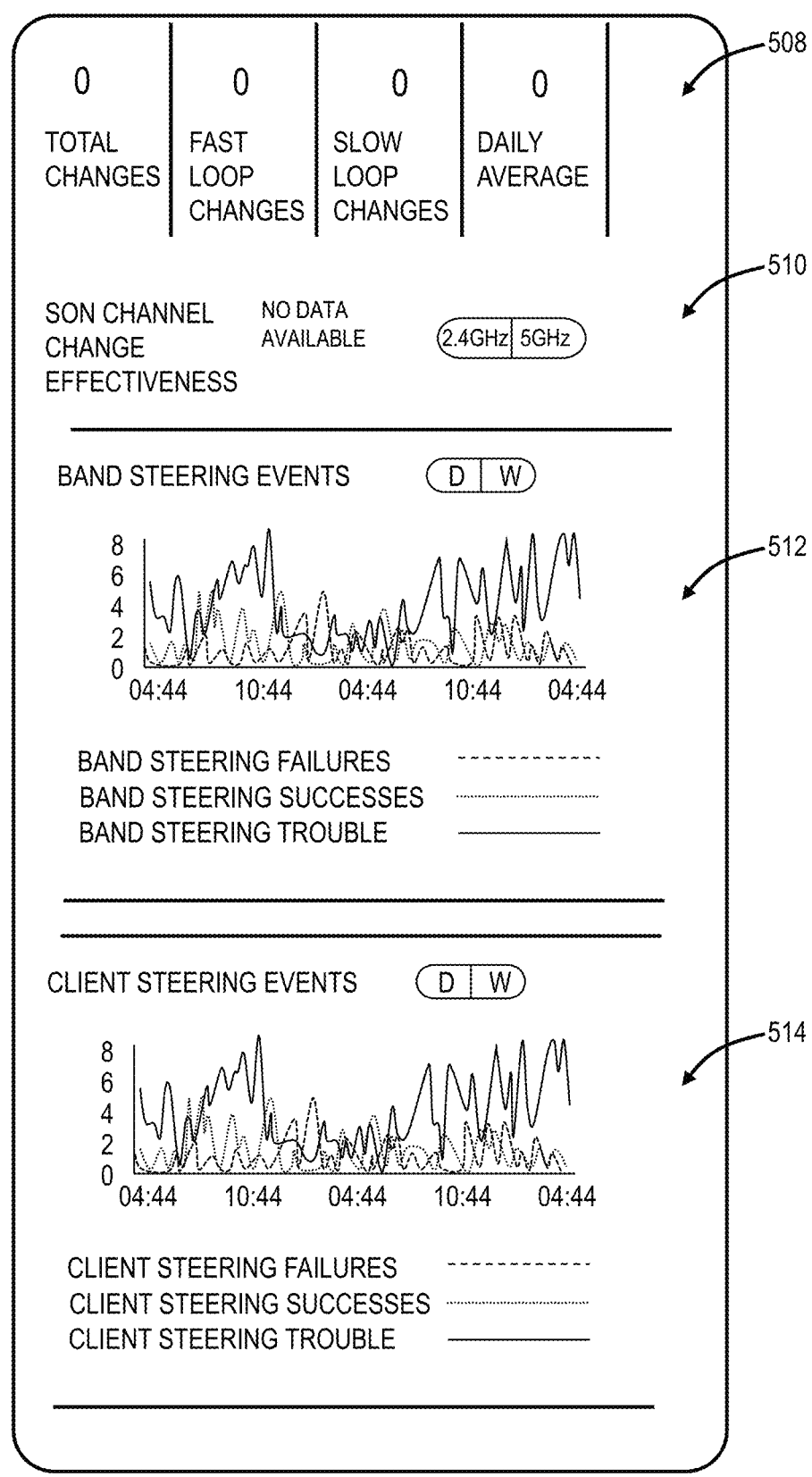

FIGS. 6 and 7 illustrate two portions of the dashboard illustrating network-level metrics. The dashboard can track all devices in various Wi-Fi systems, including devices in an alarm state, online devices, offline devices, etc. FIG. 6 includes a search bar 500 where a user can look for a specific account, Wi-Fi system, etc. FIG. 6 further includes a graph 502 of "device happiness" which provides a network-wide view of all Wi-Fi systems being managed by the cloud-based NOC process 400. By device happiness, the graph 502 lists total online devices and alarmed devices over time (which can be adjusted by day, week, etc.). Also, by the device, the cloud-based NOC process 400 is monitoring Wi-Fi system devices, i.e., access points 14, 34, mesh nodes 36, repeaters 38, etc.

FIG. 6 also includes a graph 504 of alarms of all Wi-Fi devices being managed by the cloud-based NOC process 400. For example, the graph 504 shows alarms for poor Wi-Fi coverage. The graph 504 can also show multiple different alarm types (e.g., with different colored lines, etc.) on the same graph.

FIG. 6 also includes a graph 506 of Self-Organizing Network (SON) changes. For example, the distributed Wi-Fi system 10 can be controlled by the cloud 12, including the periodic performance of optimization. An example of cloud-based optimization is described in commonly-assigned U.S. patent application Ser. No. 15/463,321, filed Mar. 20, 2017, and entitled "CLOUD-BASED CONTROL OF A WI-FI NETWORK," the contents of which are incorporated by reference. Other types of control or optimization in the cloud 12 are also contemplated. Here, the graph 506 illustrates 2.4 GHz and 5 GHz fast and slow loop changes.

FIG. 7 can be displayed in conjunction with FIG. 6, such as different tiles in the dashboard. FIG. 7 can include a listing 508 of numbers of network-wide events, such as total changes, fast loop changes, slow loop changes, daily average, etc. FIG. 7 can also include a graph illustrating the SON channel change effectiveness 510. This display can show metrics showing the effectiveness of the cloud-based optimization.

FIG. 7 also includes a graph 512 of band steering events network-wide as an aggregate statistic. The band steering events are a movement of clients between bands (2.4 GHz and 5 GHz). The graph 512 illustrates network-wide statistics for band steering failures, successes, and trouble. Similarly, FIG. 7 also includes a graph 514 of client steering events, which are a movement of clients between Wi-Fi devices.

The dashboard can also include a map display showing metrics related to the Wi-Fi systems being managed by the cloud-based NOC process 400. The map can be a geographic map that shows each Wi-Fi system (or groups) and location. A user can navigate the map, select an area, drill-down and select a single Wi-Fi system, or the like to update the other displays in the dashboard.

In an embodiment, the metrics for the cloud-based NOC process 400 can include Wi-Fi capacity, alarms, channel changes, band steering, channel change effectiveness, health statistics with bins, other parameters in bins, etc. The dashboard can by default display the metrics network-wide with the user being able to search/filter through various commands. Also, the user can define groups of Wi-Fi systems.

Figure 8:
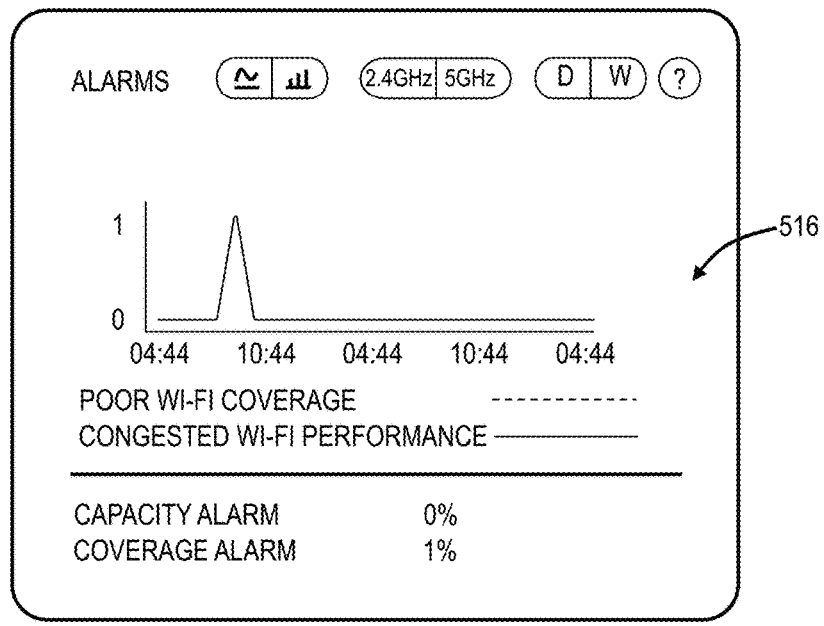
FIG. 8 is a tile in the dashboard illustrating a graph of alarms.

FIG. 8 is a tile in the dashboard illustrating a graph 516 of alarms. The graph 504 illustrates the alarms across all Wi-Fi systems being managed by the cloud-based NOC process 400. The graph 516 illustrates alarms for an individual (or group) of Wi-Fi systems as well as the alarms for a single Wi-Fi device. The graph 516 can be adjusted over time as well as having different lines for individual alarms as well as a line for all alarms in total. This provides a health display in the NOC with counts and percentages listed on the summary page across all of the networks.

The dashboard and/or cloud-based NOC process 400 can raise alarms against devices, networks, groups of devices, groups of networks, accounts, groups of accounts, etc. The alarms can be based on the monitored data and raised when the monitored data exceeds thresholds (which may be configurable). The alarm can have a time constant—how long is it in the bad state, some amount of hysteresis and the alarm may include more different factors simultaneously.

Figure 9:
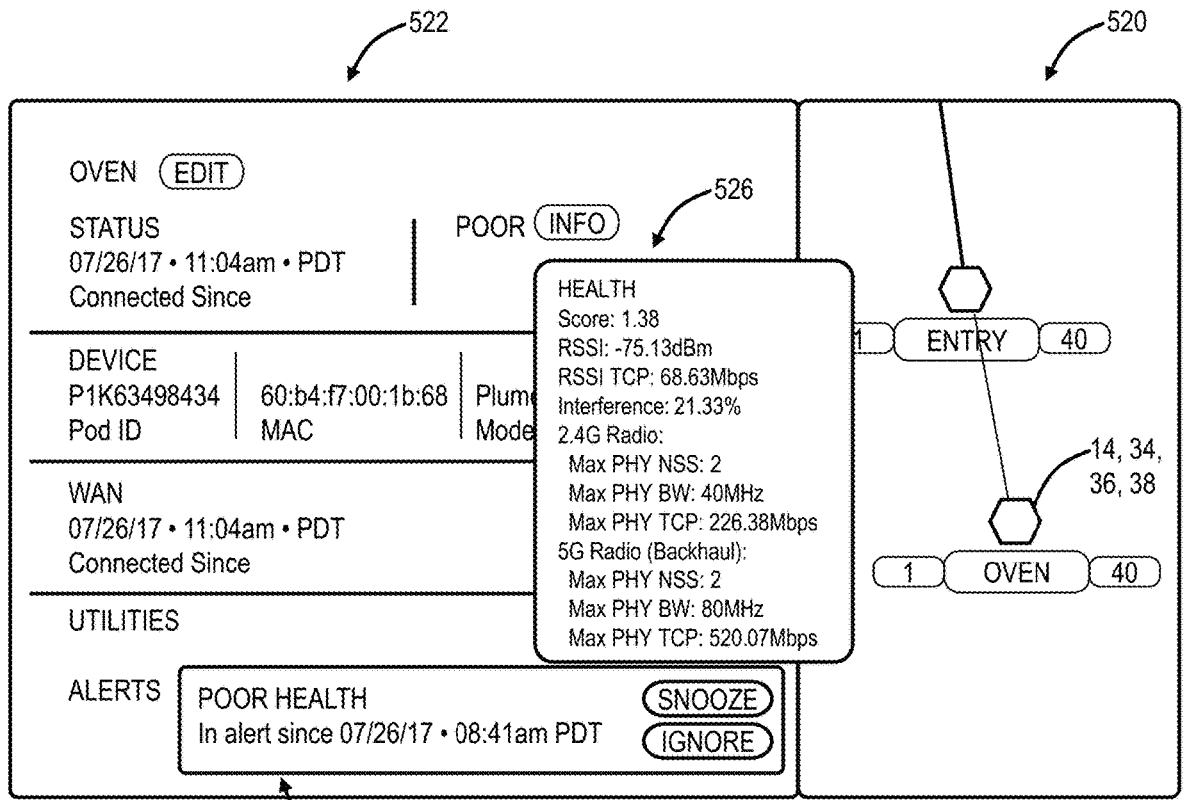
FIG. 9 is a screenshot of an individual device associated with a Wi-Fi network and/or account managed by the cloud-based NOC process.

FIG. 9 is a screenshot of an individual device associated with a Wi-Fi network and/or account managed by the cloud-based NOC process 400. Specifically, FIG. 9 includes a network diagram 520 and a device tile 522. The dashboard can include a GUI for the network diagram 520, which illustrates access points 14, 34, 36, 38 showing connectivity. For example, in the distributed Wi-Fi system 10, lines in the network diagram 520 can illustrate backhaul links (to other access points 14, 34, 36, 38) and client links (to user devices). The network diagram 520 can support zoom, scroll, etc. and click through, select, etc. to bring up details of a device, network, and/or group of networks and/or accounts. Further, the network diagram 520 can include color differentiation on the access points 14, 34, 36, 38, links, etc. For example, in FIG. 9, the access point "OVEN" can be red to indicate poor health, and a user can click on the access point "OVEN" to bring up the device tile 522.

The device tile 522 provides status information such as the device name (OVEN, which can be edited), network health (POOR in this example), connection statistics (Jul. 26, 2017, etc.), device statistics (e.g., ID number, Media Access Control (MAC) address, manufacturer/model, etc. Finally, the device tile 522 can include an alert section 524, which shows an alarm/alert for the poor health and the user can select snooze or ignore.

For the network health, the user can click on an INFO button to bring up a health tile 526, which lists relevant health-related statistics and a score. The network health is a mechanism for a user/administrator to determine the operational status of the access points 14, 34, 36, 38. The score for the network health can be a weighted combination of different factors, such as RSSI, RSSI Transmission Control Protocol (TCP), interference, Number of Spatial Streams (NSS), bandwidth, TCP, etc. The score is meant to provide a meaningful comparison and encompass network operational parameters as well as outside effects such as interference. In this example, the device ("OVEN") uses a 5G channel for backhaul, e.g., on channel 40, to device "ENTRY" and a 2.4G channel for clients. The score here is 1.38, which is indicative of poor health.

Figure 10:
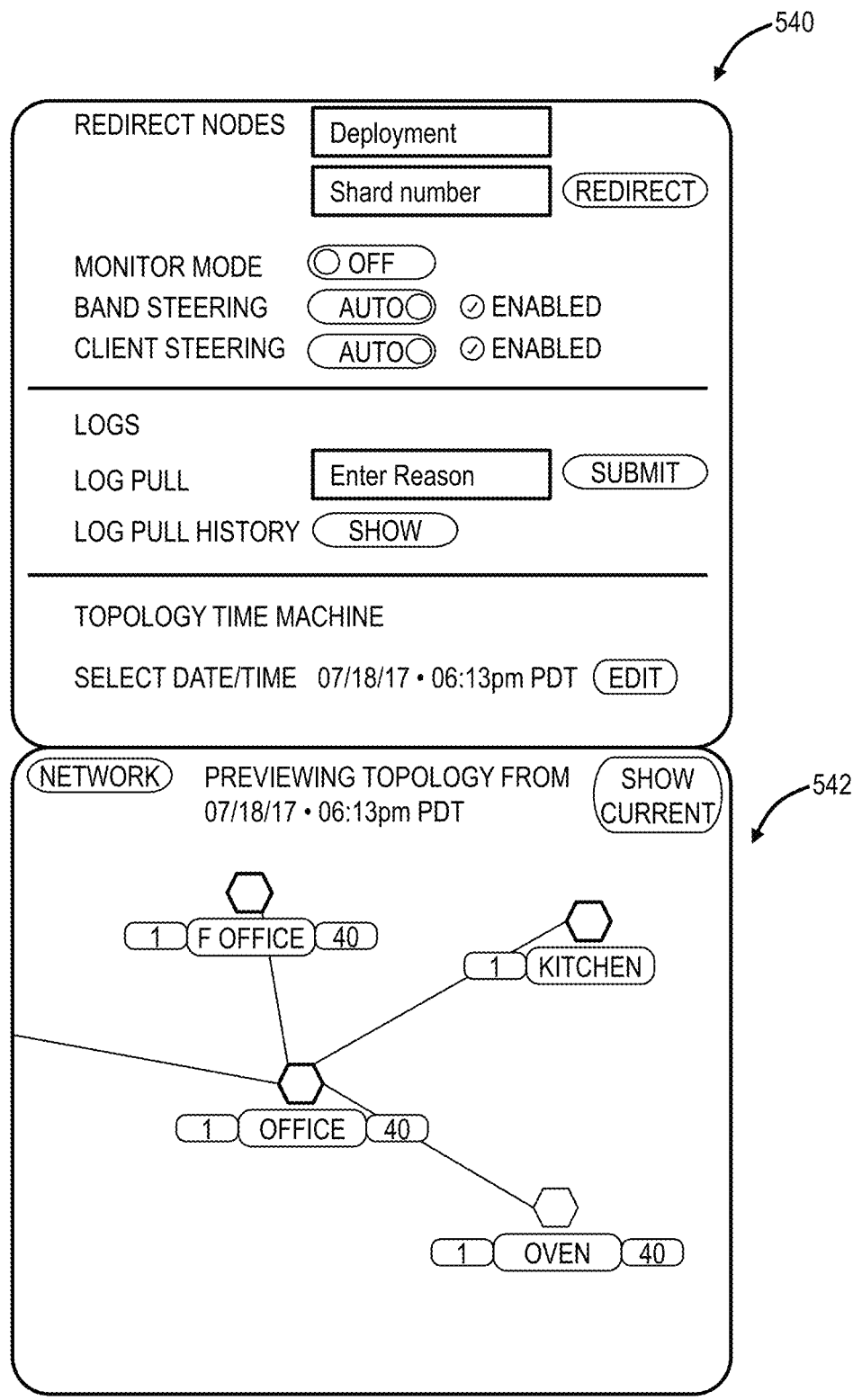
FIG. 10 is a screenshot of a network control tile and a topology time machine time for examining how a Wi-Fi network's topology evolves over time.

FIG. 10 is a screenshot of a network topology tile 540 and a topology time machine tile 542 for examining how a Wi-Fi network's topology evolves over time. As described herein, the distributed Wi-Fi network 10 can change its topology (interconnection of backhaul links, channels, etc.) over time based on periodic optimization. The intent of the topology time machine tile 542 is to configured optimizations, view logs and initiate a visualization of the topology. The optimizations can include forced redirection of nodes, a monitor mode, and configurations for band steering and client steering. Band steering statistics can include kick, failures, success, connects, disconnects, probes that the client device has sent, sticky, reject, etc. The visualization of the topology is presented in the network topology tile 540, which can show the evolution of the network topology over specified times in the topology time machine tile 542. This feature, called "Topology time machine," allows the user to go back to any particular time in the past and see the topology of the network including the connection of client devices to the network.

The topology time machine can also give reasons for the topology changes. Each optimization event that is triggered lists the reason that it is triggered, which can include: the onboarding of new access points, the manual trigger of optimization, statistics being reported by the access points changed enough to justify an optimization, an access point randomly disconnected or re-connected, etc. The topology time machine can also track channel changes, including ones being done to avoid interference, and track the effectiveness of the channel changes both as an overall network aggregated report and on an individual account basis. For example, the effectiveness of the channel changes can be defined as when a channel change successfully resulted in reduced interference, higher bandwidth, etc.

An operator can use the topology time machine to develop an understanding of best practices in Wi-Fi network deployment, Wi-Fi hardware configuration, etc. This expertise can be used to troubleshoot and optimize networks, build better hardware, etc.

Figure 11:
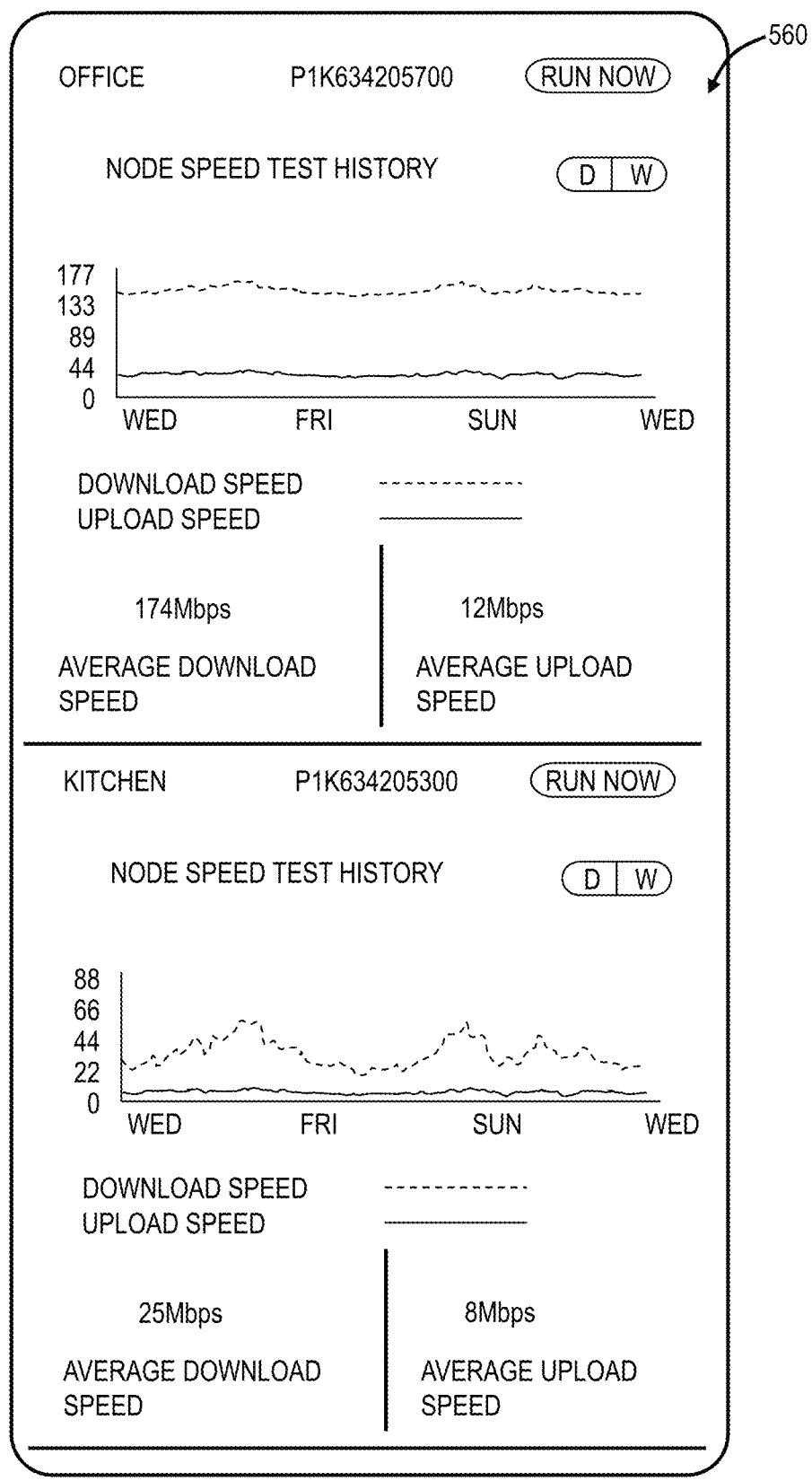
FIG. 11 is a screenshot of network speed test tiles for two nodes.

FIG. 11 is a screenshot of network speed test tiles 560 for two nodes. The cloud-based NOC process 400 can utilize periodically or on-demand speed tests to indicate the performance of a Wi-Fi network. The speed test can be performed at a gateway, at any node in a distributed Wi-Fi network 10, etc. In an embodiment, the speed test can be controlled from the NOC on demand, such as responsive to trigger conditions, periodic, etc. The speed test shows both download speed and upload speed over time.

In an embodiment, the NOC/dashboard can correlate the speed test to the topology time machine to alerts/alarms to develop an understanding of speed-related to conditions and topology. All of this data can be incorporated into machine learning algorithms to determine correlations to improve network performance and optimization.

NOC Dashboard

In an embodiment, information displayed in a NOC dashboard can include the following tabs account, network, advanced settings, optimizer, speed test, links, access point devices, client devices, etc. The Account tab displays basic profiling information relevant to a user. As described herein, a user is an owner of a Wi-Fi network under management by the NOC dashboard and the cloud-based NOC process 400. In the account tab, the username, email, application Operating System (OS) and version, location, creation date, etc. can be available. Following e-mail validation and onboarding, the access point devices seen by an onboarding process are visible. As described herein, onboarding is the process of bringing a Wi-Fi network under control of the NOC dashboard and the cloud-based NOC process 400. The onboarding can use a mobile device, application, and wireless protocol such as Bluetooth. The account tab enables the administrator to delete an account, assign a group to the account, modify the username and/or SSID, resend e-mail verification, etc.

The network tab displays details of current and historical structural Wi-Fi configurations. The current network state can be mapped in the network topology, channel diversity, and mobile topology. In order to view historical network states, the topology time machine can be used. The network tab can assist administrators in troubleshooting. In order to troubleshoot with system logs, a log pull can be submitted and accessed through the created link. In addition, the administrator can re-configure the network. This involves rebooting a location, claiming/unclaiming an access point device, modifying the SSID, PSK (Password), and the band steering state.

The advanced settings tab displays current systemic Wi-Fi configurations. The advanced settings tab can also assist the administrator in troubleshooting. The administrator can use the tab to modify the network mode, Universal Plug and Play (UPnP), Domain Name System (DNS) Servers, Dynamic Host Configuration Protocol (DHCP) reservations, bridge versus router mode, and port forwarding settings.

The optimizer tab displays logs of optimization jobs performed for the location. Tapping on the different headers can provide insight into the KPI triggers and the purpose of the job. The optimizer tab can enable the administrator to push manual optimization triggers and toggle the auto-optimization on/off. The speed test can trigger remote speed tests at individual access point devices and automated Internet Service Provider (ISP) speed tests on the system. In addition, it will allow the administrator to toggle the Automated ISP Speed Test on/off, along with providing a dashboard to view results.

The links tab provides a focus on the client links and the backhaul links. The tab can provide sorted information on the medium, band, and channel attributes of the links. The access point devices tab provides an overview of the location from the perspective of the access point devices. Sorted information on the number of devices connected, firmware versions, MAC, IP, and connection date details can all be visible upon clicking show details. The access point devices tab assists the administrator in troubleshooting as well. Clicking on any access point will bring up controls that enable setting a Light Emitting Diode (LED) Mode to locate, rebooting an access point, or running speed tests on the access points. After results are updated to the cloud, the speed tests on the access points will move to the Speed Test tab mentioned above. The client devices tab provides an overview of the location from the perspective of devices. Clicking on any device will provide in-depth information such as connection type, IP and MAC addresses, RSSI values, bandwidth usage values over different periods of time.

Wi-Fi Network Control Via a NOC

Figures 12, 13:
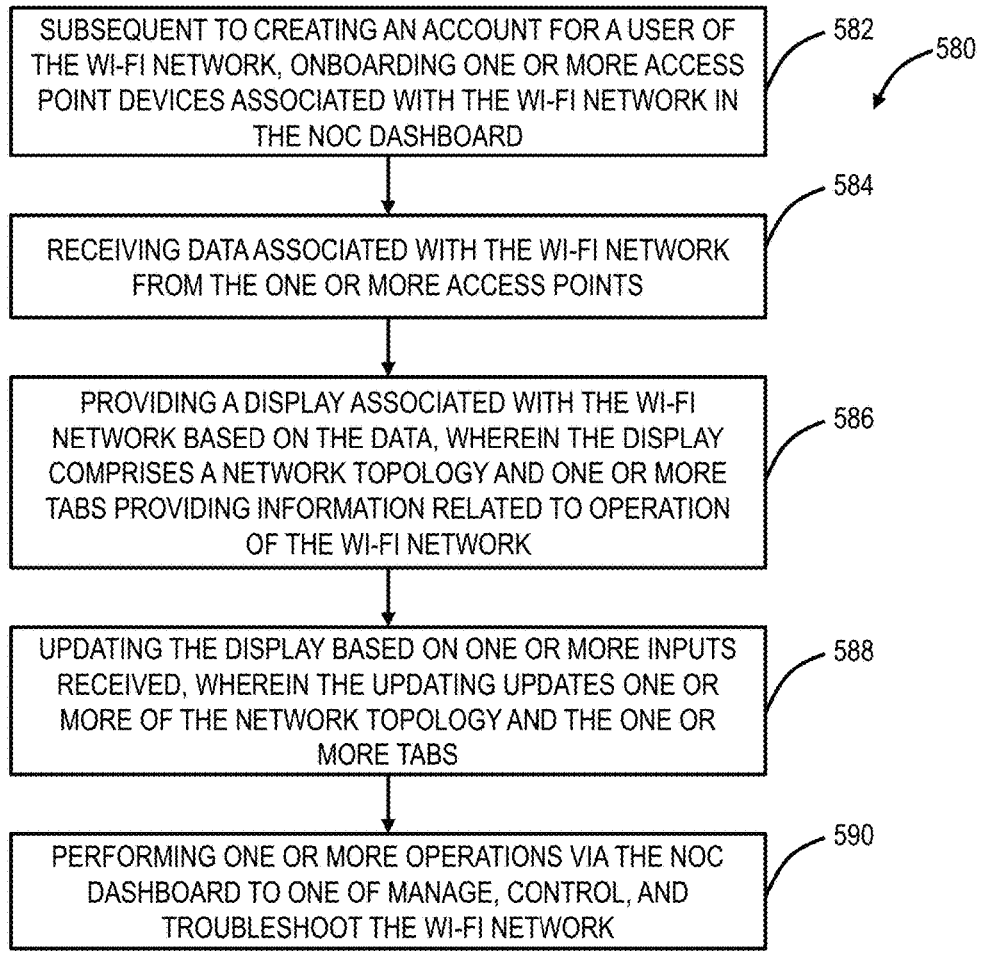
FIG. 12 is a screenshot of a tile for a performed optimization.
FIG. 13 is a flowchart of a method of managing a Wi-Fi network of a plurality of Wi-Fi networks from a cloud-based Network Operations Control (NOC) dashboard.

FIG. 13 is a flowchart of a process 580 of managing a Wi-Fi network of a plurality of Wi-Fi networks from a cloud-based Network Operations Control (NOC) dashboard. The process 580 includes, subsequent to creating an account for a user of the Wi-Fi network, onboarding one or more access point devices associated with the Wi-Fi network in the NOC dashboard (step 582); receiving data associated with the Wi-Fi network from the one or more access points (step 584); providing a display associated with the Wi-Fi network based on the data, wherein the display includes a network topology and one or more tabs providing information related to operation of the Wi-Fi network (step 586); updating the display based on one or more inputs received, wherein the updating updates one or more of the network topology and the one or more tabs (step 588); and performing one or more operations via the NOC dashboard to one of manage, control, and troubleshoot the Wi-Fi network (step 590).

The one or more access point devices can include a plurality of devices such as the access points 14, and wherein the onboarding can include providing a unique identifier of a device and automatically associated all of the plurality of devices to the account based on the unique identifier. For example, the association can be in manufacturing, at the point of sale, etc. such as six access points 14 in a package and any one of the unique identifiers causes all six to be onboarded. The onboarding can include inputting one of serial numbers and Media Access Control (MAC) address for the one or more access point devices in the NOC dashboard.

The onboarding can include receiving an indication of an association between the account and the one or more access point devices from the Wi-Fi network. For example, the access point devices can be configured to communicate to the NOC dashboard once installed. Alternatively, the access point devices can be locally onboarded by a user with an application that communicates the association to the NOC dashboard. Further, the access point devices can be loaded with a control agent, either in manufacturing or during deployment, which communicates to the NOC dashboard.

Subsequent to the receiving, the process 580 can further include storing the data for the Wi-Fi network in a secure manner which is accessible only in the NOC dashboard based on user permission. Of note, the NOC dashboard can support thousands to millions of different Wi-Fi networks under management. As such, there is a need to ensure an administrator can only see authorized data. Also, the secure manner can include anonymizing the data so there is no correlation with the actual end-user. This is advantageous when the NOC dashboard manages multiple Wi-Fi networks for different service providers. The aggregate network-wide data is available, albeit in a secure manner.

The performing can include one or more of establishing or changing a Service Set Identifier (SSID) of the Wi-Fi network and establishing or changing a password for accessing the Wi-Fi network. The performing can include the setting of network parameters of the Wi-Fi network, including one or more of Domain Name System (DNS) settings, Universal Plug and Play (UPnP), Dynamic Host Configuration Protocol (DHCP) reservations, bridge versus router mode, and port forwarding settings. The performing can include causing a specific access point device to provide an indicator for locating by a local user.

For example, controls or actions that can be taken from the NOC dashboard can include, without limitation: the ability to control the operation of the LED, for example, blink it in order for a customer to locate it; claim access point devices; reboot multiple devices in a single location with a single click; redirect access point devices. Redirection refers to the ability to change which carrier (e.g., operator of the NOC dashboard) an Access Point is associated with. For example, an access point pod originally configured to contact the cloud at carrier A and become part of carrier A's network may subsequently need to be configured to contact the cloud for carrier B so as to become part of carrier B's network. Other controls and actions can include, without limitation: unclaim while preserving (or not) pack IDs (this has to do with which home the access point devices are associated with); enable or disable optimizations, client steering, band steering; manual trigger of log pulls, e.g., a single click captures logs from all devices and moves it to a cloud server; setting of network parameters including DNS settings, DHCP reservations, bridge vs. router mode, port forwarding, UPnP settings; change account password; assign account into multiple groups; reboot individual access point devices or the entire network; freeze devices, with times, etc.

The display can provide graphs of one or more metrics associated with the Wi-Fi network. The display can provide aggregated network-wide statistics and alarms for the plurality of Wi-Fi networks. The display can provide network-wide statistics and alarms for the Wi-Fi network, wherein the network-wide statistics can include a graph of channels used in the Wi-Fi network. The Wi-Fi network can include a distributed Wi-Fi network, and wherein the network topology graphically illustrates client links and backhaul links between a plurality of access point devices.

The one or more tabs can display information related to the one or more access point devices and related to wireless links, wherein a health score is displayed for each of the one or more access point devices and the wireless links, and wherein the health score is a weighted combination of a plurality of factors. The one or more tabs can include a topology time machine, which graphically illustrates a topology of the Wi-Fi network and changes over a specified time period. The one or more operations can include optimization of the Wi-Fi network, and wherein the one or more tabs can include a status of the optimization, a history of optimizations, and statistics associated with the optimization.

In another embodiment, an apparatus executing a cloud-based Network Operations Control (NOC) dashboard for management of a Wi-Fi network of a plurality of Wi-Fi networks includes a network interface communicatively coupled to the plurality of Wi-Fi networks; a processor communicatively coupled to the network interface; and memory storing instructions that, when executed, cause the processor to, subsequent to creation of an account for a user of the Wi-Fi network, onboard one or more access point devices associated with the Wi-Fi network in the NOC dashboard; receive data associated with the Wi-Fi network from the one or more access points; provide a display associated with the Wi-Fi network based on the data, wherein the display includes a network topology and one or more tabs provide information related to operation of the Wi-Fi network; update the display based on one or more inputs received, wherein the display is updated in one or more of the network topology and the one or more tabs; and perform one or more operations via the NOC dashboard to one of manage, control, and troubleshoot the Wi-Fi network.

In a further embodiment, a non-transitory computer-readable storage medium includes computer-readable code stored thereon for programming a computer to perform the steps of, subsequent to creating an account for a user of the Wi-Fi network, onboarding one or more access point devices associated with the Wi-Fi network in the NOC dashboard; receiving data associated with the Wi-Fi network from the one or more access points; providing a display associated with the Wi-Fi network based on the data, wherein the display includes a network topology and one or more tabs providing information related to the operation of the Wi-Fi network; updating the display based on one or more inputs received, wherein the updating updates one or more of the network topology and the one or more tabs; and performing one or more operations via the NOC dashboard to one of manage, control, and troubleshoot the Wi-Fi network.

Cloud-Based Wi-Fi Monitoring System

Figure 14:
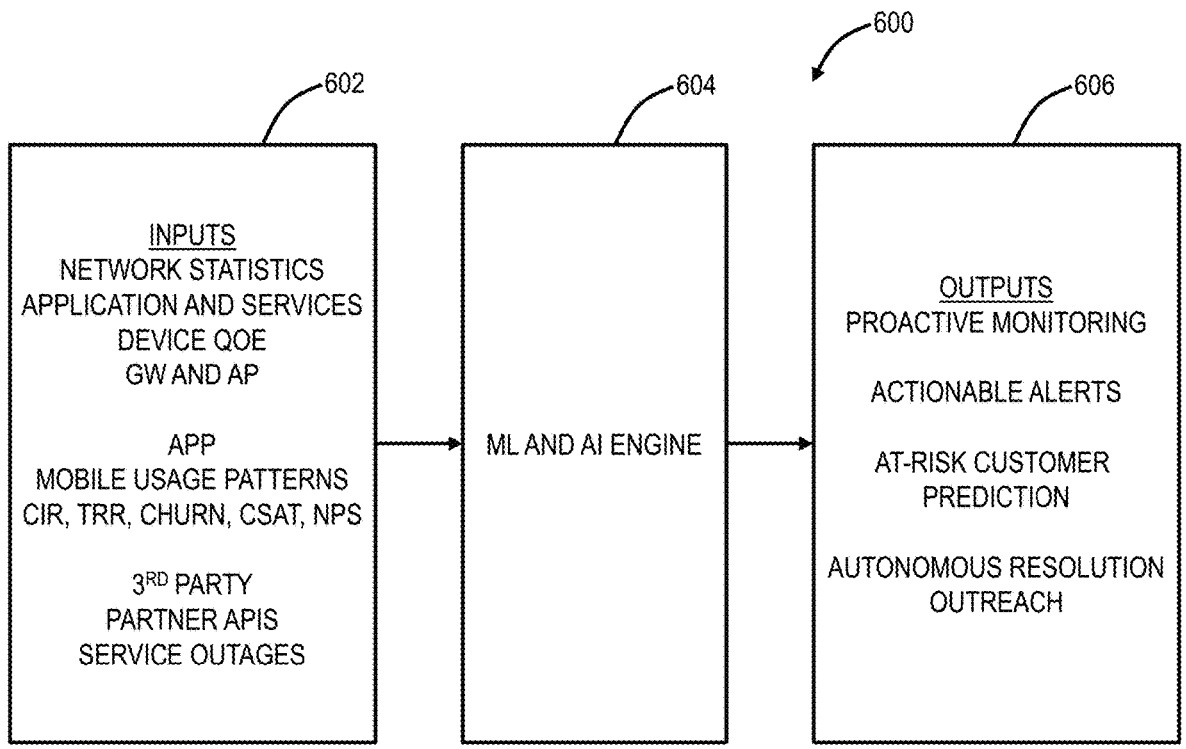
FIG. 14 is a flow diagram of functions associated with a cloud-based Wi-Fi monitoring system.
Figure 15:
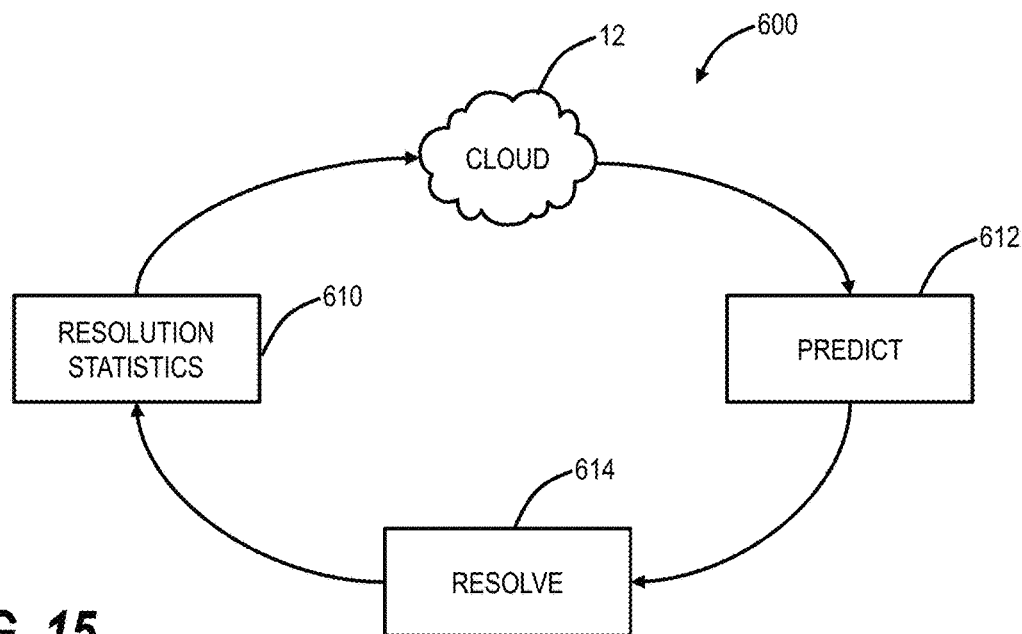
FIG. 15 is a diagram of the workflow associated with the cloud-based Wi-Fi monitoring system of FIG. 14.
Figure 16:
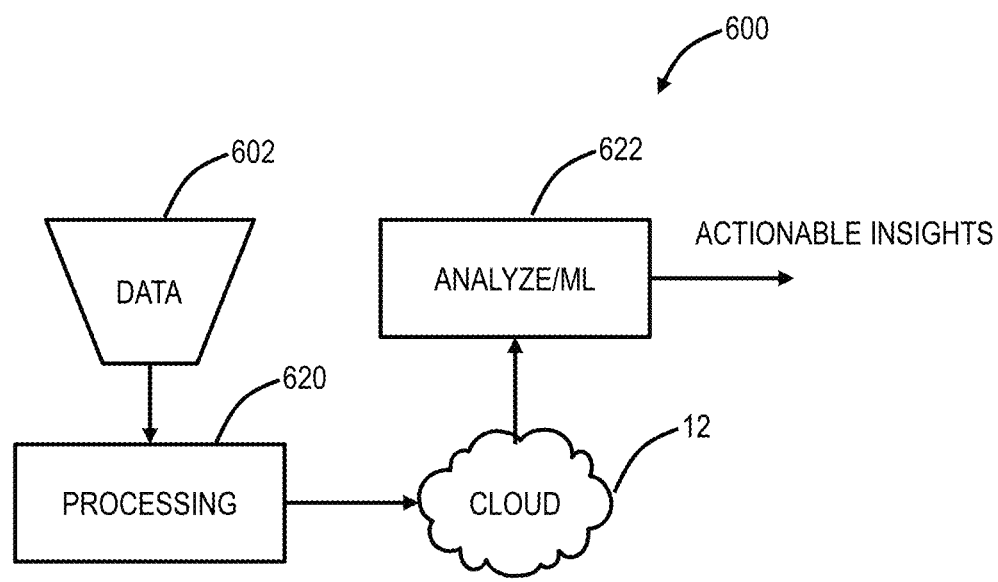
FIG. 16 is a flowchart of operations associated with the cloud-based Wi-Fi monitoring system of FIGS. 14-15.

FIG. 14 is a flow diagram of functions associated with a cloud-based Wi-Fi monitoring system 600. FIG. 15 is a diagram of the workflow associated with the cloud-based Wi-Fi monitoring system 600. FIG. 16 is a flowchart of operations associated with the cloud-based Wi-Fi monitoring system 600. FIGS. 14-16 illustrate the functional aspects of the cloud-based Wi-Fi monitoring system 600. The cloud-based Wi-Fi monitoring system 600 can be realized as a cloud service implemented in the cloud 12, via one or more servers 20, 200. The cloud-based Wi-Fi monitoring system 600 is connected to one or more Wi-Fi networks via the Internet, and the one or more Wi-Fi networks can include any of the distributed Wi-Fi system 10, the single access point system 30, the Wi-Fi mesh network 32, and the Wi-Fi repeater network 33. In an implementation, the cloud-based Wi-Fi monitoring system 600 can be a method including various steps, implemented via one or more servers 20, 200, and as non-transitory computer-readable storage medium having computer readable code stored thereon for programming a computer to perform the steps. Those skilled in the art will recognize various implementations are contemplated for the cloud-based Wi-Fi monitoring system 600.

In FIG. 14, the cloud-based Wi-Fi monitoring system 600 includes receiving inputs 602 from one or more Wi-Fi networks, performing analysis with a Machine Learning (ML) and Artificial Intelligence (AI) engine 604, and providing outputs 604 based on the analysis. In FIG. 15, the workflow of the cloud-based Wi-Fi monitoring system 600 includes a feedback loop where the cloud 12 receives statistics (i.e., the inputs 602) as well as resolution information from any network updates (step 610). The engine 604 is configured to make predictions based on the statistics and the resolution information (step 612), and the predictions are used to implement network configuration changes to resolve any issues or predicted issues (step 614). In FIG. 16, the cloud-based Wi-Fi monitoring system 600 receives the input 602, performs processing (step 620) in the cloud 12 to obtain ML predictions (step 622) for actionable insights. Further details are now described for the various functions in the cloud-based Wi-Fi monitoring system 600.

The cloud-based Wi-Fi monitoring system 600 includes data ingestion of the inputs 602, and the processing (step 620) can perform data aggregation, filtering, and pattern matching (aggregation/grouping of users). The inputs 602 can include various types of information, as described below. The data aggregation can be based on Internet Service Provider (ISP) level, location level, device level (e.g., Wi-Fi client device 16), and node level (e.g., access point 14). The engine 604 is configured to perform prediction (step 612) modeling for the identification of specific issues, as described below. The outputs 608 can be proactive monitoring, actionable alerts, at-risk customer predictions, and autonomous resolution outreach. The autonomous resolution outreach can be autonomous workflows, including notifications and/or modification of network parameters, configurations, etc. Finally, the cloud-based Wi-Fi monitoring system 600 includes tracking of customer engagement. For example, it is possible to automatically check to see if a customer has opened a notification sent to them, and if the customer has taken the action recommended in the notification.

Input Data

The inputs 602 can include network-related data, application-related data, third-party data, customer support data, etc. A key point aspect of the cloud-based Wi-Fi monitoring system 600 is the sheer volume and types of inputs 602 that are available for analysis. As is described herein, the cloud-based Wi-Fi monitoring system 600 is configured to leverage all of the available data, from disparate sources, to obtain actionable insights. It can be seen that the cloud-based Wi-Fi monitoring system 600 provides a network operator an unfair advantage to the network activity insider their customer's home.

The network-related data relates to the operation of a Wi-Fi network of the one or more Wi-Fi networks monitored by the cloud-based Wi-Fi monitoring system 600. Again, the Wi-Fi network can be any of the distributed Wi-Fi system 10, the single access point system 30, the Wi-Fi mesh network 32, and the Wi-Fi repeater network 33. The network-related data can include, for example, application usage and Quality of Experience (QoE), Wi-Fi network metrics, data related to gateways and extenders, etc. The network-related data can also include reporting of Wi-Fi related performance metrics via a standardized technique, such as OpenSync.

Figure 17:
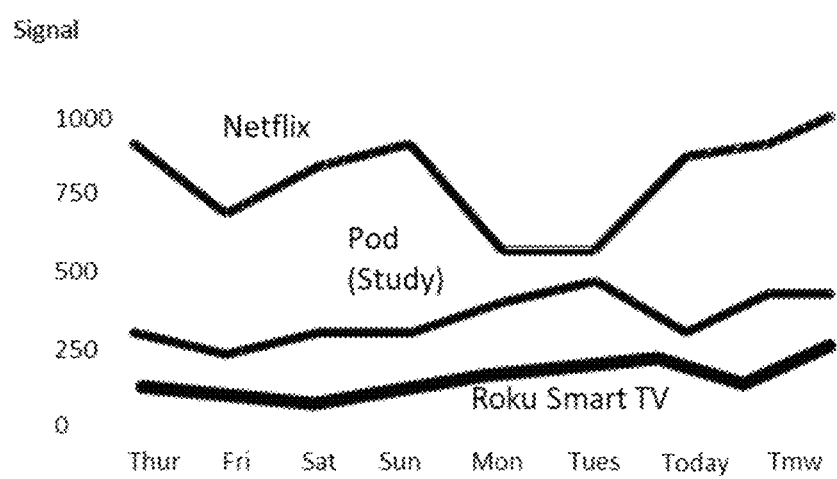
FIG. 17 is a graph of data usage over time for a particular Wi-Fi network.

The application-related data relates to the operation of specific applications on specific Wi-Fi client devices 16 in particular Wi-Fi networks. The application-related data can be aggregated and filtered over time. The application-related data includes types of applications, types of the Wi-Fi client devices 16, connectivity data, performance data, data usage, etc. The application-related data is used to understand the current and future needs of a Wi-Fi network. FIG. 17 is a graph of data usage over time for a particular Wi-Fi network. Of note, the cloud-based Wi-Fi monitoring system 600 has visibility, in the cloud 12, of application usage over time for different types of applications for each Wi-Fi client device 16. This provides an ability to make predictions that lead to actionable insights that are described herein.

The third-party data can include utility-related data, weather data, partner APIs, scheduled maintenance events by service providers, sports schedules, etc. The objective of the third-party data is to provide external data that is useful with respect to the operation of the Wi-Fi networks. Simple examples include a storm potentially causing a future service outage, utility work in the area causing a service outage, a major sporting event causing high-bandwidth usage, etc.

The customer support data relates to service calls from the users/owners of particular Wi-Fi networks. The customer support data can include service calls and associated information. The customer support data can also include statistics such as CIR, TRR, TTR, NPS, CSAT, etc. Call in Rate (CIR) relates to customer support calls. Truck Roll Rate (TRR) relates to escalations of customer support calls that convert into a technician visit to the customer site. Time to resolution (TTR) is the average time it takes customer service representatives to resolve a ticket opened by a customer. Net Promoter Score (NPS) is a tool for measuring customer loyalty based on their likelihood to recommend your product, service or company to friends and colleagues. Customer Satisfaction Score (CSAT) is a tool for measuring customer satisfaction at certain touchpoints, usually based on survey feedback.

Predictions

With all of the input 602, the cloud-based Wi-Fi monitoring system 600 includes the ML and AI engine 604 to perform various machine learning techniques to analyze the data. Those skilled in the art recognize there are various machine learning techniques known in the art, any of which are contemplated herein. Generally, machine learning operates by using a data set to train a machine learning model and then using a trained machine learning model to generate predictions based on input data. The goal of the predictions is to look at current data to make future predictions for the outputs 608.

The present disclosure describes several prediction use cases, and the cloud-based Wi-Fi monitoring system 600 can be configured to implement one or more of these use cases. The use cases include proactive monitoring, actionable alerts, at-risk customer predictions, autonomous workflow, etc. These use cases can be services, i.e., cloud services, offered through the cloud-based Wi-Fi monitoring system 600.

The proactive monitoring provides end-to-end visibility of a network operator's network. This can include a Graphical User Interface (GUI) dashboard that enables tracking of relevant metrics and controlling the network. A network operator would use proactive monitoring to view and manage their end customer's Wi-Fi networks.

The actionable alerts provide alerts when customized thresholds are breached. The alerts may include proactive notifications to customers.

The at-risk customer predictions relate to churn prediction from who (customers) and why (reasons). This enables a network operator to proactively know which customers are likely to call or are at risk of churning (i.e., canceling their service). The objective here is to perform some action before the customer reacts. An objective here is to identify customers more likely to call customer support due to key metrics, generate customer cohorts likely to call due to each alarm type, etc.

The autonomous workflow includes autonomous self-help for customers that are proactively initiated. The autonomous workflow can be triggered with recommended solutions to the most common customer issues.

With the proactive notifications, the at-risk customer predictions, and/or the autonomous workflow, an objective is to reduce customer support call volume—keeping customers happier, reducing churn, reducing operating costs, etc. The goal is to reduce or even eliminate customer support calls, truck rolls (on-site technician visits), and customer complaints. For example, using insights generated from trillions of data points to be proactive in resolving customer issues. This can turn customer support calls into calls out (or emails, text messages, push notifications, etc.).

Another of the outputs 608 can include a customized intelligence report for a network operator that provides insights such as when the network is offline, when there is high congestion, when the network is unstable when/where there is poor coverage, who is likely to call, etc. This can also include a comparative analysis to other network operators.

The cloud-based Wi-Fi monitoring system 600 is for proactively enhancing customer experience, proactively determine problems, proactively implement solutions, identify trends of issues across entire deployment, and proactively recommend new products and services.

Location-Based Aspects

In an embodiment, the cloud-based Wi-Fi monitoring system 600 includes location-based aspects in the monitoring. The location-based aspects include a determination of a specific location of each Wi-Fi network, clustering or grouping Wi-Fi networks based on their specific locations, segmenting the Wi-Fi networks by the network operator (ISP), and performing various monitoring and targeting based on the location.

First, each Wi-Fi network (i.e., the distributed Wi-Fi system 10, the single access point system 30, the Wi-Fi mesh network 32, or the Wi-Fi repeater network 33) has a specific location. The access points 14 in these networks can be referred to herein as nodes. The location can be determined from a user account with the network operator, i.e., service address. However, this information may not be readily available to the cloud-based Wi-Fi monitoring system 600. In an embodiment, the cloud-based Wi-Fi monitoring system 600 can use an Internet Protocol (IP) address of the modem/router 18 to determine the location of the associated Wi-Fi network. One such approach includes GeoIP, which can pinpoint a location based on the IP address and a database. Another approach to the location can include obtaining location information from mobile devices that are Wi-Fi client devices 16 in the Wi-Fi network, such as via Global Positioning Satellite (GPS). For example, the Wi-Fi client devices 16 as a mobile device or the like can execute an application ("app") which can forward this information to the cloud 12 for the cloud-based Wi-Fi monitoring system 600. Of course, multiple approaches can be used together to verify the location.

The Wi-Fi networks monitored by the cloud-based Wi-Fi monitoring system 600 can be grouped together. One example approach to grouping can be via zip code. For example, the location of each Wi-Fi network can be translated into a zip code. Other clustering or grouping approaches are contemplated, e.g., city, region, etc. For example, the Wi-Fi networks can be clustered based on latitude and longitude, independent of the zip code, and can be segmented by internet service provider. In embodiments, the geographical groupings can be hierarchical descending from a larger region to a smaller region, such as country, state, city, zip code, and the like.

With the location of each Wi-Fi network and the data 602, the cloud-based Wi-Fi monitoring system 600 can proactively monitor for outages. In an embodiment, ISP outage can be detected in a geography by detecting the connection for the Wi-Fi networks in the geography to the cloud 12 is down. This can also include a check to distinguish between the Internet being down versus the cloud service going down; it is possible to query several sites, and if all are down, the Internet is down for this Wi-Fi network, but if some are up, the cloud 12 has failed.

The cloud-based Wi-Fi monitoring system 600 is also able to distinguish between a network outage and a power outage. Specifically, a network outage is determined when the cloud-based Wi-Fi monitoring system 600 detects multiple Wi-Fi networks from a same network operator are down in a geography, i.e., the network is out in the geography. On the contrary, a power outage is determined when the cloud-based Wi-Fi monitoring system 600 detects multiple Wi-Fi networks from multiple network operators are down in the geography.

Additionally, the cloud-based Wi-Fi monitoring system 600 can enable location-based targeting of ads and services to a given home—service independent—based on the location of the modem/router 18, can be applied across all services that come to the home.

Wi-Fi Metric-Based Alarms

The cloud-based Wi-Fi monitoring system 600 can provide a dashboard for various Wi-Fi metric-based alarms. The following describes various alarms as well as how they can be determined by the cloud-based Wi-Fi monitoring system 600.

For detecting an offline Wi-Fi network, the cloud-based Wi-Fi monitoring system 600 can raise this alarm based on a determination of interruption of delivery of the statistics from the Wi-Fi network to the cloud 12, missing heartbeat messages from the Wi-Fi network, and/or attempting to communicate with all nodes in the Wi-Fi network to determine all of the nodes are offline.

For detecting offline nodes in a Wi-Fi network, the cloud-based Wi-Fi monitoring system 600 can raise this alarm based on a determination of interruption of delivery of the statistics from a particular node the Wi-Fi network to the cloud 12, and/or based on hitting a threshold of delivery consistency specific to the device.

The cloud-based Wi-Fi monitoring system 600 can raise an unstable network alarm for a particular Wi-Fi network. An unstable network can be determined based on any of too many optimizations in a given time period, too many device reconnections, too many probes from Wi-Fi client devices 16, topology deviations, and nodes going offline.

The cloud-based Wi-Fi monitoring system 600 can raise high congestion/interference alarms. This can be determined from interference scores, neighbor interference judged separately from self-interference, a number of neighbor nodes, and collisions in the wireless layer.

The cloud-based Wi-Fi monitoring system 600 can raise a poor coverage alarm. The poor coverage can be based on low signal strength, factoring the percentage of time that Wi-Fi client devices 16 are at low signal strength and percentage of Wi-Fi client devices 16 that are in that state, and factoring the percentage of time the home (the entire Wi-Fi network) is in the poor coverage state.

The cloud-based Wi-Fi monitoring system 600 can raise a poor Quality of Experience (QoE) alarm. Poor QoE can be based on location wide QoE synthesized from the individual device QoEs throughout the home, and looking across multiple time periods to declare location wide QoE alarm.

The cloud-based Wi-Fi monitoring system 600 can raise speed-related alarms, such as based on speed tests, a comparison of the broadband speed (i.e., from the provider to the modem 18) relative to node speed, based on speed tests run within the home, etc. Speed can be used for the network operator for possible upsell of services.

The cloud-based Wi-Fi monitoring system 600 can raise device connectivity alarms, such as based on too many device reconnections and too frequent probes from devices. The cloud-based Wi-Fi monitoring system 600 can raise device stability alarms, such as based on Tx/Rx patterns for stability, the factors above for determining device connectivity stability, and device throughput performance.

The cloud-based Wi-Fi monitoring system 600 can include a dashboard for communication/thresholding of alarms. The alarms can be presented as binary (yes, no), as multi-level (red, yellow, green), as a continuous score, etc. Various thresholds can be set by assessing correlation to actual call in rate, the fraction of locations that fall into the alarm state, etc.

Call in Rate (CIR) Predictor and Buster

Figures 18, 19:
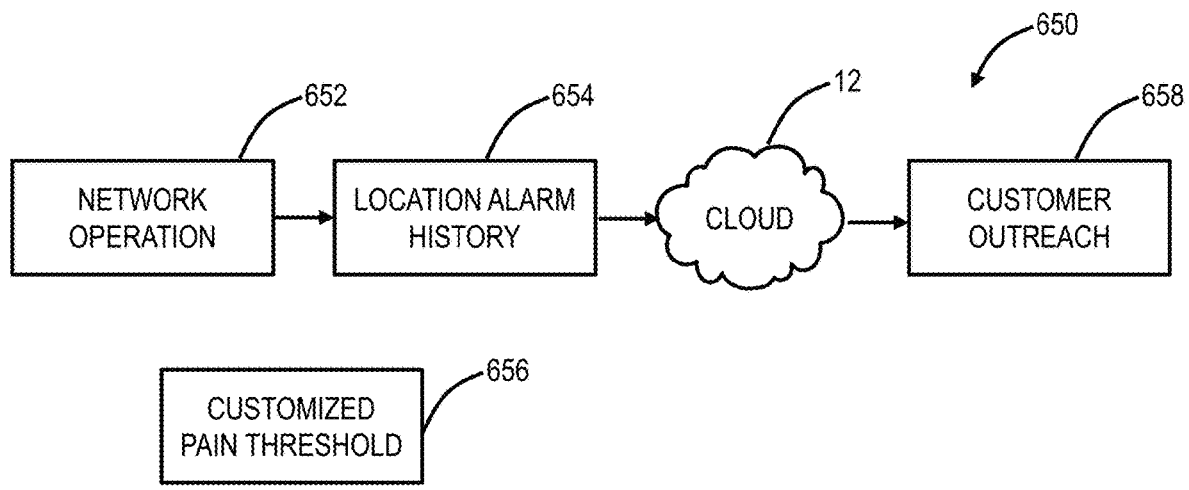
FIG. 18 is a flow diagram of a Call in Rate (CIR) predictor process.
FIG. 19 is a screenshot of an email notification of an outage in a geographic region.

FIG. 18 is a flow diagram of a Call in Rate (CIR) predictor process 650. The cloud-based Wi-Fi monitoring system 600 can implement the predictor process 650 to reduce or eliminate customer support calls from customers. The goal is to change calls in for support to calls out for notification. Of course, the calls out can be email, phone calls, text messages, push notifications, etc.

The predictor process 650 looks at network operation (step 652) and location alarm history (step 654) in the cloud 12, compared to customer pain thresholds 656, to provide customer outreach (step 658). The customer pain thresholds 656 are set for some or all of the alarms looking at the likelihood these would cause a customer to call.

The predictor process 650 can include correlating factors to CIR in a machine learning model. These can include the correlation of alarm conditions to CIR—coverage and congestion correlated to CIR and type of customer. The type of customer can be based on call frequency (repeat caller versus first-time caller), customers with many devices that are streaming or high bandwidth requiring devices, customers with more nodes, customers with many smart devices, customers with high Internet access speed, etc. The machine learning model can look at correlation over a specific time period—x days before calling in, x days after they have previously called, etc. That is, the predictor process 650 can look, for training data, at call events in the past and compare to the network operation at the time to determine a machine learning model to predict future calls.

The network topology can also be an input to the predictor process 650. Poor node placement can be determined based channel gain between nodes. There can also be external factors from the third-party data, e.g., weather, events (e.g., Super Bowl).

The machine learning model can look at anomaly detection for CIR, stability, etc. This can be relative to time of day, day of week, holiday events, etc., and can be applied to any metric or alarm or combination thereof.

Figure 20:
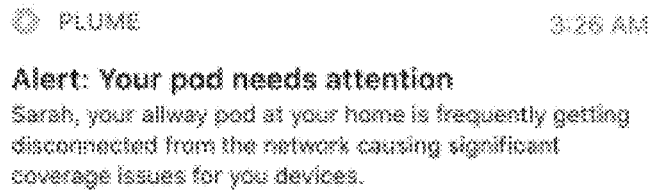
FIG. 20 is a screenshot of a push notification for a node outage.
Figure 21:
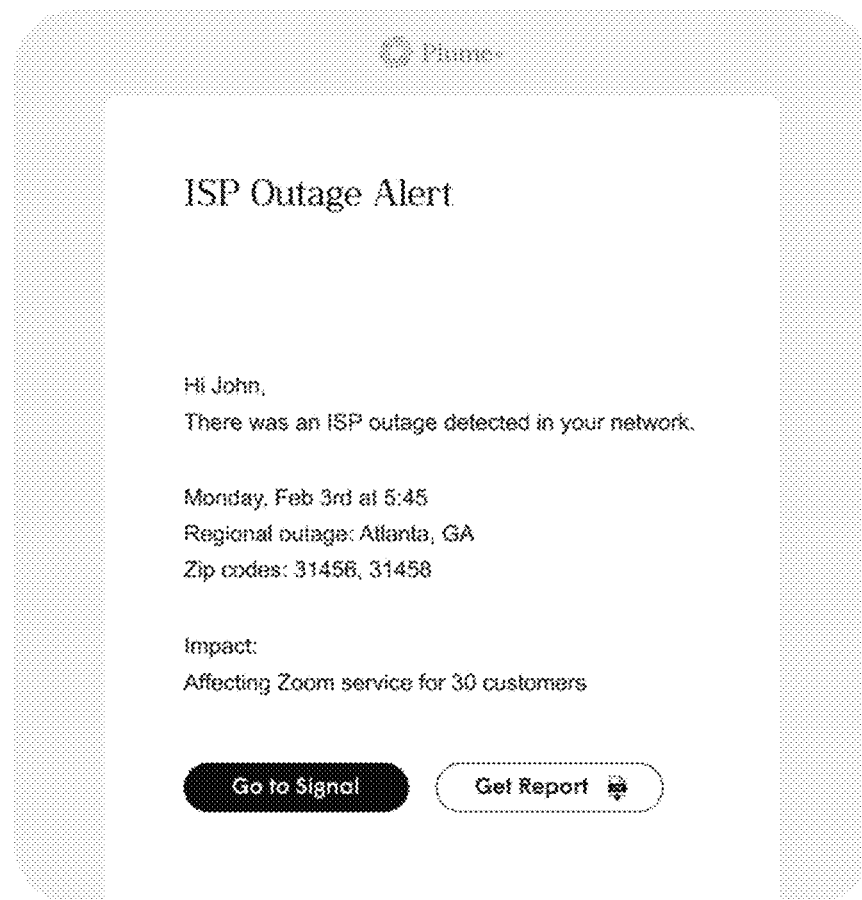
FIG. 21 is a screenshot of a service provider outage with the impact.
Figure 22:
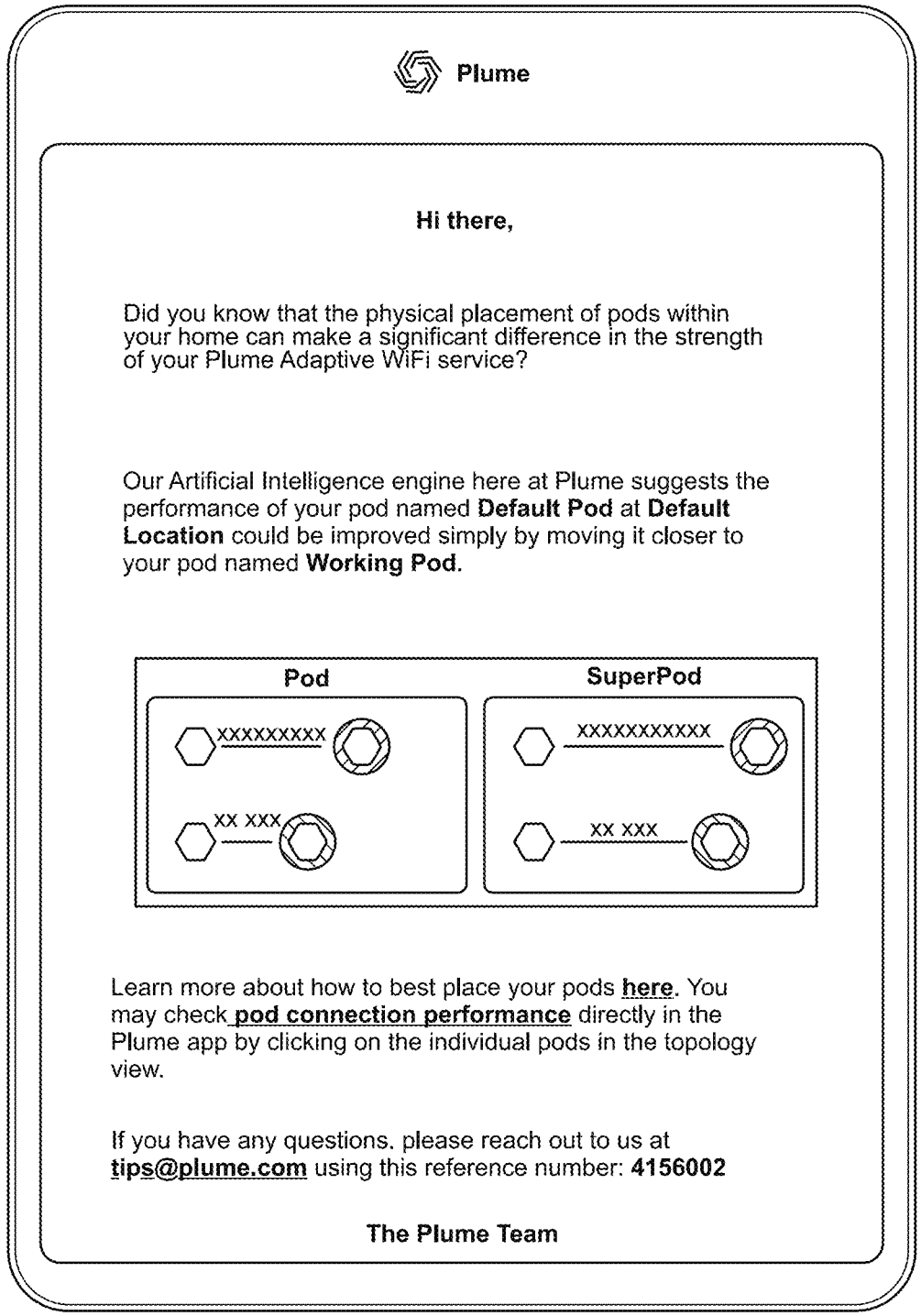
FIG. 22 is a screenshot of a recommendation to move nodes in a Wi-Fi network to improve performance.

The customer outreach can be automated including automated notifications. In embodiments, autonomous workflows are enabled that inform the end consumer about outages affecting the end consumer's user experience, scheduled maintenance of the ISP infrastructure, downtimes of the cloud based Wi-Fi network controllers, local Wi-Fi network topology and optimization issues, or any similar notifications to inform the end consumer about any local, regional, and global issues potentially affecting the end consumer's service. FIG. 19 is a screenshot of an email notification of an outage in a geographic region. FIG. 20 is a screenshot of a push notification for a node outage. FIG. 21 is a screenshot of a service provider outage with the impact. FIG. 22 is a screenshot of a recommendation to move nodes in a Wi-Fi network to improve performance.

The objective of the predictor process 650 is to notify the customer before the customer calls customer support. By notifying the customer about issues affecting the customer's service, the CIRs are reduced as an informed customer is less likely to call in to the network operator. The cloud-based Wi-Fi monitoring system 600 can provide this as a service to network operators. Customers who are notified of problems will be less disgruntled and feel "in-the-loop" versus having to call the network operator to complain.

In an example, ISP speed management alerts can be used for detecting a temporary tier increase to customers/times that customers are likely to call and complain. Here, the ISPs can know which houses are under provisioned—speed they are getting is lower than what was promised.

Churn Predictor

The cloud-based Wi-Fi monitoring system 600 can also provide a machine learning model to predict churn, namely customers who are likely to cancel their service. The machine learning model can be trained with data labeled between customers who have canceled service, changed service, or maintained their service. Once trained, the machine learning model for churn can be run by the cloud-based Wi-Fi monitoring system 600 to detect/identify at-risk customers. Factors related to churn can include customer engagement, customer usage, call-in rates, Truck Roll Rates, mobile app usage patterns, NPS from the household, outages, poor performance, duration of time spent in the alarm state, frequency of alarms, severity of alarms, etc.

With the identification of customers at risk, the network operator can ensure their service is maintained, provide targeted offers, reach out, etc. The goal is to keep the customer.

NPS Score Predictor

NPS is a metric used to determine how likely a customer is to recommend a service or product. This can also be predicted by the cloud-based Wi-Fi monitoring system 600, using similar factors as with the churn. However, NPS is different from churn in that NPS is filled out only at certain times, period immediately preceding survey time are most important, and factor correlations for churn and NPS may be different.

Machine Learning Training

The various use cases described herein can each have their own machine learning model that is trained with relevant data. The models can learn in real-time as data is coming in or learn in batch offline. The training data can include historical support tickets and the like.

Alert Management

The cloud-based Wi-Fi monitoring system 600 can provide alerts via batch processing periodically, real-time, via communication, using email, push notifications, text messages, in-app notifications, Ticket including third party support app (e.g., Zendesk), etc. Tickets can be generated automatically based on exceeding a threshold. Tickets may be home-specific, but the ticket might also be related to an aggregated issue and surfaced only to the ISP rather than to the individual. Also, ISP customer alerts different from end consumer alerts. That is, the cloud-based Wi-Fi monitoring system 600 can alert the network operator as well as the end customers of the network operators.

In an embodiment, the cloud-based Wi-Fi monitoring system 600 can manage the alerts based on the most effective method. That is, the cloud-based Wi-Fi monitoring system 600 can track engagement, the opening of emails, clicking on links/content of a message, action taken on a message, etc. The cloud-based Wi-Fi monitoring system 600 can further utilize customer feedback about whether the notification helped.

In another embodiment, the cloud-based Wi-Fi monitoring system 600 can be used by technical support when a customer calls in for support. The cloud-based Wi-Fi monitoring system 600 can provide a location-based history of alerts (in the NOC/service dashboard), a recommendation engine—rules-based recommendation engine based off conditions and alarms in network and pre-filled out support tickets on the basis of alarms, which if the person calls are helpful and could be archived if the person does not call.

Resolution Approaches

For multi-access point networks, such as the distributed Wi-Fi system 10, one resolution approach can include moving node placement. The following describes recommendations that can be provided to customers, such as via the notifications shown in FIGS. 19-22. First, the customer can be requested to move nodes if there are too many optimizations, low signal strengths, orphan nodes, etc. Second, the customer can be directed to check for a parallel network, namely another Wi-Fi network in the same home, perhaps with the same username and password. Third, the customer can be directed to check for a lonely network, namely one where no devices are connecting to the cloud 12—they are staying on another network in the home. Fourth, the customer can be directed that a node has been offline for a while and directed to check (e.g., plug the node back in). Fifth, if there is an extended internet offline, the customer can be directed to check with the ISP, check modem connection, cable connection, etc. Finally, if there is a speed drop, the customer can be directed to reboot the modem/gateway, complain to the ISP, etc.

Dashboards

Figure 23:
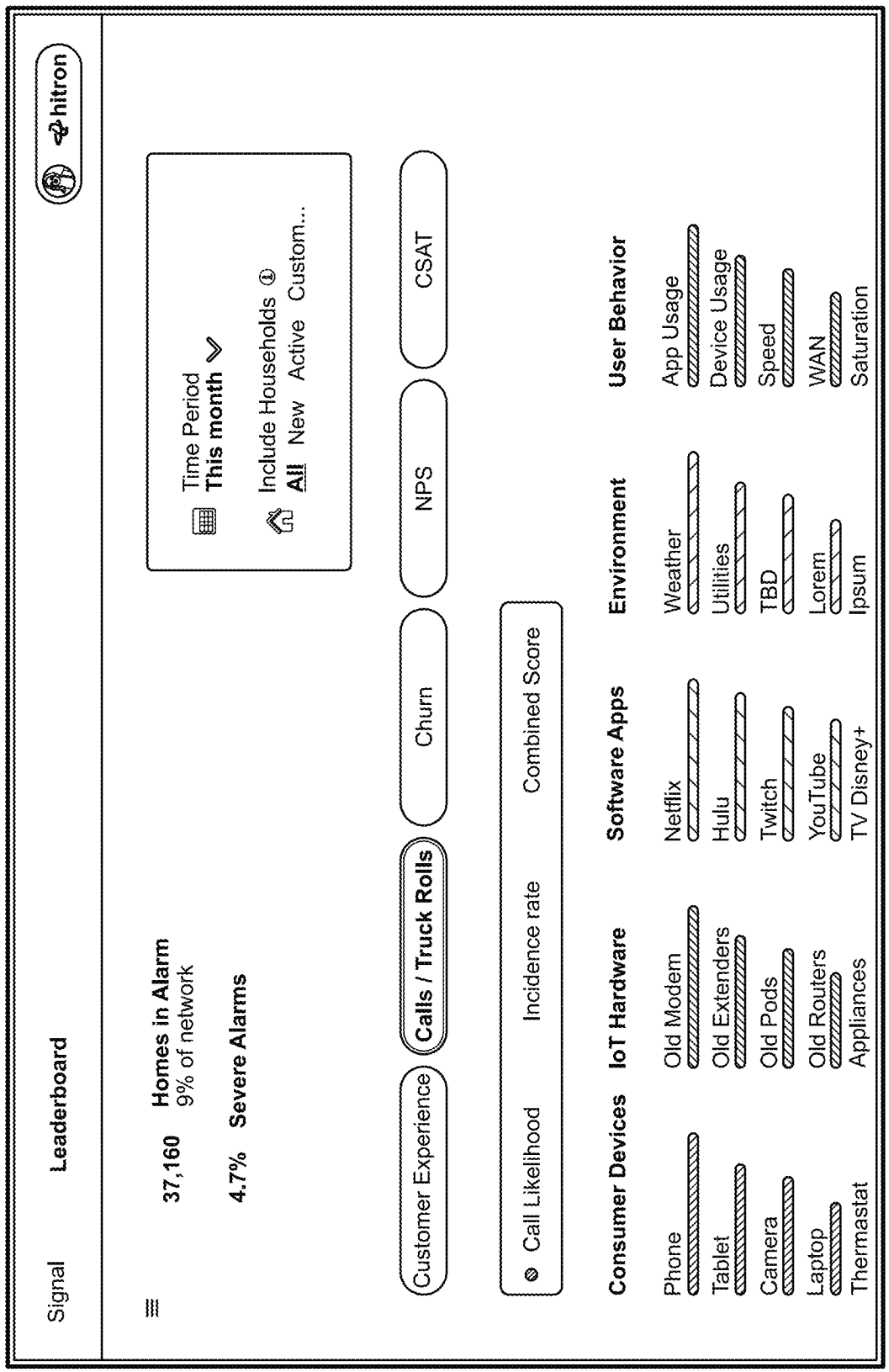
FIG. 23 is a screenshot of a dashboard related to the different use cases, namely customer experience, CIR (calls/truck rolls), churn, NPS, and CSAT.

FIG. 23 is a screenshot of a dashboard related to the different use cases, namely customer experience, CIR (calls/truck rolls), churn, NPS, and CSAT. In particular, the dashboard in FIG. 23 illustrates a GUI, such as a web interface or mobile application, that summarizes root-causes of all the customer feedback (CIR, Truck-Roll, Churn, NPS, CSAT). In the embodiment illustrated in FIG. 23, the dashboard segments the volume of the customer feedback for various feedback channels into root cause segments, such as consumer devices, IOT hardware, software Applications, external outages, environment, user behavior, and the like. Further, the dashboard can provide the total number of end user Wi-Fi networks that have triggered an alarm and the percentage of those that have triggered a severe alarm.

Figure 24:
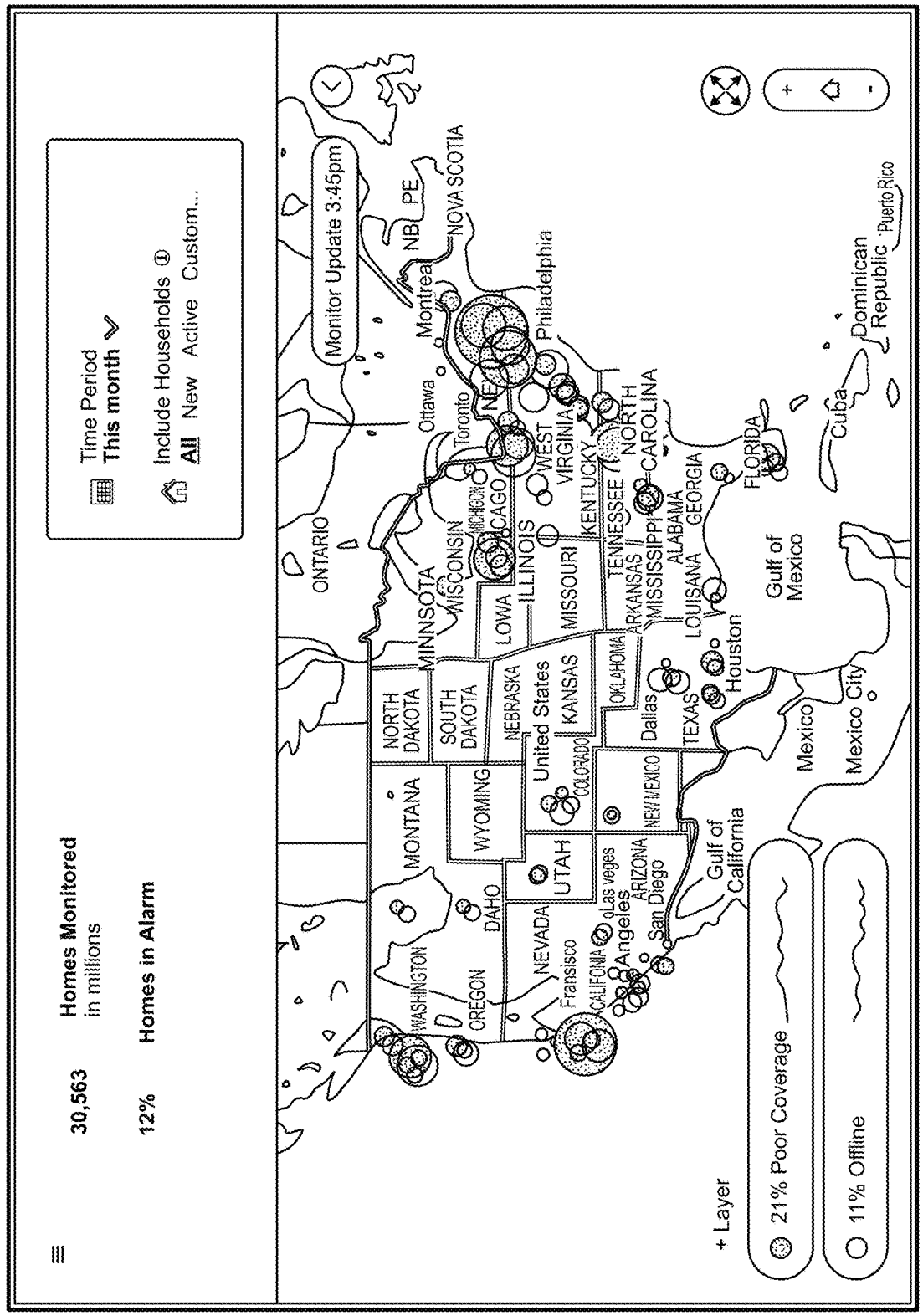
FIG. 24 is a screenshot of a dashboard with a network map illustrating visualization of Wi-Fi network performance.
Figure 25:
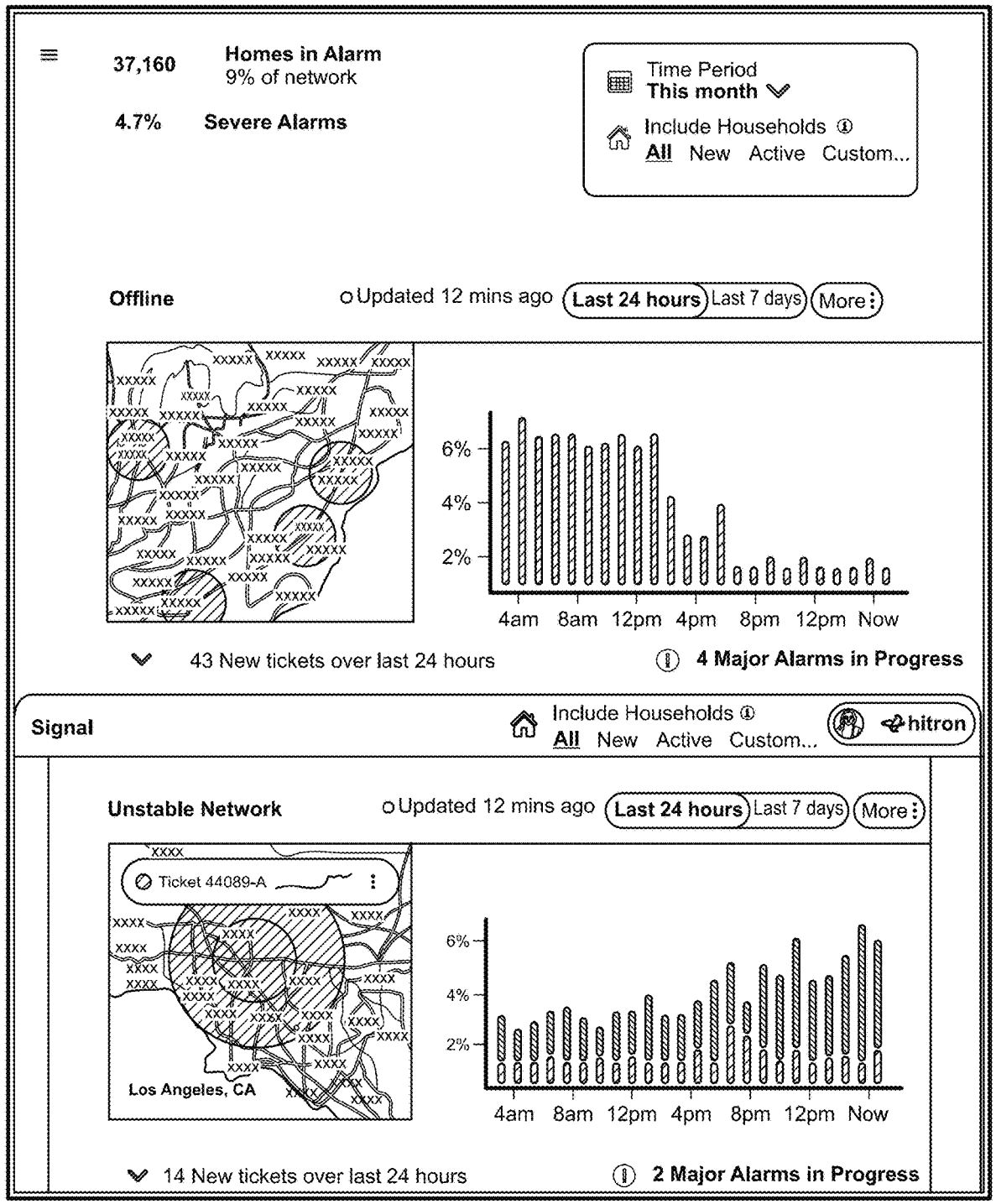
FIG. 25 is a screenshot of another dashboard illustrating a subset of the map and a graph of performance.
Figure 26:
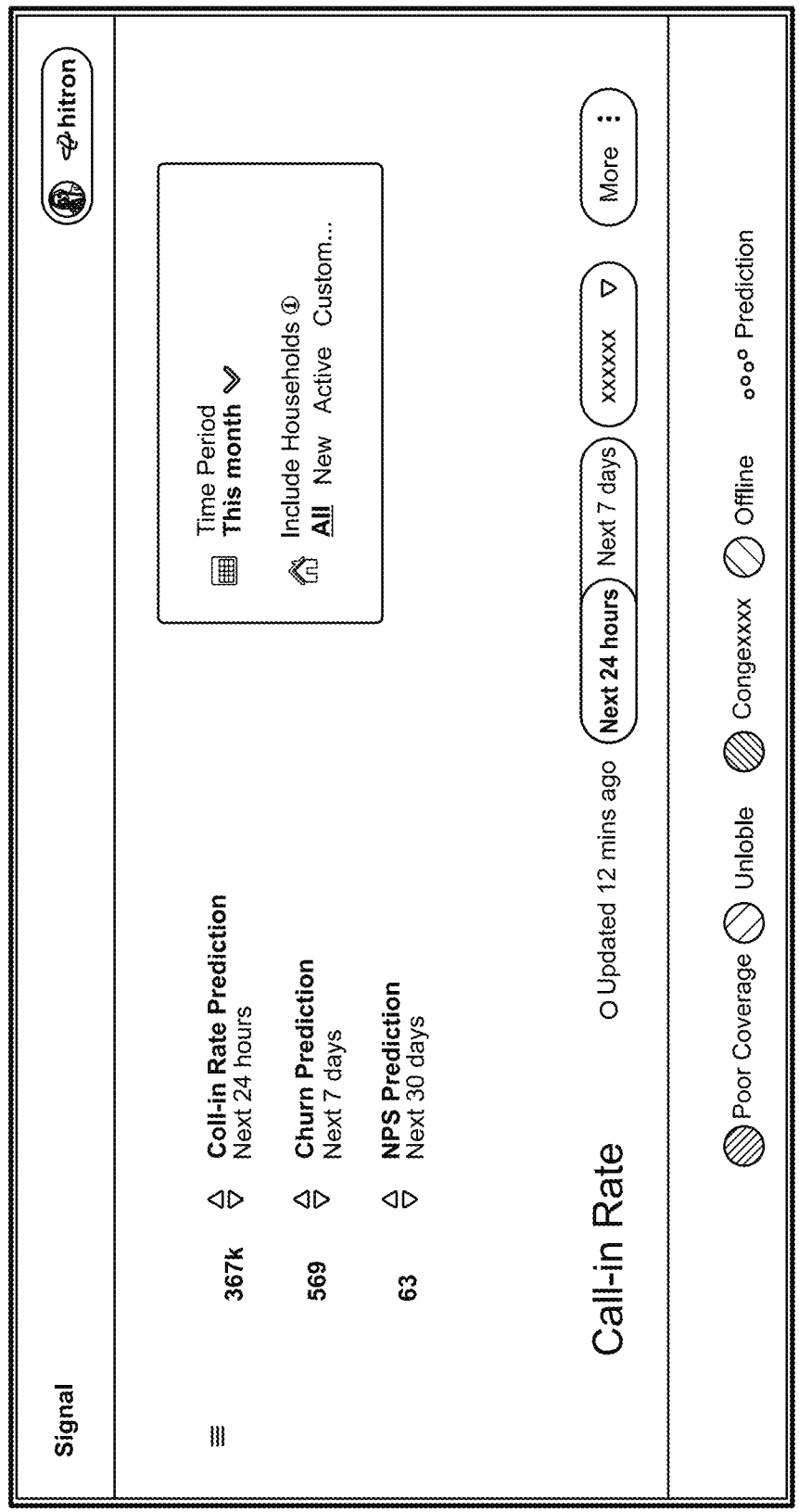
FIG. 26 is a screenshot of an alert dashboard.
Figure 27:
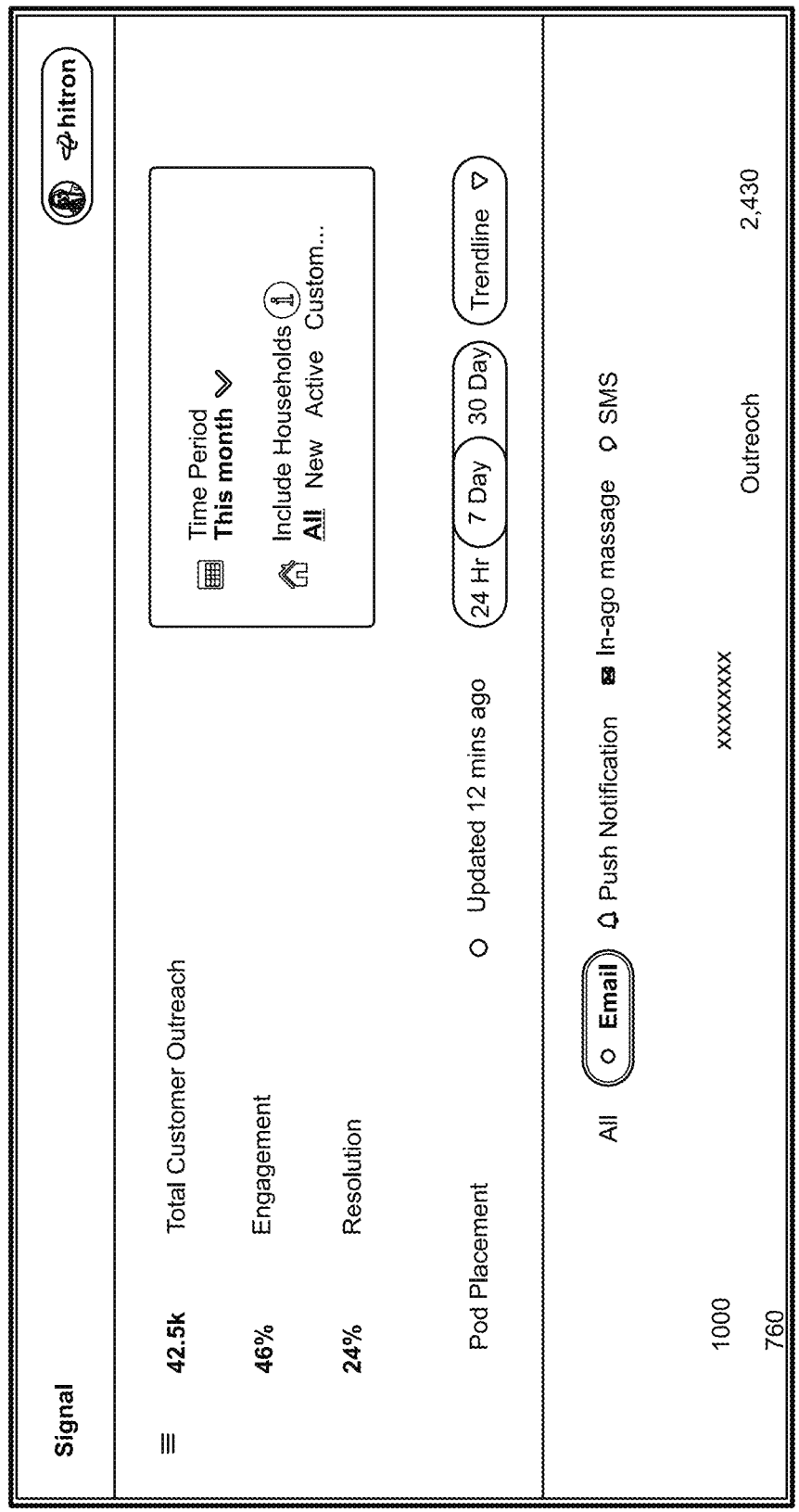
FIG. 27 is a screenshot of a resolve dashboard.

FIG. 24 is a screenshot of a dashboard with a network map illustrating visualization of Wi-Fi network performance. FIG. 25 is a screenshot of another dashboard illustrating a subset of the map and a graph of performance. FIG. 26 is a screenshot of an alert dashboard. FIG. 27 is a screenshot of a resolve dashboard.

The cloud-based Wi-Fi monitoring system 600 can include four types of dashboards, namely Monitor (FIG. 24), Predict (FIG. 25), Alert (FIG. 26), and Resolve (FIG. 27).

The monitor dashboard can include filtering by cohort for the map as well as the illustration of trends from time series. There can be a separate panel for each alarm type, and a user can cycle through them and bring them to the front. Each panel can include a hero stat of percentage in that alarm, and each has a map that shows the locations of the alarms. The bottom of each panel can include a chart to alert changes over time. A side panel can include CIR, trend analysis, Churn, and NPS can be added. The side panel can be consistent across all of the dashboard.

The dashboard can illustrate contextual performance to summarize trends that are important. This can be automatically generated and can bring in information that is outside of the dashboard, e.g., can give stats about only the locations that were recently onboarded. The hero states at the top of the dashboard illustrate the overall # of monitored homes and total # of homes in one kind of alarm or another. CIR and each alarm can have predicted extensions to the time graph (marked in a different color and marking). Another view can show the number of tickets (contacts) from customers associated with a particular alarm—these include both the tickets that are generated by us related to alarms, but also can be tickets that came from customer contact and were labeled.

The alert dashboard highlights sub-groups of all the information that was on the monitor dashboard. This can be provided based on the intelligent selection of events that are going on including grouping of geographically correlated offline devices; any time that alerts are grouped across cohorts—geography, time, new versus old customers, hardware, service type, etc. The graph is present, which represents cohort portion of the problem.

The predict dashboard focuses on the prediction of CIR, truck roll rate, churn, poor NPS scores, etc. The predict dashboard focuses on the time series of those with the extensions going forward. The predict dashboard can include an estimated calculation of money saved on a time series basis.

The solve dashboard includes tracking of generation, engagement, and resolution of customer self-help outbound contacts. The solve dashboard can include counts of the different types of contacts that were sent over the past x time. For each contact type (e.g., node placement versus outage), separate counting of engagement (opened email), and resolution (problem was fixed—alert went away). These are graphed with circular graphs indicating percent completion. A user can click on the circular graph and see a time-series graph of it—also shows a map of where those things are. The solve dashboard can include overall hero stats of outreach, engagement, resolution, potentially different levels of engagement—open, click, took action, and an ability to filter these by cohort.

There can also be dashboard control to maintain allow list and block list of customers to remove or prioritize in the dashboard, allow or block alerts, set thresholds, customer cohort selection including new, repeat, likely to churn, VIP, new HW, new service added, newly upgraded, service level (network speed), # devices, IoT devices, geography, etc.

A user can navigate through the maps by clicking on the map to navigate to a particular cluster of users with the given issue. There can be a whole map view, e.g., the entire U.S., and the map can be zoomed to a cluster as well as to one particular location.

Data behind the dashboards is downloadable or exportable and can be used to start a campaign.

Product Upsell

The cloud-based Wi-Fi monitoring system 600 can also be used for upsell recommendations, e.g., buying additional nodes, between hardware, etc. These factors can include other factors than just signal strength or node placement, e.g., # devices, # streaming devices, coverage, poor QoE, node placement alarms, poor alarm scores overall, and network speed tests, particularly relative to broadband speed.

One example of service upsell can be via a Wide Area Network (WAN) saturation alert that compares the ISP speed to the WAN port throughput. This can be a trigger for service upsell.

Network Quality Monitoring

In an embodiment, the cloud-based Wi-Fi monitoring system 600 can be used to track how well new software releases, or new types of hardware (Wi-Fi and broadband) are doing for customers—comparing across different cohorts and across time. This can include historical tracking, graphing to determine if releases are degrading network behavior and automatic thresholding of changes.

Call-Out Manager

As described above, the cloud-based Wi-Fi monitoring system 600 is configured to proactively monitor Wi-Fi systems and networks including distributed Wi-Fi systems with cloud-based control and management, issue alarms, predict customer dissatisfaction and call-ins, detect issues with end-user Quality of Experience and Quality of service, detect local Wi-Fi optimization issues, instability of the local Wi-Fi networks, and the like.

As noted above, the cloud-based Wi-Fi monitoring system 600 is configured to initiate customer outreach to proactively troubleshoot and resolve issues affecting the end-user. In embodiments, the cloud-based Wi-Fi monitoring system 600 is configured to initiate network wide troubleshooting workflows to resolve identified issues. The workflows are issued based on any of the issues, alarms, predictions, and the like, disclosed herein. In embodiments, workflows are issued based on a threshold or combination of thresholds being reached for any of the issues, alarms, predictions, and the like, disclosed herein.

In embodiments, the workflows include initiating customer outreach. Such outreach can be to a single end-user or to a group of end-users as part of a consumer outreach campaign to proactively resolve an issue affecting multiple end users. In embodiments, a GUI, such as a web interface or a mobile application, is provided by the cloud-based Wi-Fi monitoring system 600, which is configured to receive a selection of one or more workflows from an ISP representative, allowing the ISP to initiate the troubleshooting workflows. This GUI can be included in any of the dashboards disclosed herein or in a separate dashboard altogether. In some embodiments, the workflow initiation is AI driven and is performed by the ML and AI engine 604 of the cloud-based Wi-Fi monitoring system 600. In further embodiments, a combination of AI driven selection and ISP selection of the workflows is performed.

Figure 28:
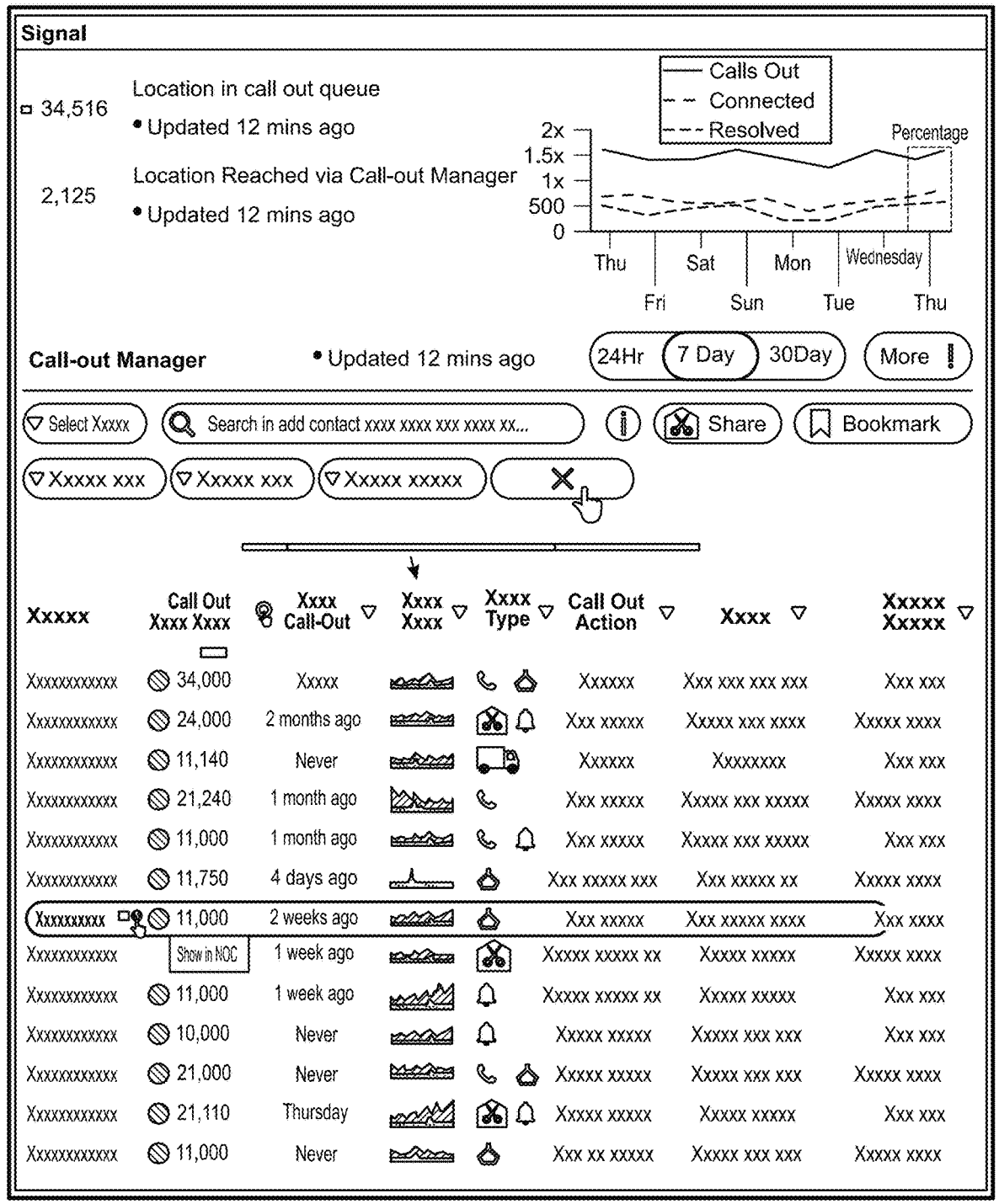
FIG. 28 is a screenshot of a call-out manager dashboard.

FIG. 28 is a screenshot of a call-out manager dashboard. In embodiments, this dashboard is included in the GUI for the call-out manager. The call-out manager dashboard provides a graphical representation of the number of call-outs made, the number of connections made, and the number of call-outs resolved for a selected timeframe. The timeframe can be over the last 24 hours, the last week, the last month, and the like. Furthermore, this graphical representation can include a predicted number of callouts, connections, and call-outs resolved. In embodiments, the call-out manager dashboard also includes the number of locations currently in a call-out queue and a total number of locations reached via the call-out manager for the selected timeframe. In some embodiments, the call-out dashboard also includes a list of the call-outs made. This list is filterable by one or more of a timeframe of when the call-out occurred, a location, an alarm score, an alarm history, an alarm type, a call out action, a support agent, a number of nodes in the Wi-Fi network, a number of devices connected thereto, a firmware of the nodes, and the like.

By initiating customer outreach, issues can be identified and resolved at the symptom stage before the user experience is affected thereby. By so doing, the current industry standard of reactive call-in-support is replaced by a proactive call-out-support paradigm that keeps the end-user informed and resolves issues before those issues become problematic for the end-user. For example, upon determining that an access point pod of an end-user's Wi-Fi network is poorly positioned relative to other access point pods of the end-user's Wi-Fi network, a workflow is initiated to contact the end-user to help the end-user reposition the access point pod to a more optimal location. In embodiments, this contact is performed by a representative of the ISP calling the end-user to resolve the detected issue of the poorly positioned access point pod. In some embodiments, as illustrated in FIG. 22, this contact is performed via a message to the end-user from the cloud-based Wi-Fi monitoring system 600, such as via an in application message, a push notification, email, and the like. In some embodiments, the workflow includes sending a message to the end-user and then following up with a call from the ISP representative if the issue persists after the message is received by the end-user. Other workflow combinations are also contemplated.

ISP Outage Detection

Determining whether a location being offline as a result of an internet service provider (ISP) outage vs the location being offline for other reasons allows service providers the ability to resolve issues more quickly, as well as gather information on different ISPs. The present disclosure provides the ability to determine, given that a location is offline, whether there is an ISP outage. In general, locations can be offline due to many reasons such as devices being disconnected intentionally. An ISP outage can be defined as a situation which effects multiple customers due to failure of some element of the ISPs infrastructure. A key component of this differentiation is looking for multiple customers who are all offline at the same time, in order to distinguish an ISP outage vs multiple customers devices being offline intentionally.

In embodiments, detecting groups of customers experiencing an outage can be done by identifying multiple customers from the same ISP who may be experiencing an outage in the same geographic area. In some embodiments, this geographic area may be based on zip code, city, state, and others of the like. Different levels of geographic area (zip code, city, state, etc.) may be necessary when there is too few a number of customers in a geographic area. For example, if a particular zip code only has a small number of customers, it can be difficult to differentiate an ISP outage from devices being put offline intentionally, thus making it necessary to expand the geographic area in question.

A declaration of an ISP outage may be based on a number of factors such as the number of networks offline. The absolute number of customers offline in a given geographic area as well as a percentage of locations in a given geographic area that went offline can be used to declare an ISP outage. In some embodiments, if this percentage of offline customers/networks is above a predetermined threshold then the determination may be an ISP outage. This threshold may be set by performing statistical analysis in which the probability of random locations/customers being offline for a random reason is used to determine the likelihood of the percentage of locations/customers being offline in a particular geographic location. This calculation can be done in each geographic location such as zip code, city, state, etc. The threshold for being declared an ISP outage may be set by considering the acceptable statistical rate of false alarms. The threshold may also be derived from a set of training data, in which known occurrences of ISP outages were recorded and the characteristics of such occurrences were observed.

By running the algorithm periodically (e.g., every five minutes) the network can be constantly evaluated, and ISP outage occurrences can be quickly identified and resolved. In some embodiments, the results of the outage determination can be displayed on a map as to show the geographic locations in which an ISP outage may presently be. Advantageously, the present disclosure allows for automatic resolution if such an outage is detected and declared. Such resolution may include sending a notification such as a text message, push notification, or the like to individual customers. Additionally, notifications can be sent to the ISP for further identification and resolution procedures. A main feature of the present disclosure is the ability to differentiate a global outage (e.g., a power outage) from an ISP outage. One characteristic of a global outage is when multiple ISPs in the same area are experiencing outages and or other issues. In a scenario such as this, it may be determined as being a global outage and not considered an ISP specific outage. Such global outage conditions can be correlated to external conditions such as weather conditions and others of the like.

The present disclosure provides the ability to locate the geographic areas in which there may be an outage. With these geographic locations, specific network nodes can be identified as the cause of the outage and this information can be distributed to ISPs, providing critical information to ISPs.

The location identification of homes is done by geographic IP information, wherein the identified location is often not the location of the individual home but the coordinates of the node. The addresses of individual homes may also be obtained by user subscription information, or other location methods of the like. The covered area is found and traced to the nearest node for a specific ISP which can be discovered from information obtained from the ISP or geographic IP information.

The ability to look across multiple ISPs is unique such that it makes it possible to distinguish between a global ISP outage and an ISP outage which may be specific to a single or group of ISPs, which is not possible for an ISP monitoring their own network. With the ability to look across multiple ISPs, it is possible to compare outage rates between CSPs and inform the ISPs of these results. The results can be compared to web sites which use reporting from customers, social media, and other resources of the like.

Figure 29:
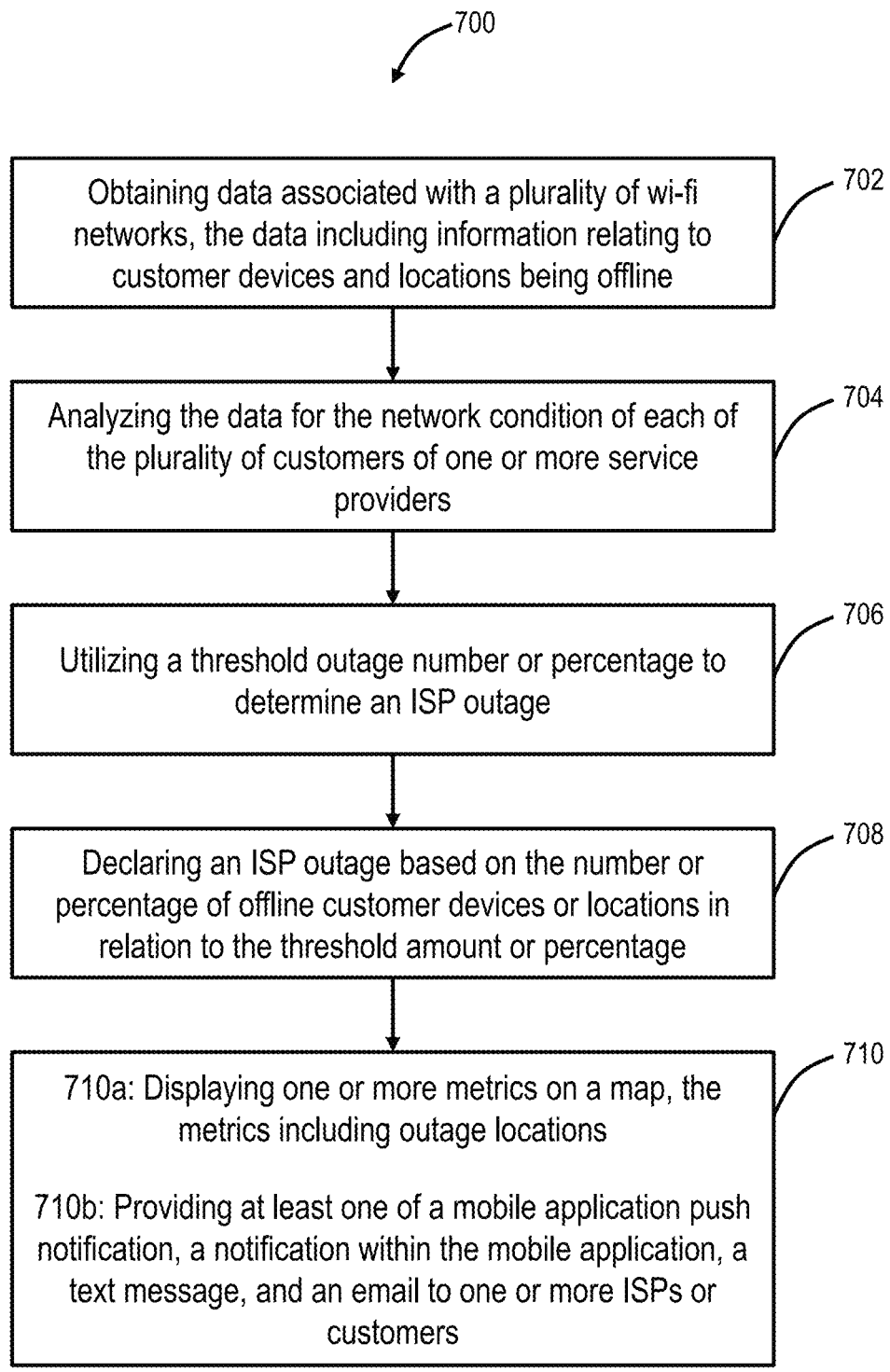
FIG. 29 is a flowchart of an ISP outage determination process.

FIG. 29 is a flowchart of an ISP outage determination process 700 of the present disclosure. To identify an ISP outage, data is obtained associated with a plurality of Wi-Fi networks, the data includes information related to customer devices and locations being offline. The data for the network condition of each of the plurality of customers of one or more service providers is analyzed. A previously determined threshold outage number or percentage is utilized to determine an ISP outage. An ISP outage is declared based on the number or percentage of offline customer devices or locations in comparison to the threshold amount. If the number or percentage of offline devices or locations is greater than the threshold, an ISP outage may be declared. Once an ISP outage is declared, the outage locations may be displayed on a map made available to customers and ISPs. Additionally, the customers and/or ISPs may be sent at least one of a mobile application push notification, a notification within the mobile application, a text message, and an email including information relating to the outage.

Information obtained from the process 700 may be stored. The stored information can contain outage data related to multiple ISPs, which can be used to compare outage rates between ISPs and individual nodes.

Predicting Likelihood of Subscriber Churn

Some pain points that service providers experience include knowing how to reduce time spent on issue resolution, limiting service calls and escalations, keeping end customers happy, prioritizing issue resolution, network update impact, and the like. These pain points lead to uncertainty about which customers are unhappy, at-risk, and why this lack of knowledge leads to a long and clumsy issue resolution process, leading to unaddressed or reactive support, which turns into customer churn (i.e., losing customers) and poor customer satisfaction ratings.

Figure 30:
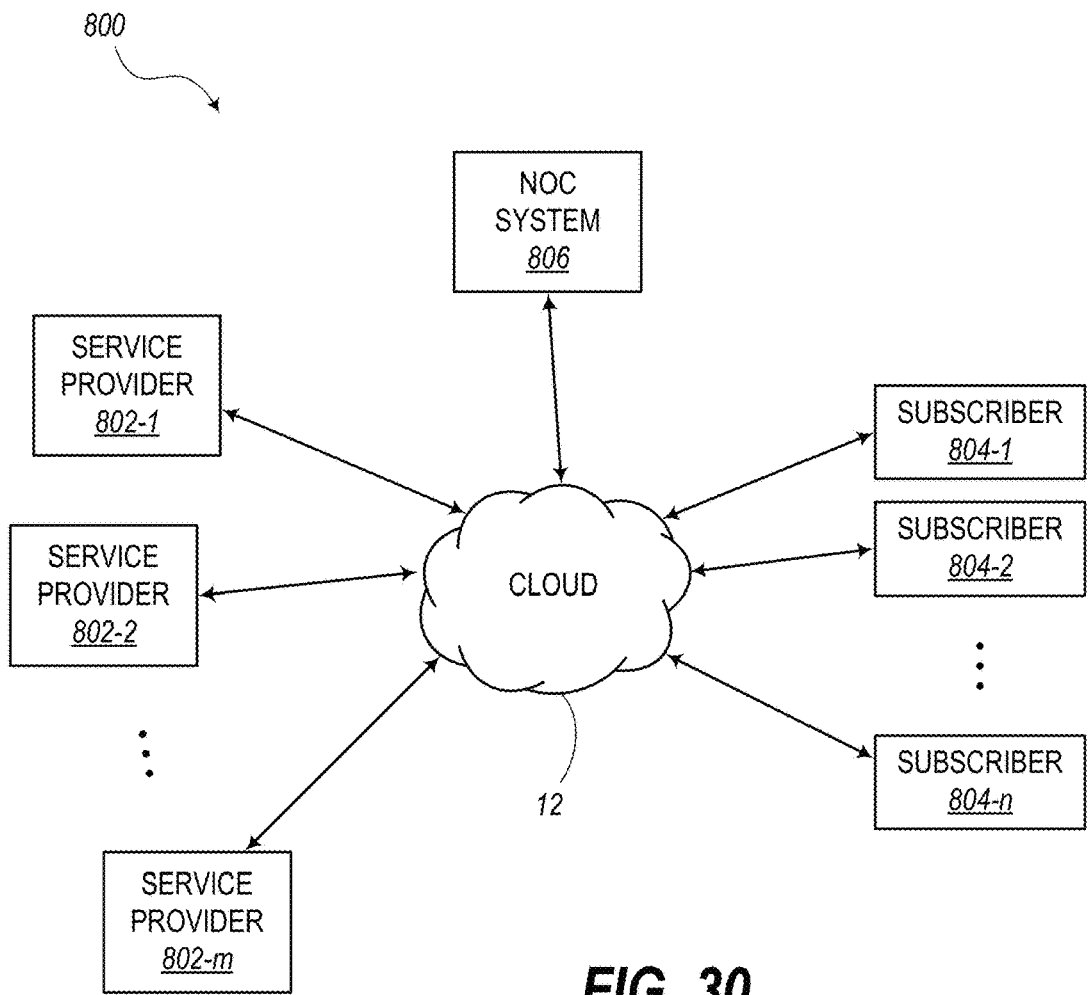
FIG. 30 is a block diagram showing an embodiment of a communication system.

FIG. 30 is a block diagram showing an embodiment of a communications system 800. As illustrated, the communications system 800 includes any number of service providers 802-1, 802-2, ..., 802-m. The service providers 802 may be Internet Service Providers (ISPs), Cloud Service Providers (CSPs), Infrastructure as a Service (IaaS) providers, Software as a Service (SaaS) providers, Platform as a Service (PaaS) providers, etc. The communications system 800 also includes any number of subscribers 804-1, 804-2, ..., 804-n (or subscriber systems), which are configured to receive services from the service providers 802 via the cloud 12. For example, each subscriber 804 may represent a network, such as a private network or Wi-Fi network, which may be configured to access servers via the cloud 12 according to certain subscription criteria, service agreements, etc.

In some embodiments, the communications system 800 further includes a Network Operations Center (NOC) system 806, which may be the same as or similar to the server 20, 200 described above. In other embodiments, the NOC system 806 may be part of or incorporated in one or more of the service providers 802. As described herein, the NOC system 806 may be a control device that is operated by a network administrator or technician. The NOC system 806 may be configured to predict the likelihood of subscriber churn. That is, the NOC system 806 may be configured to determine certain "impact factors" related to aspects of each network associated with each subscriber 804 that may have an impact or may influence the likelihood that each subscriber 804 (or owner of a subscriber network) may churn. Again, "subscriber churn" refers to a decision or action of the subscriber 804 to cancel, terminate, or not renew a subscription.

Figure 31:
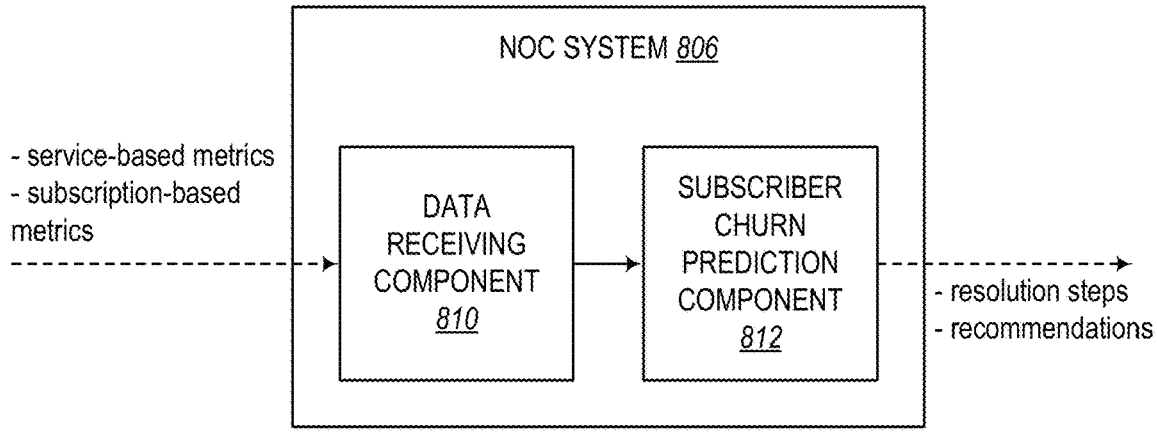
FIG. 31 is a block diagram showing an embodiment of a NOC system, such as is shown in FIG. 30.

FIG. 31 is a block diagram showing an embodiment of the NOC system 806 shown in FIG. 30. In this embodiment, the NOC system 806 includes a data receiving component 810 (or model), which is configured to receive service-based metrics and subscription-based metrics from each subscriber 804 network. In this way, the NOC system 806 may process and analyze the service-based and subscription-based metrics or data for each subscriber 804 to determine how likely the subscriber is to churn (e.g., cancel the respective subscription). Furthermore, the NOC system 806 includes a subscriber churn prediction component 812 (or model), which is configured to obtain the service and subscription data in order to determine the likelihood of subscriber churn. The subscriber churn prediction component 812 may be one of the programs 216 (and/or programs 316) described above. In some embodiments, the NOC system 806 may then use these subscriber churn predictions and provide resolution steps to attempt to resolve subscriber issues in an effort to retain the subscribers 804. These resolution steps may thereby counteract some negative experiences and reduce the likelihood of subscriber churn. Also, the NOC system 806 may also be configured to provide recommendations to a network administrator, network operator, customer service department, or other suitable personnel or team representing the interests of the service provider 802, so as to retain subscribers 804.

Figure 32:
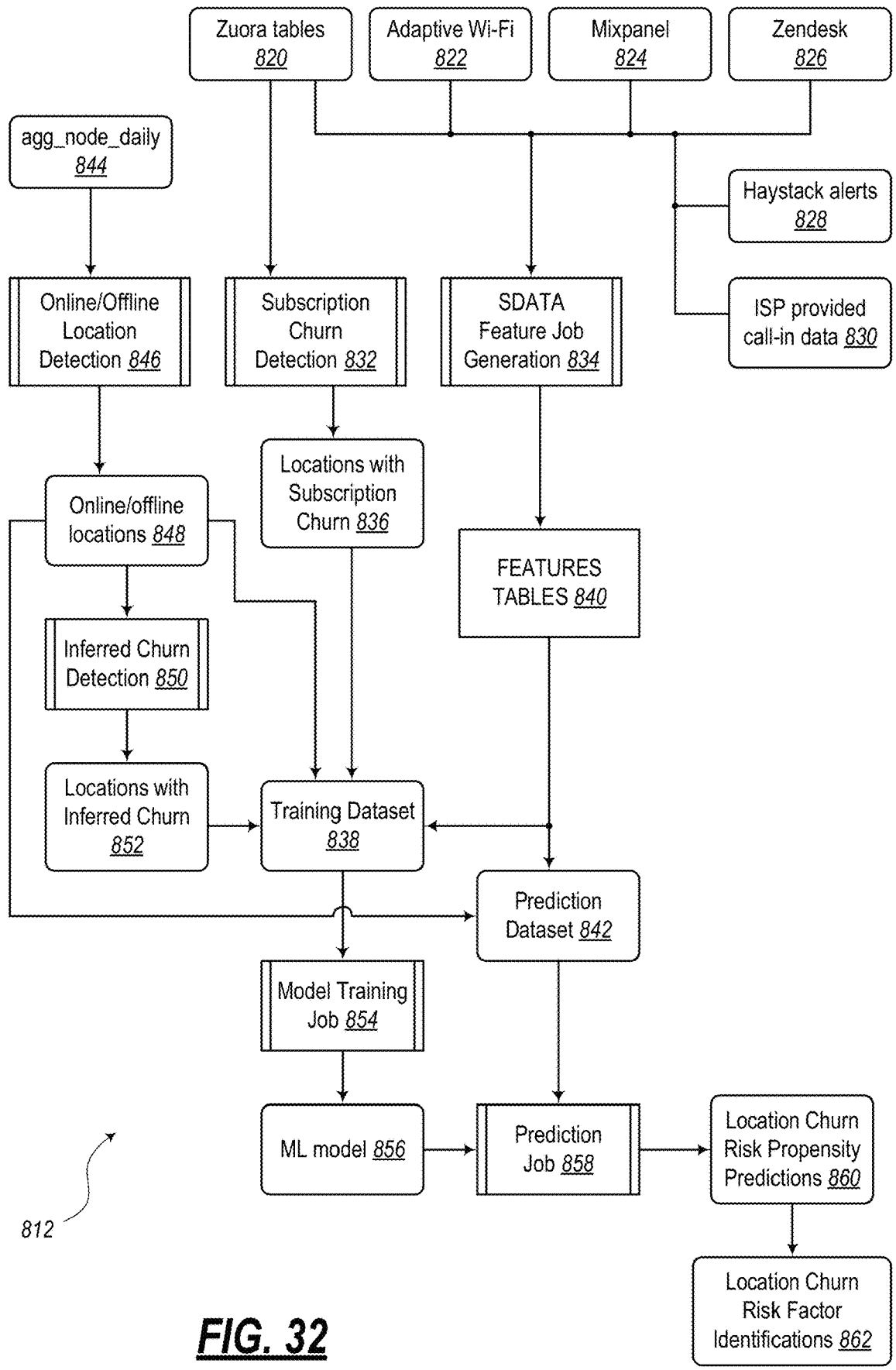
FIG. 32 is a block diagram showing an embodiment of a subscriber churn prediction component, such as is shown in FIG. 31.

FIG. 32 is a block diagram showing an embodiment of the subscriber churn prediction component 812 shown in FIG. 31 or other suitable churn prediction model incorporated in hardware or software in the NOC system 806, service provider 802 system, cloud-based control device, etc. In this embodiment, the subscriber churn prediction component 812 may include Zuora tables 820 that include, for example, subscription, billing, and payment information. The subscriber churn prediction component 812 may also include adaptive Wi-Fi information 822, Mixpanel information 824 (e.g., mobile app usage), Zendesk information 826 (e.g., customer contact information), Haystack alerts 828, and/or ISP provided call-in data 830. The information from the Zuora tables 802 is provided to a subscription churn detection unit 832. Information from blocks 820, 822, 824, 826, 828, and 830 is also provided to an SDATA feature generation jobs unit 834.

The subscription churn detection unit 832 provides location information in a locations with subscription churn unit 836, which is then supplied to a training dataset 838. The SDATA feature generation jobs unit 834 provides information into features tables 840, which may include information regarding active time, call history, core, coverage, haystack, Mixpanel, node utilization, optimizations, Quality of Experience (QoE), subscription, etc. This information may be supplied as a prediction dataset 842. In some embodiments, this information may be referred to as "impact factors" since it may be processed in a way to provide some type of impact or influence on the prediction model for predicting subscriber churn.

In the embodiment of the subscriber churn prediction component 812 shown in FIG. 32, aggregated information 844 from each node (e.g., access points 14 of the subscriber 804 network, Wi-Fi network 10, etc.) may be obtained daily. In some embodiments, the aggregated information 844 may be obtained hourly, weekly, monthly, or periodically over any suitable period of time. This information 844 is provided to an online/offline location detection unit 846, which detects location of the various nodes (e.g., access points 14). The online/offline locations information 848 is provided to an inferred (e.g., ML inference) churn detection unit 850. This information 848 is also provided to the training dataset 838 and prediction dataset 842.

The inferred churn detection unit 850 provides locations 852 with inferred churn, which is supplied to the training dataset 838. The training dataset 838 may be configured to use the data from blocks 836, 840, 848, 852, and/or other historical data to train an ML model that may be configured to predict the likelihood of subscriber churn. A model training job 854 is performed, which provides an ML model that can be used by the subscriber churn prediction component 812 to predict the likelihood of churn. The prediction dataset 842 and ML model 856 are applied to a prediction job 858, which performs the churn prediction. The results are provided to as location churn risk, propensity, and/or predictions 860, which in turn provides location churn risk factor identifications 862.

Figure 33:
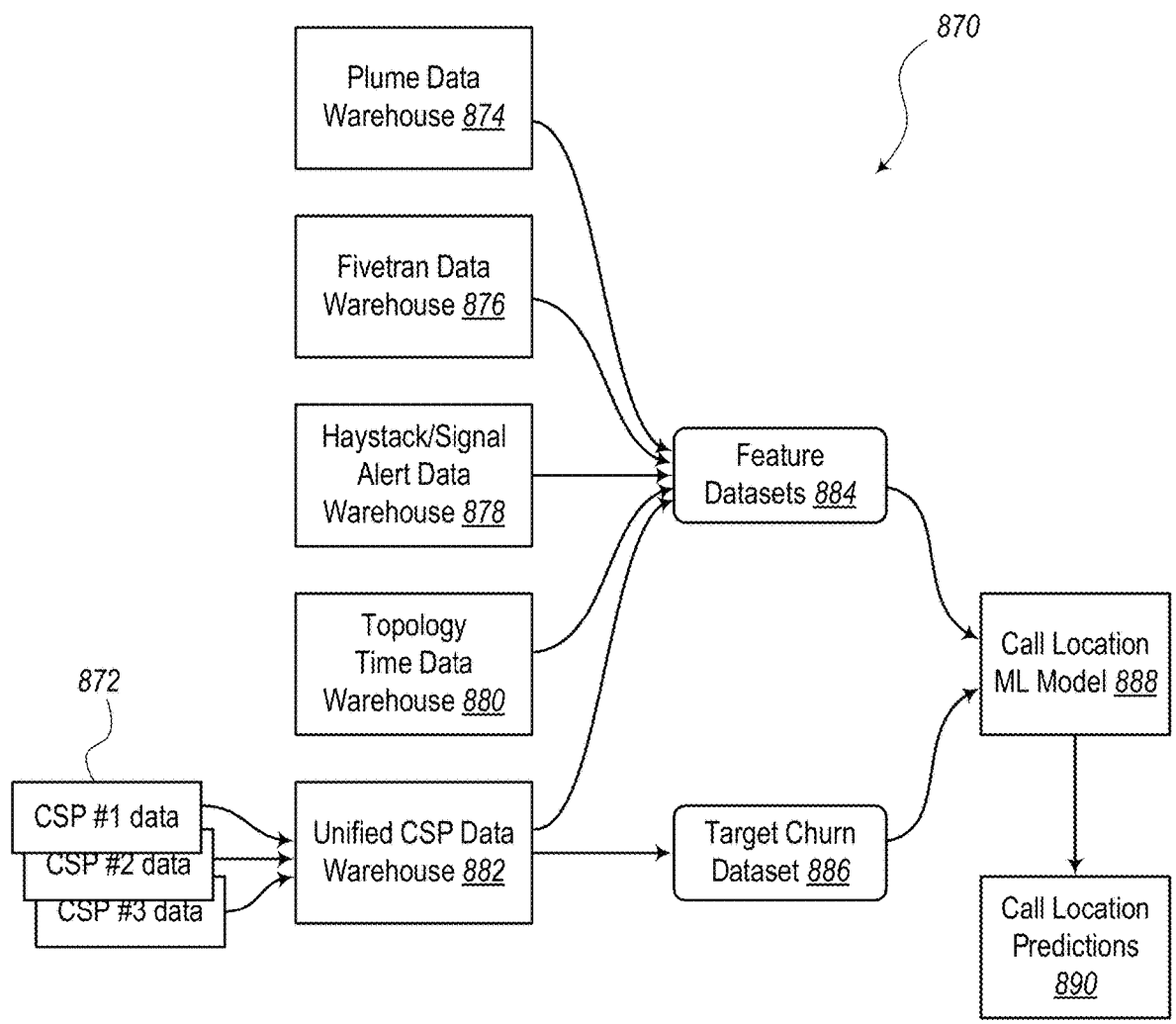
FIG. 33 is a flow diagram showing an embodiment of a churn prediction model, which may include model building elements for predicting subscriber churn.

FIG. 33 is a flow diagram showing an embodiment of a churn prediction model 870, which may include model building elements for predicting subscriber churn. The churn prediction model 870 includes receiving data 872 of one or more CSPs. A data warehouse 874 (e.g., Plume data warehouse) may include node dimension information, node utilizing metrics, QoE metrics, coverage alarms, location metrics, etc. Another data warehouse 876 (e.g., Fivetran data warehouse) may include Mixpanel tables, Zuora, Zendesk tables, etc., such as is described with respect to FIG. 32. A haystack/signal alerts data warehouse 878 may include location offline information, node offline information, poor pod placement information, and/or ISP outage information. A topology time warehouse 880 may include information regarding network topology over time. The data 872 from the CSPs is provided to a unified CSP data warehouse 882, which may store call-in and truck-roll information, subscriber information, payment information, campaign information, etc.

The information stored in warehouses 874, 876, 878, 880, 882 is supplied as a group to a "feature" dataset 884 or impact factor dataset, which may include any information that may have an impact or influence on the prediction of subscriber churn. In one simple example, if a subscriber has been a customer for a long time, a "length of subscription" data point, for example, may be used to influence the prediction of subscriber churn in that the churn prediction model 870 may determine that these loyal customers are typically less likely to churn than newer customers and thereby may influence subscriber churn in a "negative" or "reduced" manner (i.e., the subscriber is less likely to cancel or churn).

The information stored in the unified CSP data warehouse 882 may be supplied as a target churn dataset 886, which may include data regarding high risk subscribers (i.e., subscribers most likely to churn). The information from the feature dataset 884 (or impact/influential data) and target churn dataset 886 is supplied to a call location ML model 88, which includes one or more techniques or algorithms for providing call location information, which in turn is supplied to a call location predictions unit 890 configured to predict subscriber churn from the call location information.

Figure 34:
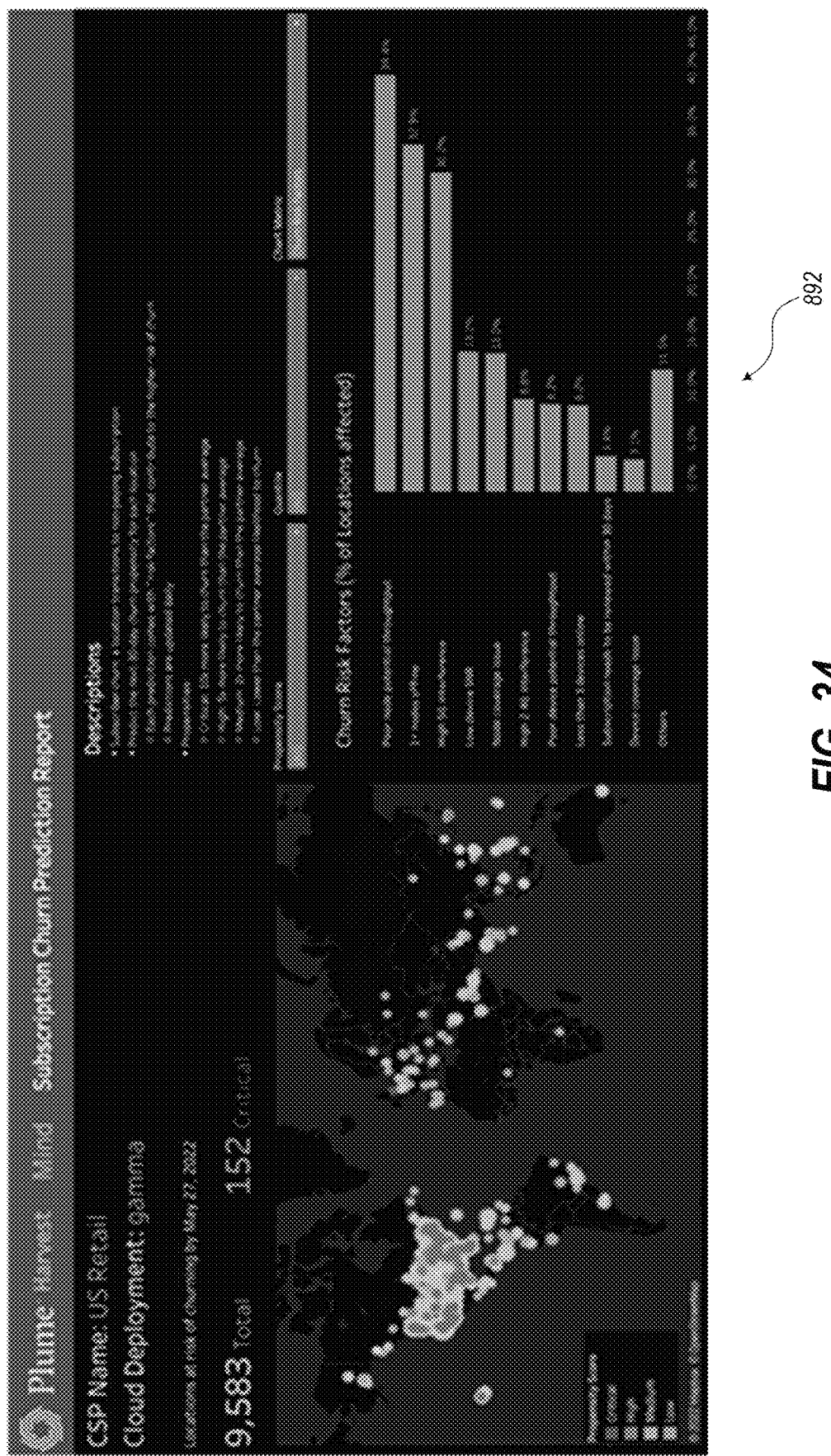
FIG. 34 is a screenshot of a user interface showing an example of a dashboard for displaying a subscription churn prediction report.

FIG. 34 is a screenshot of a user interface showing an example of a dashboard 892 for displaying a subscription churn prediction report. For example, in some embodiments, the report displayed on the dashboard 892 may include an output from the subscriber churn prediction component 812 shown in FIG. 31, from the churn prediction model 812 of FIG. 32, from the call location predictions unit 890 shown in FIG. 33, or from other suitable subscriber churn prediction system.

The dashboard 892 may be an interactive dashboard. The dashboard 892 may be created to easily indicate the groups or cohorts of customers who are in different risk propensities and who have different risk factors. The dashboard 892 may be used to further break down the groups (cohorts) based on different factors, such as customer locations, demographics, etc.

Figure 35:
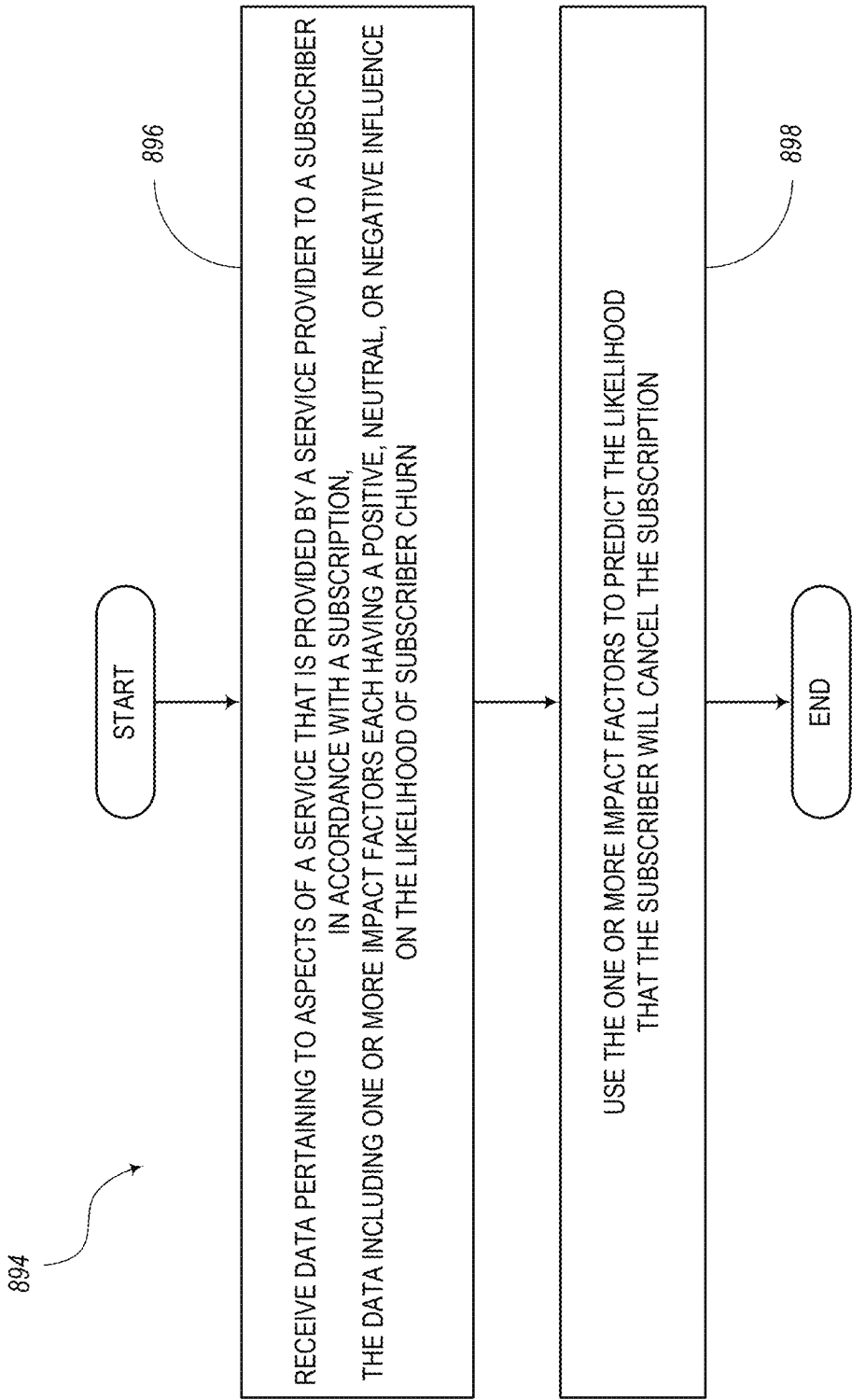
FIG. 35 is a flow diagram showing an embodiment of a process for predicting the likelihood of subscriber churn.

FIG. 35 is a flow diagram showing a general embodiment of a process 894 for predicting the likelihood of subscriber churn. In this embodiment, the process 894 includes a step of receiving data pertaining to aspects of a service that is provided by a service provider to a subscriber in accordance with a subscription, as indicated in block 896. For example, the data in this implementation may include one or more "impact factors," where each impact factor has a positive, neutral, or negative influence on the likelihood of subscriber churn. Also, the process 894 includes the step of using the one or more impact factors to predict the likelihood that the subscriber will cancel the subscription, as indicated in block 898. It may be noted that the process 894 may be performed by any suitable system or device, such as the NOC system 806, subscriber churn prediction component 812, churn prediction model 812, or other suitable components or non-transitory computer-readable media, according to the embodiments described in the present disclosure.

The process 894 may also be applied to multiple subscribers to predict subscriber churn parameters related to one or more groups of subscribers. For example, the process 894 described above may therefore be expanded to include certain functions when the service provider provides multiple services to multiple subscribers in accordance with multiple subscriptions. As such, the process 894 may include receiving multiple datasets, whereby each dataset may pertain to aspects of a respective service provided to a respective subscriber. Also, each dataset may include one or more impact factors that influence the likelihood of subscriber churn associated with each respective service. The process 894 may also include the step of using the one or more impact factors of each dataset to predict the likelihood that each respective subscriber will cancel the respective subscription.

Regarding embodiments in which the process 894 includes multiple subscribers, the process 894 may further perform the steps of a) predicting a number of subscribers having a high likelihood of subscriber churn, b) predicting a percentage of subscribers having a high likelihood of subscriber churn, and/or c) predicting a group of one or more subscribers that are most likely to churn. Also, the process 894 may include the step of categorizing each subscriber as either positive or negative, whereby a positive categorization may represent a prediction that the respective subscriber is likely to churn and a negative categorization represents a prediction that the respective subscriber is not likely to churn. Then, the process 894 may include calculating a time prediction for each subscriber, wherein each time prediction includes a number of days that the respective subscriber will remain positive or negative.

Furthermore, regarding multiple subscriber implementations, the process 894 may also include calculating an urgency factor for each subscriber based on the likelihood of subscriber churn for each subscriber. Then, this urgency factor for each subscriber can be compared with a plurality of churn-risk threshold values to rank the risk of each subscriber to churn. Also, the process 894 in some embodiments may include displaying a dashboard (e.g., dashboard 892) on a user interface (e.g., I/O interfaces 204). For example, the dashboard 892 may be configured to display a) churn probability results, b) groupings of subscribers based on churn-risk probabilities, c) a number of subscribers likely to churn, d) a percentage of subscribers likely to churn, e) demographic information related to subscribers likely to churn, f) location information related to subscribers likely to churn, and/or other metrics.

In addition, with regard to multi-subscriber implementations, the process 894 may also include step of obtaining historical data pertaining to a) aspects of services provided by one or more service providers, b) impact factors used to determine the likelihood of subscriber churn, c) actual underlying subscriber churn reasons, d) correlations or combinations of impact factors, and/or other suitable information. Then, using this historical data, the process 894 may include the step of training or re-training a Machine Learning (ML) model for predicting the subscriber churn. Furthermore, the process 894 may include the step of receiving datasets pertaining to updated aspects of services provided to the multiple subscribers, where the updated aspects may be received on an hourly basis, daily basis, or over another suitable timeframe. Then, using the one or more impact factors of the datasets, the process 894 may update the prediction of the likelihood of subscriber churn.

In addition, regarding implementations of the process 894 whereby any number of subscribers may be considered, the process 894 may also perform a step of calculating a score for quantifying a probability of subscriber churn. The impact factors, for example, may include risk factors, favorable factors, and/or neutral factors, where the risk factors increase the likelihood of a subscriber to churn, the favorable factors decrease the likelihood of a subscriber to churn, and the neutral factors result in an insubstantial change to the likelihood of a subscriber to churn. For example, each impact factor may be associated with one or more weights for defining how much the likelihood of subscriber churn is increased or decreased. The impact factors may include measurable parameters obtainable without receiving feedback from the subscriber and/or feedback information that is received from the subscriber (e.g., via a survey, service call, etc.).

Furthermore, these impact factors may also include service-based metrics and/or subscription-based metrics and may be obtained from one or more sources. The service-based metrics, for instance, may include a) network performance metrics, b) network behavior metrics, c) network usage metrics, d) user experience metrics, and/or other similar metrics. The service-based metrics, for instance, may further include a) information related to durations of network activities, b) information related to transmitted (Tx) and received (Rx) bytes transferred, c) average Signal-to-Noise Ratio (SNR), d) information related to connect/disconnect patterns, e) information related to power on and power off events, f) type of network service provided to the subscriber, g) type of network being used, and/or other similar information. The subscription-based metrics, for instance, may include a) type of subscription, b) subscription end date, c) contract information, d) demographic information, e) subscriber location information, f) type of service setting, g) length of subscription lifespan, h) billing information, i) payment information, j) number of payment activities, k) amounts of payments, l) types of discounts applied, m) customer support interaction information, n) number of support calls placed, o) call reasons, p) time taken for service provider to resolve issues, q) customer feedback information, r) customer sentiments, ratings, and rankings, s) customer satisfaction rankings or scores, t) types of customer feedback media used, u) information related to a comparison with aspects of a competitor service provider, and/or any other suitable types of information related to service subscriptions.

In addition, the process 894 of FIG. 35 may further include other useful steps. For example, the process 894 may include using one or more Machine Learning (ML) inference models to predict the likelihood that the subscriber will cancel the subscription. The process 894 may predict one or more reasons why a subscriber might churn, based on the one or more impact factors mentioned above. The process 894 may also include initiating any suitable proactive procedures to address the various issues related to the one or more reasons why the subscriber might churn. The process 894, according to some embodiments, may also include calculating an urgency parameter related to a time (e.g., in a number of days) or a timeframe (e.g., within a number of months) when the subscriber may be likely to churn. In various embodiments, the "service" described herein may be a network service, a network access service, a cloud service, or the like. Also, the service, for example, may be associated with a Wi-Fi network, a Virtual Private Network (VPN), an enterprise network, or the like.

In some embodiments, the process 894 may rank the risk (or urgency) of potential churn (e.g., critical, high, normal, low, etc.), such as by comparing a risk "score" with threshold values for such ranking. Also, the process 894 may include utilizing the dashboard 892 to show a NOC network operator the churn probability results, groups of subscribers in each class (or risk propensities, based on likeliness to churn), and perhaps break down results based on subscriber groups, locations, demographics, etc.

According to some embodiments, the service-based metrics may include information regarding network (Wi-Fi) usage and/or behavior, such as the duration of network activities, Tx/Rx bytes transferred, average SNR, connect/disconnect pattern information, power-on and power-off behaviors, etc. Also, the process 894 may use network (Wi-Fi) information, such as user experience (QoE) information, which may be obtained by OpenSync systems, type of network service (e.g., Wi-Fi) provided to subscribers, types of network being used, etc.

The subscriber-based churn dataset may include subscription info (type of subscription), subscription end date, contract info, demographic info (e.g., customer location info, type of setting (home, apartment, business, etc.), a length of time that a subscriber has been subscribed to a service, etc.), billing info, payment info (e.g., number of payment activities, amount of payments, type of discounts applied, etc.), customer support interaction info (e.g., number of support calls, call reasons, resolution time or time that is took to resolve, customer sentiments/ratings/rankings, etc.), contact info (phone call, email, text, etc.), comparison with competitor info, customer satisfaction rankings or scores. For example, greater weight may be given to more recent data.

The process 894 may include suggesting or recommending solutions (e.g., to the customer himself or herself or to a customer service representative) or proactively initiate steps to address issues related to the reasons why a subscriber might churn (e.g., send an email, offer a discount, etc.). Some proactive actions may include sending a text message, push notification, in-app notification, alert support agent to contact subscriber, automated survey, survey with live operator, etc.

Therefore, the systems and methods of the present disclosure may be configured to use ML techniques applied to enriched datasets to predict which subscribers are likely to churn and for what reasons. This may involve correlating the subscriber churn data with a variety of other datasets including, but not limited to, customer subscription, contract, billing, and/or payment data, customer support or contact data (e.g., via phone calls, email, texts, etc.), as well as detailed customer Wi-Fi usage data and experience data, which may be available through OpenSync technology. Using a unique combination of data enrichment techniques and ML methods, the present disclosure provides embodiments that can calculate a score to quantify the likelihood of subscribers to churn and further determine scores related to the respective reason or reasons for subscriber churn. As such, this information can be used to address unhappy subscribers with a customized recommendation to resolve the specific issues or problems faced by the subscriber, as opposed to a general approach (e.g., offering discounts to everyone whose subscription is about to expire).

The subscriber churn prediction techniques may be framed as a classification processing system (e.g., ML model), where the probability of customer churn may be classified over any suitable time horizon (e.g., 30 day, 60 day, 90 day, etc.). Thus, the timeframe over which a subscriber may churn can also be predicted, and the predictions may be updated using the most recent data, with some frequency (e.g., hourly, daily, weekly, monthly, etc.), depending on various use cases.

Also, the systems and methods of the present disclosure may also include obtaining a historical subscriber churn dataset. Also, specific reasons as communicated by the subscriber can also be obtained. The subscriber-communicated reasons may include poor Quality of Experience (QoE), too expensive, poor customer support experience, etc., when this information becomes available (e.g., when customer calls a customer service representative, fills out a survey, etc.). Otherwise, without specifically spoken or written reasons obtained directly from a subscriber, the embodiments of the present disclosure may use historical and current information regarding network performance metrics, operational factors, etc. Combining an individual churn dataset with the entire customer group dataset, the present embodiments are configured to create customer time-to-churn datasets. Thereby, on a given day for each customer, the present embodiments may calculate or predict time-to-churn information (e.g., in a number of days). For those subscribers who have not churned, the historical value in this case may be null.

On any given day, for example, the systems and methods described herein may analyze information for each customer. For example, the NOC system 806 may be configured to label each subscriber using classifications of positives or negatives, where positives may be customers who may likely churn within the next X days and negatives may be customers who would likely not churn in the next X days. In some embodiments, the number X may be a predetermined number based on various use cases (e.g., 30 days, 60 days, 90 days, etc.).

For each customer for each day, "impact factors" may be determined or estimated based on Wi-Fi behavior in a Wi-Fi environment, user experience in the Wi-Fi environment, the subscriber's customer-support interactions, billing information, payment information, subscription information, demographics, among others. For example, Wi-Fi behavior and experience factors may include a) duration of Wi-Fi activities, b) Tx/Rx bytes transferred, c) average SNR, c) connect/disconnect patterns, among others. Examples of customer-support interaction factors may include a) number of support calls and call reasons, b) time to resolution, c) customer sentiments, among others. Examples of billing/payment/subscription features may include a) type of subscription, b) number of payment activities and amounts, c) type of discounts applied, among others. Examples of demographic features may include a) customer location, b) home setting (e.g., house, apartment, office, etc.), c) customer "age" since the time when they first became active, among others. Again, these "impact factors" (features) relate to information that may be influential in determining or predicting whether or not (and to what degree) any subscriber may churn at any particular time.

Using the historical data, for example, the Machine Learning (ML) model of the present disclosure may be trained based on the features generated to predict whether the customer is "positive" or "negative." When the data is available, the ML model further predicts, for the "positive" cases, what are the reasons the customer would be likely to churn. Based on predetermined thresholds and predicted churn probabilities, subscribers (customers) may be identified, according to some embodiments, as "critical," "high," "normal," and "low" risk of churning. It should be noted that other labels and/or other numbers of classification groups may be used without departing from the teachings of the present disclosure. For those customers with elevated risk of churning, the ML techniques may be used to identify which features contribute to the "positive" predictions, and those features may be identified as "risk factors."

The ML methodology used in the present disclosure may be configured to build a predictive model that is unique in the field of customer service monitoring systems and methods and therefore improves upon conventional systems that may utilize a "one size fits all" approach. By determining not only the subscribers who may churn but also determining how likely they are to churn, the systems and methods of the present disclosure are able to predict more specific churn factors than what has been done before. In response to such detection, the present disclosure may be configured to provide customized resolution actions, which can be enacted automatically or may be recommended to a customer service representative who may then reach out to the subscriber for retention purposes. Furthermore, detectable parameters and network metrics can be compared with actual customer-indicated "reasons" (e.g., root causes) to determine whether how closely the detected parameters can be used (e.g., based on ML training and/or re-training) to accurate predict subscriber churn and ways to approach these customers to resolve issues that can be problematic to retaining the customers.

The combination of data ingestion, data enrichment, and data processing of these various datasets is configured to make the predictive model more accurate for determining subscriber sentiment, particularly regarding probabilities that subscribers may look for services elsewhere. Also, the predictive models of the present disclosure may be customized for each service provider (e.g., Internet Service Provider (ISP), Cloud Service Provider (CSP), etc.) and the subscriber network (e.g., local Wi-Fi network, residential Wi-Fi network, etc.).

Use of detailed Wi-Fi usage data may be available in some embodiments via OpenSync, which can make the predictive model highly actionable as it can pinpoint the reasons why the subscriber is likely to churn. This allows the service provider to initiate next steps proactively to address those specific concerns before it is too late.

Also, the frequency of updates of the underlying data model may occur daily according to some embodiments or over any suitable times (e.g., by minute, hour, day, week, month, etc.). As such, receiving or obtaining new data on a regular or periodic basis may help to reduce the "staleness" of the data used in the predictive model and may better allow for customizing the prediction for each subscriber based on the most recent data captured for each subscriber. In some embodiment, the data may be weighted based on age, whereby newer data may be given a higher weight and considered to be more relevant to subscriber churn predictions.

The embodiments of the present disclosure may take a proactive approach to addressing "pain points" of the subscribers. In this context, the pain points may include the above-described impact factors that are likely to affect the prediction results regarding churn. The pain points may be based on a combination of various data points, such as customer subscription, billing and payment data, customer contact data (e.g., via phone call, email, social media, etc.), customer Wi-Fi usage and performance data, underlying correlations with observed churn rate (e.g., from historical data) of subscribers who had experienced similar pain points in the past.

Also, integrating the data from multiple sources (e.g., CSPs), the present disclosure may be configured to improve the model performance and provide greater generalization for multiple subscribers. The present disclosure may include two different models of churn depending on the underlying data sources. A basic version may be referred to as a "network churn model," which may leverage Wi-Fi network performance data (e.g., poor throughput, high 5G interference, roaming issues, device "sticking" issues, user devices jumping back and forth between access points, SNR issues, number of access points or pods in use, access points being connected or disconnected from a Wi-Fi network, number of user devices in use, wireless coverage issues, etc.). An advanced version may be referred to as a "subscription churn model," which may utilize several rich data sources (e.g., billing, pricing, closeness to the time when a subscription is scheduled to be renewed, discount expiration information, customer call-in-records, competitor information, customer satisfaction, Net Promoter Score (NPS), Customer Satisfaction (CSAT) score, etc.).

One goal for the embodiments of the present disclosure is to provide a proactive approach to possible subscriber issues by predicting subscriber churn based on various parameters. This is believed to be an improvement over conventional systems that may simply be reactive or those that may simply provide a "one size fits all" approach. By using historical data about the conditions/reasons leading up to some customers churning, the present disclosure is configured to obtain and analyze this data to determine or predict when customers might churn and continue to obtain further data to fine-tune the ML models for better predictions for future subscribers.

Again, the ML models may use a combination of a network performance dataset and a subscription dataset. According to one specific example, the present systems may detect that a customer's Wi-Fi network is experiencing problems (e.g., device sticking issues, latency, etc.). Also, the present systems may detect that the customer has disconnected one or more access points or that the customer has repositioned one or more access points within the home such that different user devices are now utilizing different access points. Also, regarding subscription information, the present systems may also determine that the customer's bill has increased by 60% over the past two years and that an email has been sent to the customer that their subscription is scheduled to automatically renew in two weeks with an even higher bill. Instead of putting man-power to analyze each and every situation for each and every subscriber, the present systems described herein may take all of this information and determine that the subscriber may be very likely to drop or cancel the subscription (or decide not to renew) in similar situations. In some embodiments, not only can the present systems detect this likelihood of customer churn, but may also be configured to take automatic resolution measures to increase customer satisfaction and to retain the customer. For instance, a recommendation may be communicated to a customer service representative that he or she is to give the subscriber a phone call and ask the subscriber if there are issues with the access points, provide recommendations on how to optimally position the access points, and that there may be a "loyalty" discount for renewing their subscription. Instead of allowing the customer to continue experiencing frustrations with a high bill and poor service, the customer may greatly appreciate the proactive nature of the service provider offering solutions for better service and also doing so at a reduced cost to the customer. Also, by speaking directly with the customer, the customer service representative may be able to infer what are likely the real reasons why the customer is not completely satisfied.

A customer paying more money is usually going to have a higher risk of churning. Also, a customer experiencing poor service or needing to make multiple service calls for repairs and such may also have a higher risk of churning. However, it may not be known for sure if any of these things may really be the case for churning and therefore communication with the customer (e.g., phone call, text message, email, etc.) may be appropriated in different scenarios and based on the extent or level of churn likelihood. The ML models may be configured to learn these patterns from measurable metrics and also obtain actual reasons or causations based on communications with the subscribers. Then, correlations between measurable metrics and customer-communicated reasons can be calculated using the ML models.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer-readable code stored thereon, the computer-readable code configured to enable a processing device to perform the steps of:
receiving data pertaining to aspects of a service that is provided by a service provider to a subscriber in accordance with a subscription, the data including one or more impact factors for the service, with each having a positive, neutral, or negative influence on a likelihood of subscriber churn;
receiving a dataset pertaining to updated aspects of services provided to the subscriber, the updated aspects of services provided to the subscriber comprising one or more updated impact factors since a time the data related to the one or more impact factors was received;
executing a machine learning (ML) model based on the one or more impact factors and the updated aspects, the execution of the ML model outputting a prediction of a likelihood that the subscriber will cancel the subscription, the execution comprising:
categorizing each subscriber as either positive or negative, wherein a positive categorization represents a prediction that the respective subscriber is likely to churn and a negative categorization represents a prediction that the respective subscriber is not likely to churn; and
calculating a time prediction for each subscriber, wherein each time prediction includes a number of days that the respective subscriber will maintain their positive categorization or negative categorization from their respective categorization as either positive or negative; and
controlling an account of the subscriber of the service based on the output prediction of the ML model.

2. The non-transitory computer-readable storage medium of claim 1, wherein the service provider provides multiple services to multiple subscribers in accordance with multiple subscriptions, and wherein the computer-readable code is further configured to enable the processing device to perform the steps of:
receiving multiple datasets each pertaining to aspects of a respective service provided to a respective subscriber, each dataset including one or more impact factors that influence the likelihood of subscriber churn associated with each respective service; and
using the one or more impact factors of each dataset to predict the likelihood that each respective subscriber will cancel the respective subscription.

3. The non-transitory computer-readable storage medium of claim 2, wherein the computer-readable code is further configured to enable the processing device to perform one or more of the steps of:
predicting a number of subscribers having a high likelihood of subscriber churn;
predicting a percentage of subscribers having a high likelihood of subscriber churn; and
predicting a group of one or more subscribers that are most likely to churn.

4. The non-transitory computer-readable storage medium of claim 2, wherein the computer-readable code is further configured to enable the processing device to perform the steps of:
calculating an urgency factor for each subscriber based on the likelihood of subscriber churn for each subscriber; and
comparing the urgency factor for each subscriber with a plurality of churn-risk threshold values to rank the risk of each subscriber to churn.

5. The non-transitory computer-readable storage medium of claim 2, wherein the computer-readable code is further configured to enable the processing device to perform the step of displaying a dashboard on a user interface, the dashboard configured to display one or more of churn probability results, groupings of subscribers based on churn-risk probabilities, a number of subscribers likely to churn, a percentage of subscribers likely to churn, demographic information related to subscribers likely to churn, and location information related to subscribers likely to churn.

6. The non-transitory computer-readable storage medium of claim 2, wherein the computer-readable code is further configured to enable the processing device to perform the steps of:
obtaining historical data pertaining to one or more of aspects of services provided by one or more service providers, impact factors used to determine the likelihood of subscriber churn, actual underlying subscriber churn reasons, and correlations or combinations of impact factors; and using the historical data to train or re-train a Machine Learning (ML) model for predicting the subscriber churn.

7. The non-transitory computer readable storage medium of claim 6, wherein data from multiple service providers is used to train the Machine Learning (ML) model for predicting subscriber churn, and when making the predictions the Machine Learning (ML) model is used independently for each service provider.

8. The non-transitory computer-readable storage medium of claim 7, wherein the updated aspects are received on an hourly basis or daily basis, wherein the updated aspects are used to update a prediction based on the impact factors.

9. The non-transitory computer-readable storage medium of claim 1, wherein the computer-readable code is further configured to enable the processing device to perform the step of calculating a score for quantifying a probability of subscriber churn.

10. The non-transitory computer-readable storage medium of claim 1, wherein the impact factors include one or more of risk factors, favorable factors, and neutral factors, where the risk factors increase the likelihood of a subscriber to churn, the favorable factors decrease the likelihood of a subscriber to churn, and the neutral factors result in an insubstantial change to the likelihood of a subscriber to churn.

11. The non-transitory computer-readable storage medium of claim 10, wherein each impact factor is associated with one or more weights for defining how much the likelihood of subscriber churn is increased or decreased.

12. The non-transitory computer-readable storage medium of claim 1, wherein the impact factors include one or more of measurable parameters obtainable without receiving feedback from the subscriber and feedback information received from the subscriber.

13. The non-transitory computer-readable storage medium of claim 1, wherein the impact factors include one or more of service-based metrics and subscription-based metrics obtained from one or more sources.

14. The non-transitory computer-readable storage medium of claim 13, wherein the service-based metrics include one or more of network performance metrics, network behavior metrics, network usage metrics, and/or user experience metrics.

15. The non-transitory computer-readable storage medium of claim 14, wherein the service-based metrics further include one or more of information related to durations of network activities, information related to transmitted (Tx) and received (Rx) bytes transferred, average Signal-to-Noise Ratio (SNR), information related to connect/disconnect patterns, information related to power on and power off events, type of network service provided to the subscriber, and type of network being used.

16. The non-transitory computer-readable storage medium of claim 15, wherein the subscription-based metrics include one or more of type of subscription, subscription end date, contract information, demographic information, subscriber location information, type of service setting, length of subscription lifespan, billing information, payment information, number of payment activities, amounts of payments, types of discounts applied, customer support interaction information, number of support calls placed, call reasons, time taken for service provider to resolve issues, customer feedback information, customer sentiments, ratings, and rankings, customer satisfaction rankings or scores, types of customer feedback media used, and information related to a comparison with aspects of a competitor service provider.

17. The non-transitory computer-readable storage medium of claim 1, wherein the computer-readable code is further configured to enable the processing device to perform the step of using one or more Machine Learning (ML) inference models to predict the likelihood that the subscriber will cancel the subscription.

18. The non-transitory computer-readable storage medium of claim 1, wherein the computer-readable code is further configured to enable the processing device to perform the step of predicting one or more reasons why a subscriber might churn, based on the one or more impact factors.

19. The non-transitory computer-readable storage medium of claim 18, wherein the computer-readable code is further configured to enable the processing device to perform the step of initiating proactive procedures to address issues related to the one or more reasons why the subscriber might churn.

20. The non-transitory computer-readable storage medium of claim 1, wherein the computer-readable code is further configured to enable the processing device to perform the step of sending a message to a subscriber who might churn.

21. The non-transitory computer-readable storage medium of claim 20, wherein the computer-readable code is further configured to enable the processing device to send a message to a subscriber who might churn with a description or action based on the reasons why the subscriber might churn.

22. The non-transitory computer-readable storage medium of claim 1, wherein the computer-readable code is further configured to enable the processing device to perform the step of calculating an urgency parameter related to a time, in a number of days, or a timeframe, within a number of months, when the subscriber is likely to churn.

23. The non-transitory computer-readable storage medium of claim 1, wherein the service is one or more of a network service, a network access service, and a cloud service.

24. The non-transitory computer-readable storage medium of claim 23, wherein the service is associated with one or more of a Wi-Fi network, a Virtual Private Network (VPN), and an enterprise network.

25. A method comprising the steps of:
receiving data pertaining to aspects of a service that is provided by a service provider to a subscriber in accordance with a subscription, the data including one or more impact factors for the service, with each having a positive, neutral, or negative influence on a likelihood of subscriber churn;
receiving a dataset pertaining to updated aspects of services provided to the subscriber, the updated aspects of services provided to the subscriber comprising one or more updated impact factors since a time the data related to the one or more impact factors was received;
executing a machine learning (ML) model based on the one or more impact factors and the updated aspects, the execution of the ML model outputting a prediction of a likelihood that the subscriber will cancel the subscription, the execution comprising:
categorizing each subscriber as either positive or negative, wherein a positive categorization represents a prediction that the respective subscriber is likely to churn and a negative categorization represents a prediction that the respective subscriber is not likely to churn; and calculating a time prediction for each subscriber, wherein each time prediction includes a number of days that the respective subscriber will maintain their positive categorization or negative categorization from their respective categorization as either positive or negative; and controlling an account of the subscriber of the service based on the output prediction of the ML model.

26. The method of claim 25, further comprising the steps of:

receiving multiple datasets each pertaining to aspects of a respective service provided to a respective subscriber, each dataset including one or more impact factors that influence the likelihood of subscriber churn associated with each respective service; and using the one or more impact factors of each dataset to predict the likelihood that each respective subscriber will cancel the respective subscription.

* * * * *